US010062462B2

(12) United States Patent
Kim et al.

(10) Patent No.: US 10,062,462 B2
(45) Date of Patent: Aug. 28, 2018

(54) FACILITY FOR REDUCING RADIOACTIVE MATERIAL AND NUCLEAR POWER PLANT HAVING THE SAME

(71) Applicant: KOREA ATOMIC ENERGY RESEARCH INSTITUTE, Daejeon (KR)

(72) Inventors: Young In Kim, Daejeon (KR); Kyung Jun Kang, Jeollabuk-Do (KR); Keung Koo Kim, Daejeon (KR); Hun Sik Han, Daejeon (KR); Ju Hyeon Yoon, Daejeon (KR); Jae Joo Ha, Daejeon (KR); Dae Hyun Hwang, Daejeon (KR); Suhn Choi, Daejeon (KR); Joo Hyung Moon, Daejeon (KR); Soo Jai Shin, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 587 days.

(21) Appl. No.: 14/469,499

(22) Filed: Aug. 26, 2014

(65) Prior Publication Data
US 2015/0221403 A1    Aug. 6, 2015

(30) Foreign Application Priority Data

Aug. 28, 2013  (KR) .......................... 10-2013-0102649
Mar. 27, 2014  (KR) .......................... 10-2014-0036321
Jul. 4, 2014    (KR) .......................... 10-2014-0083848

(51) Int. Cl.
*G21D 3/04*     (2006.01)
*G21D 1/02*     (2006.01)
(Continued)

(52) U.S. Cl.
CPC ................. *G21D 3/04* (2013.01); *G21C 9/00* (2013.01); *G21C 9/004* (2013.01); *G21C 13/02* (2013.01);
(Continued)

(58) Field of Classification Search
CPC .......... G21C 15/18; G21C 9/004; G21C 9/00; G21C 13/02; G21D 3/04
(Continued)

(56) References Cited

U.S. PATENT DOCUMENTS 3,718,539 A * 2/1973 West ...................... G21C 15/18
                                                              376/283
3,899,391 A * 8/1975 Sulzer .................... G21C 9/004
                                                              376/283

(Continued)

FOREIGN PATENT DOCUMENTS

JP      5-203778       8/1993
JP      6-331775      12/1994

*Primary Examiner* — Jack W Keith
*Assistant Examiner* — Daniel Wasil
(74) *Attorney, Agent, or Firm* — Scully Scott Murphy and Presser; Frank Digiglio

(57) ABSTRACT

The present invention provides a facility for reducing radioactive material comprising: a cooling water storage unit installed inside a containment and formed to store cooling water; a boundary unit forming a boundary of radioactive material inside the containment and surrounding a reactor coolant system installed inside the containment to prevent a radioactive material from releasing from the reactor coolant system or a pipe connected with the reactor coolant system to the containment; a connecting pipe connected with an inner space of the boundary unit and the cooling water storage unit to guide a flow of a fluid caused by a pressure difference between the boundary unit and the cooling water storage unit from the boundary unit to the cooling water storage unit; and a sparging unit disposed to be submerged in the cooling water stored in the cooling water storage unit and connected with the connecting pipe to sparge the fluid that has passed through the connecting pipe and the radioactive material contained in the fluid to the cooling water storage unit.

26 Claims, 39 Drawing Sheets

(51) Int. Cl.
  *G21C 9/00* (2006.01)
  *G21C 9/004* (2006.01)
  *G21C 13/02* (2006.01)
  *G21C 15/18* (2006.01)

(52) U.S. Cl.
  CPC .............. *G21C 15/18* (2013.01); *G21D 1/02* (2013.01); *Y02E 30/40* (2013.01)

(58) Field of Classification Search
  USPC ..................................... 376/282, 283, 299
  See application file for complete search history.

(56) References Cited

U.S. PATENT DOCUMENTS

| | | | | |
|---|---|---|---|---|
| 4,022,655 A * | 5/1977 | Gaouditz | ............... | G21C 9/012 376/283 |
| 4,213,824 A * | 7/1980 | Jabsen | ................... | G21C 9/012 376/283 |
| 4,252,611 A * | 2/1981 | Mizumachi | ............ | G21C 9/012 376/283 |
| 5,272,737 A * | 12/1993 | Fujii | ...................... | G21C 15/18 376/283 |
| 5,353,318 A * | 10/1994 | Gluntz | ................... | G21C 9/012 376/283 |
| 5,596,613 A * | 1/1997 | Gluntz | ................... | G21C 9/008 376/283 |
| 6,071,482 A * | 6/2000 | Brockerhoff | ............. | G21C 9/00 376/283 |
| 6,088,418 A * | 7/2000 | Martin | ................... | G21C 9/004 376/283 |
| 2009/0323884 A1* | 12/2009 | Sato | ........................ | G21C 15/18 376/283 |
| 2013/0259183 A1* | 10/2013 | Sato | ........................ | G21C 15/18 376/283 |
| 2013/0259184 A1* | 10/2013 | Sato | ........................ | G21C 15/18 376/293 |
| 2014/0003567 A1* | 1/2014 | Sato | ........................ | G21C 15/18 376/283 |

* cited by examiner

FACILITY FOR REDUCING RADIOACTIVE MATERIAL AND NUCLEAR POWER PLANT HAVING THE SAME

CROSS-REFERENCE TO RELATED APPLICATIONS

Pursuant to 35 U.S.C. § 119(a), this application claims the benefit of earlier filing date and right of priority to Korean Application No. 10-2013-0102649, filed on Aug. 28, 2013; Korean Application No. 10-2014-0036321, filed on Mar. 27, 2014; Korean Application No. 10-2014-0083848, filed on Jul. 4, 2014, the contents of which are incorporated by reference herein in their entireties.

BACKGROUND OF THE INVENTION

1. Field of the Disclosure

This specification relates to a safety system for securing safety of a nuclear power plant, and in particular, to a facility that may decrease the concentration of a radioactive material in a containment by a passive principle when an accident occurs in the nuclear power plant and a nuclear power plant having the same.

2. Background of the Disclosure

Depending on the position of installation, nuclear reactors are classified into loop-type reactors (e.g., commercial reactors, Korea) with main components (steam generators, a pressurizer, reactor coolant pumps, etc.) installed outside the reactor vessel and integral reactors (e.g., SMART reactor, Korea) with the main components installed in the reactor vessel.

Further, nuclear reactors are classified into active reactors and passive reactors depending on how the safety system is implemented. The active reactors are reactors that use an active component, such as a pump, which is powered by an emergency diesel generator in order to operate the safety system, and the passive reactors are reactors that use a passive component which is powered by a passive force such as gravity or gas pressure in order to operate the safety system. In the passive reactors, the passive safety system may safely maintain the reactors only with a natural force embedded in the system without a safety-grade AC power source such as an emergency diesel generator or an operator's action at least for a time (72 hours) required by the regulations when an accident occurs, and after 72 hours, the passive safety system may be treated by the operator or assisted by a non-safety system.

A containment (containment building, reactor building, containment vessel or safeguard vessel) that plays a role as a final protection barrier to prevent radioactive materials from releasing to the external environment are classified into the containment building (or reactor building) formed of reinforced concrete and the containment vessel and safeguard vessel formed of steel depending on the material constituting a pressure boundary. The containment vessel is a large vessel that is designed to have a low pressure like the containment building, and the safeguard vessel is a small vessel designed to be rendered to have a small size and having the higher design pressure. Unless mentioned specially, as used herein, the terms "containment building," "reactor building," "containment vessel," or "safeguard vessel" are collectively referred to as a containment.

Various forms of active and passive systems, such as a containment spray system, a containment cooling system, a suppression tank or suppression pool, are put to use in order to decrease the density of radioactive material, the pressure and temperature in the containment at accidents. Hereinafter, such facilities are described below one by one.

The active containment spray system (Korean commercial reactor, SMART reactor, etc.) sprays a large amount of cooling water using containment spray pumps when an accident occurs, recollects the cooling water to an in-containment refueling water storage tank or sump, and re-sprays the cooling water to decrease the pressure and temperature of the containment and the concentration of radioactive material for a long time. The active containment spray system may perform a long-term spraying function and requires a power system to be available for activating the pumps.

The passive containment spray system (Canadian CANDU, etc.) has a cooling water storage tank at an upper side of the containment and sprays a large amount of cooling water when an accident takes place to decrease the pressure and temperature inside the containment and the concentration of the radioactive material. Since the passive containment spray system has a limited storage capacity of cooling water, and thus, cannot be operated more than a predetermined time. Accordingly, the cooling water storage tank needs to be periodically made up using a pump for long-term use of the passive containment spray system. This means that the passive containment spray system also needs to use a pump and a power system for activating the pump in order for a long-term operation.

The suppression tank (commercial BWR, CAREM: Argentina, IRIS: Westinghouse, U.S. et. al.) guides the steam discharged into the containment to the suppression tank using a difference in pressure between the containment and the inside of the suppression tank and condenses the steam to decrease the pressure and temperature in the containment and the concentration of the radioactive material. The suppression tank operates only when the pressure in the containment is higher than the pressure in the suppression tank.

The passive containment cooling system has heat exchangers and a cooling water tank installed in or outside the containment and condenses the steam in the containment using the heat exchangers to decrease the pressure and temperature in the containment and the concentration of the radioactive material. The passive containment cooling system uses the natural circulation in the containment and thus has a lower performance in reducing the pressure and temperature and concentration of radioactive material as compared with the active containment spray system.

Besides, there is a sort of passive containment cooling system (AP1000: Westinghouse, U.S.) that applies a steel containment vessel to cool (spray, air) the external wall and that condenses the steam in the containment vessel on the internal wall of the containment vessel to thus decrease the pressure and temperature in the containment vessel and the concentration of radioactive material. This system uses the natural circulation in the containment similarly to the passive containment cooling system and thus shows a relatively low performance in reducing pressure and temperature and the concentration of radioactive material as compared with the active containment spray system.

Most of the above-described systems show a relatively excellent performance in decreasing the pressure and temperature inside the containment. However, among the radioactive materials that may spread to the external environment when an accident occurs in the nuclear power plant, iodine may have a highest proportion of concentration. Iodine, when contacts water, is mostly dissolved in the water (solubility 0.029 g/100 g(20° C.)). Accordingly, among the containment-related safety systems, the active containment spray system (which is adopted for the Korean commercial reactors), which uses an active pump to spray a great amount of cooling water and to recirculate the cooling water for a long time, may show the most excellent performance in decreasing the concentration of radioactive material in the containment. However, the active safety system necessarily requires supply of emergency AC power for operating the active components such as pumps when an accident occurs in the nuclear power plant, and without supply of emergency AC power, does not operate.

In this point of view, demand for the passive safety system with relatively high safety is on the rise. This is why the passive safety system does not require a power system nor continuous operation of the active components. However, in case the passive safety system is adopted as safety system of the containment, the concentration of radioactive material in the containment would be relatively higher due to a lower performance in containment cooling as compared with the active safety system.

Further, an exclusion area boundary (EAB) is set for the public safety to restrict the public access in preparation for an accident that may occur in the nuclear power plant. In case the passive safety system is applied to the nuclear power plant, the safety of nuclear power plant may be increased relatively further than the active safety system is applied, but it needs to secure a relatively broader EAB. The expansion of EAB may result in a significantly increased cost of constructing the nuclear power plant.

Accordingly, an increasing need exists for a facility for reducing radioactive materials, which allows for application of a passive safety system to enhance the safety of nuclear power plant by resolving the problem of an expanding EAB.

SUMMARY OF THE INVENTION

Therefore, an aspect of the detailed description is to provide a facility for reducing radioactive material in a containment, which may contribute to increasing safety of a nuclear power plant. In particular, an aspect of the detailed description proposes a facility for reducing radioactive material, which may reduce the concentration of radioactive material that is discharged in the containment when an accident occurs in the nuclear power plant.

Another aspect of the detailed description is to provide a facility for reducing radioactive material which is configured to suppress an increase in the number of valves that may occur due to an introduction thereof and to prevent re-volatilization of radioactive material and a nuclear power plant having the same.

Still another aspect of the detailed description is to provide a facility for reducing radioactive material, which may resolve the problem of an increasing EAB that may be caused as a passive safety system is adopted in a nuclear power plant and a nuclear power plant having the same.

To achieve these and other advantages and in accordance with the purpose of this specification, as embodied and broadly described herein, there is provided a facility for reducing radioactive material. The facility comprises a cooling water storage unit installed inside a containment and formed to store cooling water; a boundary unit forming a boundary of radioactive material inside the containment and surrounding a reactor coolant system installed inside the containment to prevent a radioactive material from releasing from the reactor coolant system or a pipe connected with the reactor coolant system to the containment; a connecting pipe connected with an inner space of the boundary unit and the cooling water storage unit to guide a flow of a fluid caused by a pressure difference between the boundary unit and the cooling water storage unit from the boundary unit to the cooling water storage unit; and a sparging unit disposed to be submerged in the cooling water stored in the cooling water storage unit and connected with the connecting pipe to sparge the fluid that has passed through the connecting pipe and the radioactive material contained in the fluid to the cooling water storage unit.

According to an embodiment of the present invention, the cooling water storage unit may include an inlet through which the connecting pipe passes, and the highest part of the connecting pipe may be formed at a predetermined height from a bottom of the cooling water storage unit to prevent the cooling water stored in the cooling water storage unit from flowing back to an inside of the boundary unit.

According to another embodiment of the present invention, the facility may further comprise a check valve formed to allow for a flow only in one direction and installed at the connecting pipe to prevent the cooling water in the cooling water storage unit from flowing back to the boundary unit through the connecting pipe.

To achieve these and other advantages and in accordance with the purpose of this specification, as embodied and broadly described herein, there is provided a facility for reducing radioactive material. The facility comprises a boundary unit forming a boundary of a radioactive material inside a containment and surrounding a reactor coolant system installed inside the containment to prevent the radioactive material from releasing from the reactor coolant system or a pipe connected with the reactor coolant system to the containment; a discharging unit installed at the boundary of the radioactive material to form a fluid path that runs from the boundary unit to the containment and configured to guide a flow of a fluid caused by a pressure difference between the containment and the boundary unit from the containment to the boundary unit through the fluid path; and a filter facility installed in the fluid path of the discharging unit to capture the radioactive material contained in the fluid passing through the discharging unit in the boundary unit.

According to an embodiment of the present invention, at least a portion of the boundary unit may be expanded to a region adjacent to the containment while surrounding a penetration pipe penetrating the containment to prevent a loss-of-coolant accident from occurring due to breakage of the penetration pipe in a region between the containment and the boundary unit.

According to another embodiment of the present invention, the boundary unit may form a sealing structure around the reactor coolant system to prevent release of the radioactive material.

According to another embodiment of the present invention, at least a portion of the boundary unit may be formed by a concrete structure inside the containment or a coating member installed on the concrete structure.

According to another embodiment of the present invention, the boundary unit may comprise a barrier formed to surround the reactor coolant system; and a cover formed to cover an upper part of the reactor coolant system and coupled with the barrier.

According to another embodiment of the present invention, the filter facility may comprise at least one of: a filter configured to form iodic silver by reacting silver nitrate with iodine contained in the fluid and formed to remove the iodic silver from the fluid; and an absorbent configured to remove the iodine contained in the fluid through chemisorption that is performed by charcoal.

According to another embodiment of the present invention, the facility may further comprise a cooling water storage unit installed inside the containment, the cooling water storage unit formed to store cooling water for dissolving the radioactive material.

According to another embodiment of the present invention, the discharging unit may be extended from the boundary unit to an inside of the cooling water storage unit to discharge the fluid into the cooling water storage unit.

According to another embodiment of the present invention, the facility may further comprise a cooling water recollecting portion forming a fluid path that runs from the containment to the cooling water storage unit to recollect cooling water present inside the containment to the cooling water storage unit; and an opening portion formed by opening at least a portion of the cooling water storage unit to maintain pressure balance between the cooling water storage unit and an inside of the containment.

According to another embodiment of the present invention, the facility may further comprise an additive injection unit supplying an additive for maintaining a pH of cooling water to a predetermined value or more to prevent volatilization of the radioactive material dissolved in the cooling water storage unit.

According to another embodiment of the present invention, the additive injection unit may be installed at a predetermined height inside the cooling water storage unit to be submerged in the cooling water as a water level of the cooling water storage unit increases, and as the additive injection unit is submerged in the cooling water, the additive may be dissolved in the cooling water.

According to another embodiment of the present invention, the additive injection unit may be installed on a fluid path of the cooling water recollecting portion to dissolve the additive in the cooling water recollected to the cooling water recollecting portion.

According to another embodiment of the present invention, the facility may further comprise a sparging unit installed at an end of the discharging unit to be submerged in the cooling water of the cooling water storage unit and configured to sparge a fluid that has passed through the discharging unit, to condense steam and to dissolve soluble radioactive materials in the discharged air contained in the fluid.

According to another embodiment of the present invention, the sparging unit may have a flow resistance therein to induce an even distribution of the fluid into a plurality of fine fluid paths.

According to another embodiment of the present invention, the facility may further comprise a pressure balance line passing through at least a portion of the boundary unit and extended to an inside of the containment to form a fluid path of atmosphere passing through the boundary of the radioactive material, and the pressure balance line, when a pressure inside the containment is higher than a pressure inside the boundary unit, introduces atmosphere inside the containment to the inside of the boundary unit to prevent the cooling water in the cooling water storage unit from flowing back to the inside of the boundary unit.

According to another embodiment of the present invention, the facility may further comprise a check valve formed to allow for a flow only in one direction and installed at the pressure balance line to prevent the atmosphere inside the boundary unit from being discharged to the inside of the containment through the pressure balance line.

According to another embodiment of the present invention, the cooling water storage unit may be connected with a pipe forming a fluid path that runs to a safety injection line of a safety injection system to inject the cooling water stored in the cooling water storage unit to the inside of the reactor coolant system.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
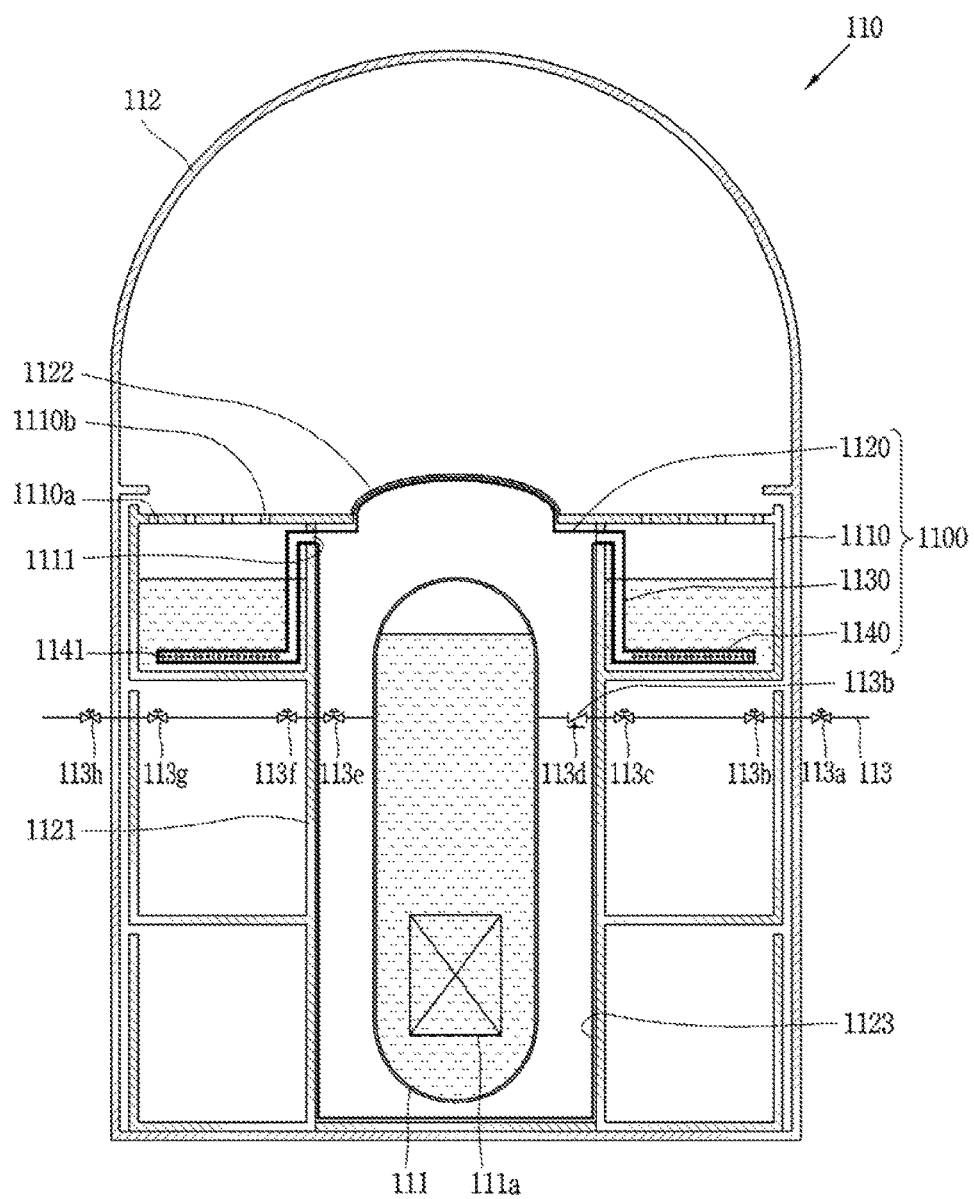
FIG. 1A is a concept view illustrating a facility for reducing radioactive material and a nuclear power plant having the same according to an embodiment of the present invention.

FIG. 1A is a concept view illustrating a facility 1100 for reducing radioactive material and a nuclear power plant 110 having the same according to an embodiment of the present invention.

The nuclear power plant 110 includes a containment 112, a reactor coolant system 111, and a core 111a. In addition to the components shown in FIG. 1A, the nuclear power plant 110 may include a reactor coolant pump, a pressurizer, a steam generator, other systems for normal operation of the nuclear power plant 110 and various systems for securing safety of the nuclear power plant 110.

The containment 112 is installed outside the reactor coolant system 111 to prevent release of radioactive material. The containment 112 serves as a final barrier to prevent the radioactive material from releasing from the nuclear power plant 110 to the external environment. Containments 112 may be classified into a containment building (or also referred to as a reactor building) formed of reinforced concrete, a containment vessel formed of steel, and a safeguard vessel formed of steel depending on the material constituting the pressure boundary. The containment vessel is a large vessel designed to have a low pressure like the containment building, and the safeguard vessel is a small vessel designed to have a small size and having the higher design pressure. Unless mentioned otherwise, as used herein, the term "containment 112" includes all of the containment building, the reactor building, the containment vessel, and the safeguard vessel.

The reactor coolant system 111 is installed in the containment 112. The reactor coolant system 111 is a coolant system that delivers and conveys heat energy generated by nuclear fission of fuel in the core 111a. A primary fluid fills the inside of the reactor coolant system 111. When an accident, such as a loss of coolant accident, occurs, steam may be discharged from the reactor coolant system 111 to an atmosphere of the containment 112, and an isolation system of the containment 112 shuts off the external release of the atmosphere and the radioactive material contained in the atmosphere.

A reactor coolant pump (not shown) induces the circulation of the primary fluid, and a pressurizer (not shown) maintains a pressurized state that exceeds a saturated pressure in order to control the pressure of the coolant at normal plant operation.

The facility 1100 for reducing radioactive material is installed inside the containment 112. The facility 1100 for reducing radioactive material is configured to sparge into the cooling water, i) steam discharged from the reactor coolant system 111 installed in the containment 112 or a pipe 113 connected with the reactor coolant system 111 when an accident occurs, ii) an atmosphere in a boundary unit 1120, and iii) radioactive material contained in the steam and the air. The facility 1100 for reducing radioactive material includes a cooling water storage unit 1110, a boundary unit 1120, a connecting pipe 1130, and a sparging unit 1140.

The cooling water storage unit 1110 is installed in the containment 112. The cooling water storage unit 1110 is formed to store cooling water dissolving the radioactive material therein. The cooling water storage unit 1110 may be configured as a tank or pool.

The cooling water storage unit 1110 may be shared by the cooling water storage unit 1110 and other systems of the nuclear power plant 110. For example, the facility 1100 for reducing radioactive material and a passive safety injection system (not shown) and a passive residual heat removal system (not shown) share the cooling water storage unit 1110.

The cooling water storage unit 1110 may be installed at an upper side or lower side of the containment 112. The cooling water storage unit 1110 may be installed at an upper side of the containment 112 to receive cooling water that is condensed and falls in the containment 112 as shown in FIG. 1A. In case a containment spray system (not shown) is installed in the nuclear power plant 110, the cooling water storage unit 1110 may be installed at an upper side or lower side of the containment 112 to receive the sprayed cooling water.

A cooling water recollecting portion 1110a and an opening portion 1110b may be installed in the cooling water storage unit 1110. The cooling water recollecting portion 1110a forms a fluid path that runs from the containment 112 to the cooling water storage unit 1110 to recollect the condensed water generated in the containment 112 to the cooling water storage unit 1110. The opening portion 1110b is formed as at least a portion of the cooling water storage unit 1110 is opened to maintain the pressure balance between the cooling water storage unit 1110 and the containment 112. The cooling water recollecting portion 1110a and the opening portion 1110b may share the same fluid path.

The cooling water storage unit 1110 has an inlet 1111 through which the connecting pipe 1130 passes. The highest part of the connecting pipe 1130 may be formed at a predetermined height from the bottom of the cooling water storage unit 1110 to prevent backflow of the cooling water retained in the cooling water storage unit 1110.

The boundary unit 1120 is installed between the reactor coolant system 111 and the containment 112 to form a radioactive material boundary. The boundary unit 1120 surrounds the reactor coolant system 111 to prevent radioactive material from releasing from the reactor coolant system 111 or pipe 113 connected with the reactor coolant system 111 to the containment 112.

The boundary unit 1120 forms a sealing structure around the reactor coolant system 111 to prevent the radioactive material from releasing along a path other than the connecting pipe 1130. The boundary unit 1120 is designed to have a design pressure that may withstand the pressure of a head difference or more between the cooling water storage unit 1110 and the sparging unit 1140. At least a portion of the boundary unit 1120 may be formed by a concrete structure inside the containment 112 and a coating member (1123) such as a steel liner et. al. installed on the concrete structure.

The boundary unit 1120 may include a barrier 1121 formed to surround the periphery of the reactor coolant system 111 and a cover 1122 formed to cover an upper part of the reactor coolant system 111 and may form a sealing structure around the reactor coolant system 111 by i) the bottom surface or dual bottom surface of the containment 112, ii) the barrier 1121, and iii) the cover 1122.

The connecting pipe 1130 is connected with an inner space of the boundary unit 1120 and the cooling water storage unit 1110 to guide a flow of the fluid generated by a pressure difference between the boundary unit 1120 and the cooling water storage unit 1110 from the boundary unit to the cooling water storage unit 1110. The connecting pipe 1130 forms a fluid path that runs from an inner space of the boundary unit 1120 to the cooling water storage unit 1110. If the pressure in the boundary unit 1120 is larger than the pressure in the cooling water storage unit 1110, the fluid in the boundary unit 1120 flows through the fluid path of the connecting pipe 1130 to the cooling water storage unit 1110.

The cooling water storage unit 1110 has an inlet 1111 that allows the connecting pipe 1130 to pass therethrough. The connecting pipe 1130 extends through the inlet 1111 of the cooling water storage unit 1110 to the inside of the cooling water storage unit 1110 to form a fluid path that runs to the sparging unit 1140 and is connected with the sparging unit 1140. The atmosphere (steam and air) and radioactive material in the boundary unit 1120 are delivered to the sparging unit 1140 through the connecting pipe 1130.

The sparging unit 1140 is disposed to be submerged in the cooling water contained in the cooling water storage unit 1110 and is connected with the connecting pipe 1130 to sparge the fluid that has passed through the connecting pipe 1130 and the radioactive material contained in the fluid to the cooling water storage unit 1110.

The sparging unit 1140 may have a plurality of sparging holes 1141 formed to sparge the fluid and radioactive material finely. The sparging unit 1140 may have a plurality of fine fluid paths (not shown) that run the plurality of sparging holes 1141. The sparging unit 1140 may have a flow resistance therein, to allow the fluid to be evenly distributed through the plurality of fine fluid paths.

The nuclear power plant 110 may include pipes 113 for connecting the systems operated as the nuclear power plant 110 is in normal operation, other than the facility 1100 for reducing radioactive material, to the reactor coolant system 111. The pipe 113 may pass through the containment 112 and the boundary unit 1120 of the facility 1100 for reducing radioactive material. The pipe 113 may have a plurality of isolation valves 113a, 113b, 113c, 113e, 113f, 113g, and 113h or a check valve 13d arranged to be spaced apart from each other to close both sides of a broken line when a break occurs.

The facility 1100 for reducing radioactive material, contrary to when double containments 112 are installed, does not form a high-pressure boundary with the containment 112, thus minimizing an increase in the economical expense due to added facilities. The facility 1100 for reducing radioactive material is a low-pressure facility.

Hereinafter, the operations of the facility 1100 for reducing radioactive material when the nuclear power plant 110 is in normal operation and when an accident occurs are described with reference to FIGS. 1B to 1F.

Figure 1B:
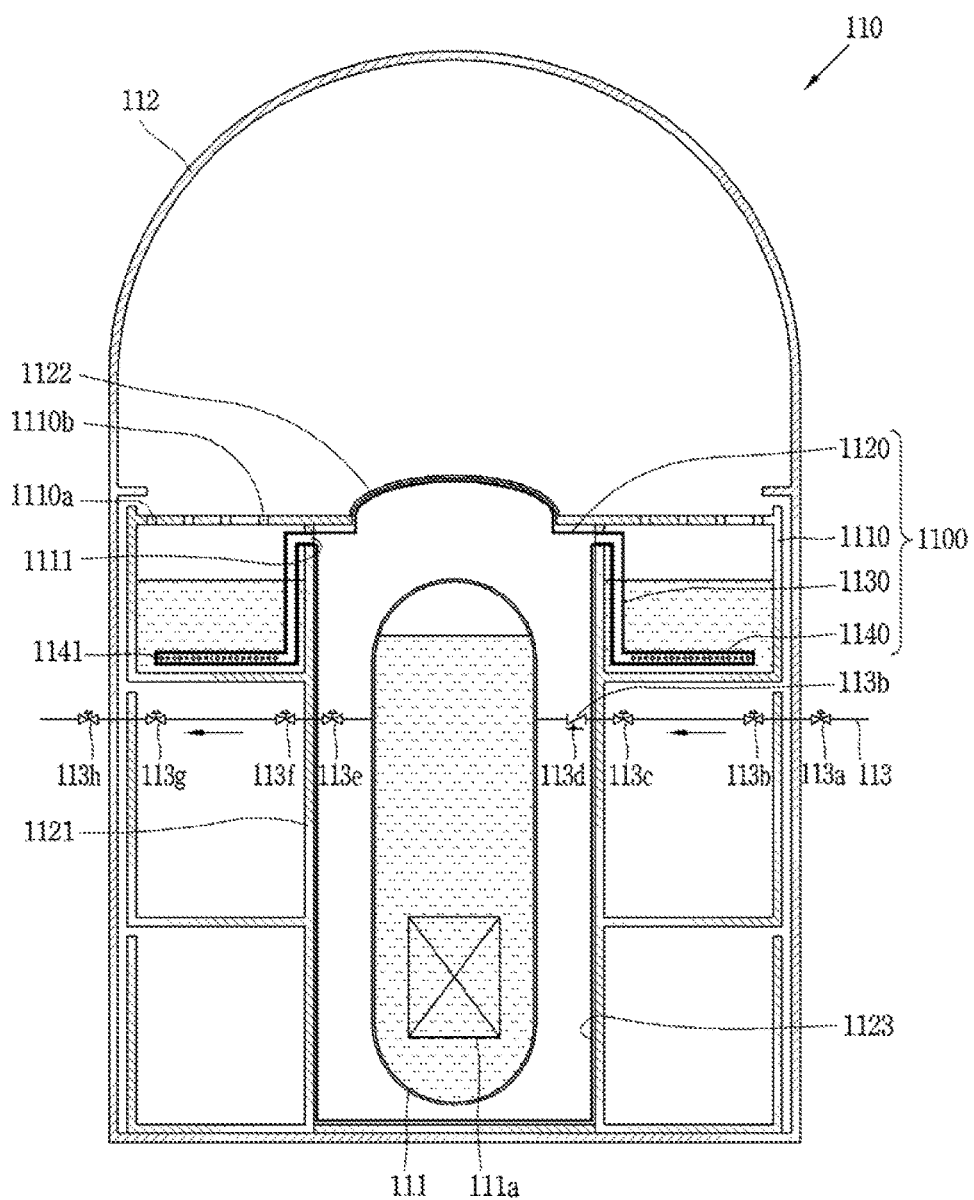
FIG. 1B is a concept view illustrating the normal operation state of the nuclear power plant shown in FIG. 1A.

FIG. 1B is a concept view illustrating a normal operation state of the nuclear power plant 110 shown in FIG. 1A.

When the nuclear power plant 110 is in normal operation, the isolation valves 113a, 113b, 113c, 113e, 113f, 113g, and 113h installed on the pipe 113 connecting the systems (not shown) for normal operation of the nuclear power plant 110 with the reactor coolant system 111 may remain opened. The fluids circulating for normal operation of the nuclear power plant 110 may flow through the pipe 113.

The facility 1100 for reducing radioactive material is a facility passively operated by a pressure difference formed between the boundary unit 1120 and the cooling water storage unit 1110, and since there is little pressure difference between the boundary unit 1120 and the cooling water storage unit 1110 when the nuclear power plant 110 is in normal operation, the facility 1100 for reducing radioactive material remains in the standby state.

Hereinafter, the operations of the facility 1100 for reducing radioactive material i) when pipe breakage occurs in the facility 1100 for reducing radioactive material and ii) when pipe breakage occurs between the facility 1100 for reducing radioactive material and the containment 112 are described separately from each other.

Figure 1C:
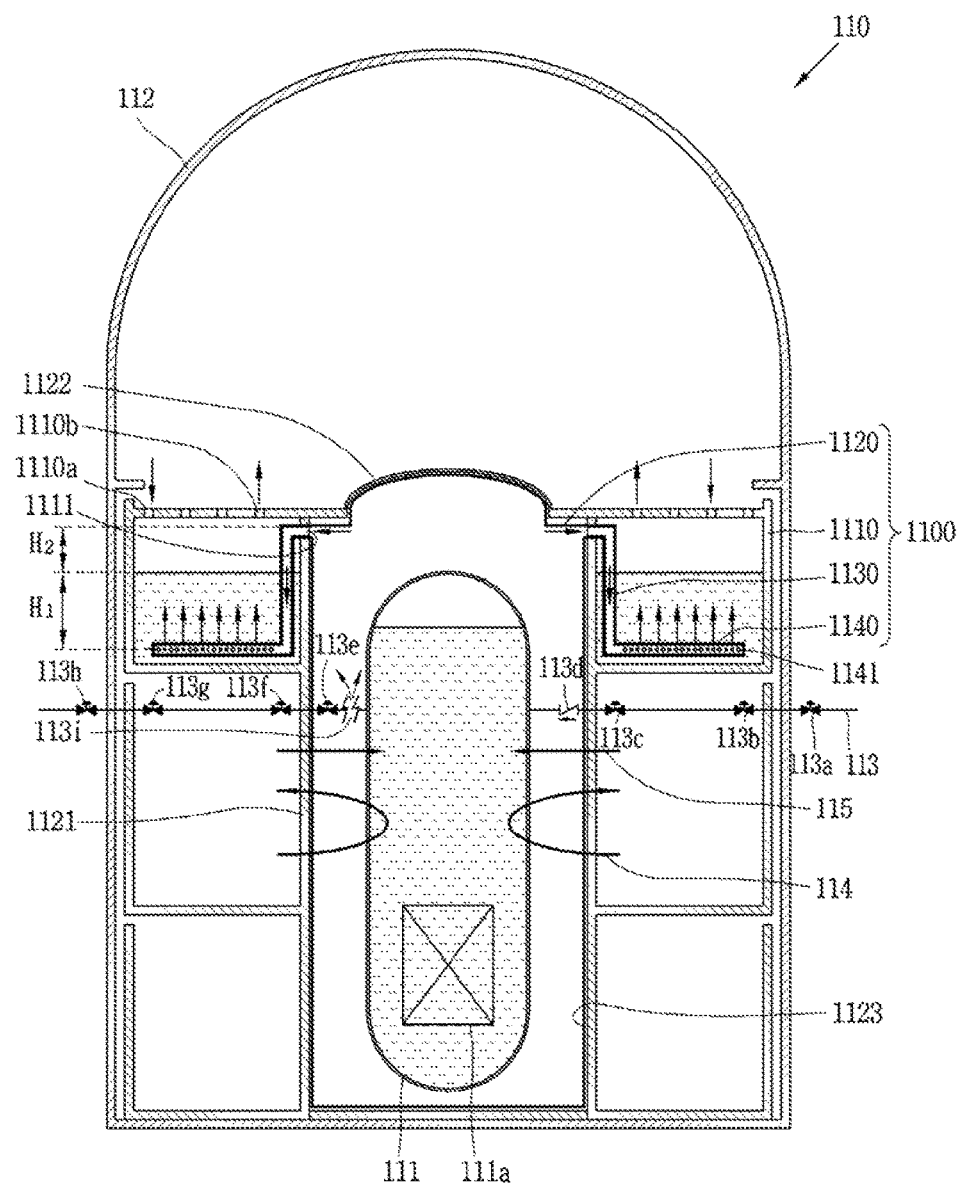
FIG. 1C is a concept view illustrating the operation of the facility for reducing radioactive material when an accident occurs in the nuclear power plant shown in FIG. 1A.

FIG. 1C is a concept view illustrating the operation of the facility 1100 for reducing radioactive material when an accident occurs in the nuclear power plant 110 shown in FIG. 1A.

When an accident such as pipe breakage occurs in the facility 1100 for reducing radioactive material, the reactor coolant and radioactive material may be discharged through the broken line 113i to the inside of the boundary unit 1120.

When the accident occurs, the isolation valves 113a, 113b, 113c, 113e, 113f, 113g, and 113h installed on the pipe 113 passing through the boundary unit 1120 are closed by a related signal. In case a check valve 113d forming a fluid path is installed towards the reactor coolant system 111, the flow in an opposite direction is shut off, and the facility 1100 for reducing radioactive material maintains the sealing structure. The isolation valves 113a, 113b, 113c, 113e, 113f, 113g, and 113h may share the operation signal, and thus, the facility 1100 for reducing radioactive material may be operated even without a separate signal.

The nuclear power plant 110 may include a passive residual heat removing system 114 to remove sensible heat in the reactor coolant system 111 and residual heat of the core 111a and a passive safety injection system 15 to inject cooling water to the inside of the reactor coolant system 111 to maintain the water level of the reactor coolant system 111. The passive residual heat removing system 114 and the passive safety injection system 115 start their operation to secure safety of the nuclear power plant 110 when an accident occurs like the facility 1100 for reducing radioactive material.

If steam is discharged from the broken line 113i, the radioactive material, together with the steam, is discharged into the boundary unit 1120, and the pressure inside the boundary unit 1120 gradually increases. As the pressure inside the boundary unit 1120 increases, a pressure difference of H1 or more is generated between the boundary unit 1120 and the cooling water storage unit 1110, and the fluid is rendered to flow by the pressure difference from the boundary unit 1120, which has a relatively high pressure, to the cooling water storage unit 1110, which has a relatively low pressure.

The connecting pipe 1130 guides the flow caused by the pressure difference to the inside of the cooling water storage unit 1110, and the fluid (steam, air, and radioactive material) that has passed through the cooling water storage unit 1110 is sparged into the cooling water through the sparging unit 1140 submerged in the cooling water. Accordingly, the steam is sparged into the cooling water and is condensed, and the air is cooled to go up. The soluble radioactive material is dissolved in the cooling water and is collected in the cooling water storage unit 1110.

As the steam is condensed and the radioactive material is collected into the cooling water, a limited amount of the radioactive material discharged from the broken line 113i is discharged to the containment 112. A small amount of radioactive material discharged to the inside of the containment 112 is suppressed from releasing to the external environment by the containment 112.

In particular, iodine that may be spread to the external environment with the highest concentration among radioactive materials is soluble and is mostly dissolved in the cooling water. The facility 1100 for reducing radioactive material stays in operation if the amount of cooling water in the cooling water storage unit 1110 is maintained to be a predetermined value or more and the pressure difference between the facility 1100 for reducing radioactive material and the inside of the containment 112 is not less than H1.

The cooling water storage unit 1110 receives the condensed water introduced through the cooling water recollecting portion 1110a. Accordingly, the facility 1100 for reducing radioactive material may maintain the cooling water level that is required for its operation.

The sparging unit 1140 sparges the steam that may cause the pressure inside the containment 112 to increase into the cooling water storage unit 1110 and condenses the steam. Accordingly, the cooling water storage unit 1110 may suppress an increase in the pressure inside the containment 112 and may decrease the design pressure of the containment 112.

Figure 1D:
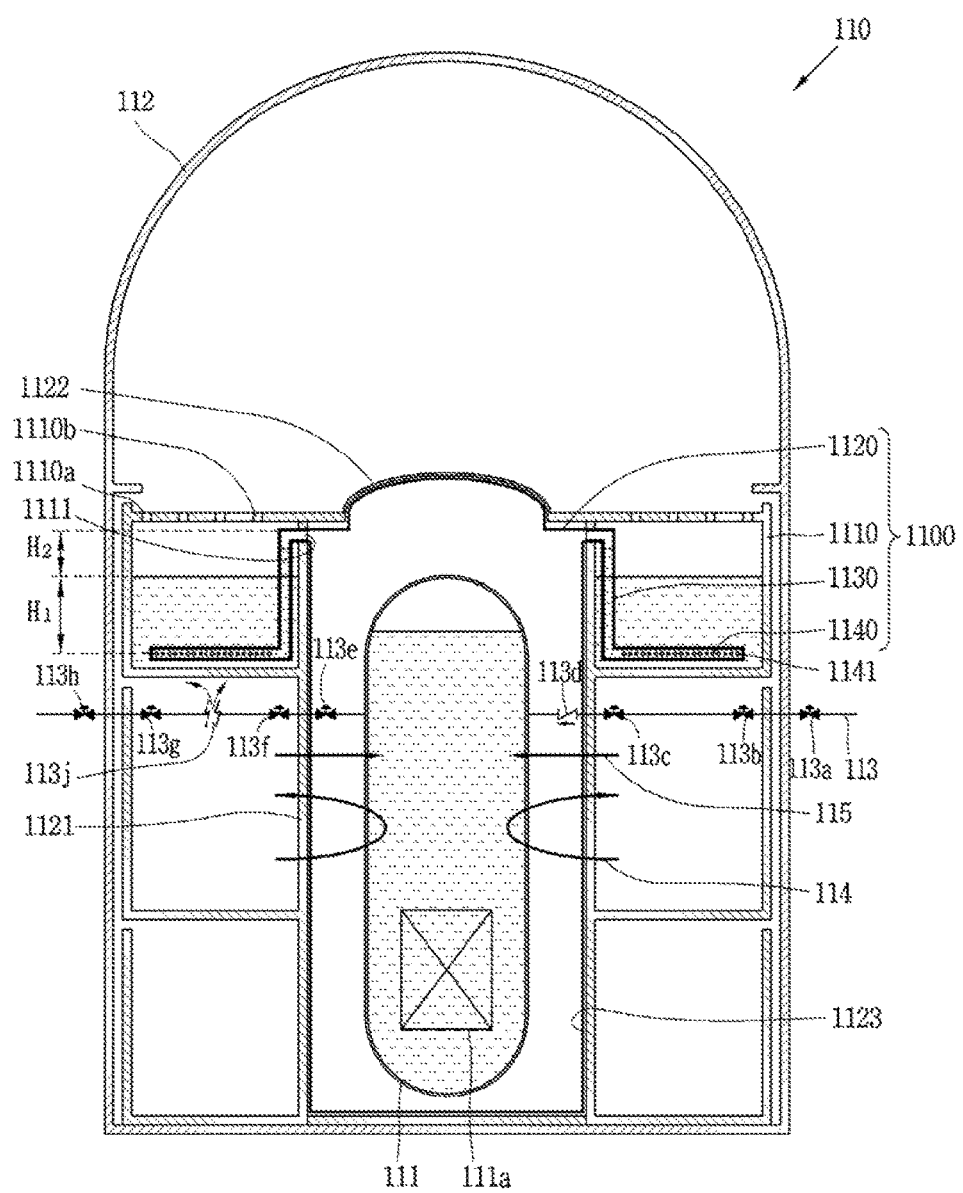
FIG. 1D is a concept view illustrating an operation state of the nuclear power plant when an accident occurs at a location different from the location shown in FIG. 1C.

FIG. 1D is a concept view illustrating a state in which a nuclear power plant 110 operates when an accident occurs at a location different from the position shown in FIG. 1C.

The pipe passing through the boundary unit 1120 may be broken in the boundary unit 1120 as described above in connection with FIG. 1C, but may be broken in a space between the containment 112 and the boundary unit 1120 as described above in connection with FIG. 1D. If pipe breakage occurs in the space between the containment 112 and the boundary unit 1120, steam is discharged from the broken line 113i to result in the pressure in the containment 112 increasing.

However, since the steam stops being discharged when all of the isolation valves 113a, 113b, 113c, 113e, 113f, 113g, and 113h and the check valve 113d are closed by a related signal, the pressure inside the containment 112 does not steadily go up. Accordingly, when an accident occurs to cause the pressure outside the facility 1100 for reducing radioactive material to increase, the accident is suppressed early.

As the pressure inside the containment 112 increases, the cooling water in the cooling water storage unit 1110 may be pressurized to cause the water level of the connecting pipe 1130 to partially go up. However, the highest part of the connecting pipe 1130 of the cooling water storage unit 1110 is formed at a predetermined height from the bottom of the cooling water storage unit 1110 so as to prevent backflow of the cooling water despite the increased pressure in the containment 112. Accordingly, in case there is no significant pressure difference between the inside of the containment 112 and the boundary unit 1120 (<H2), the cooling water retained in the cooling water storage unit 1110 does not flow back to the inside of the boundary unit 1120.

Figure 1E:
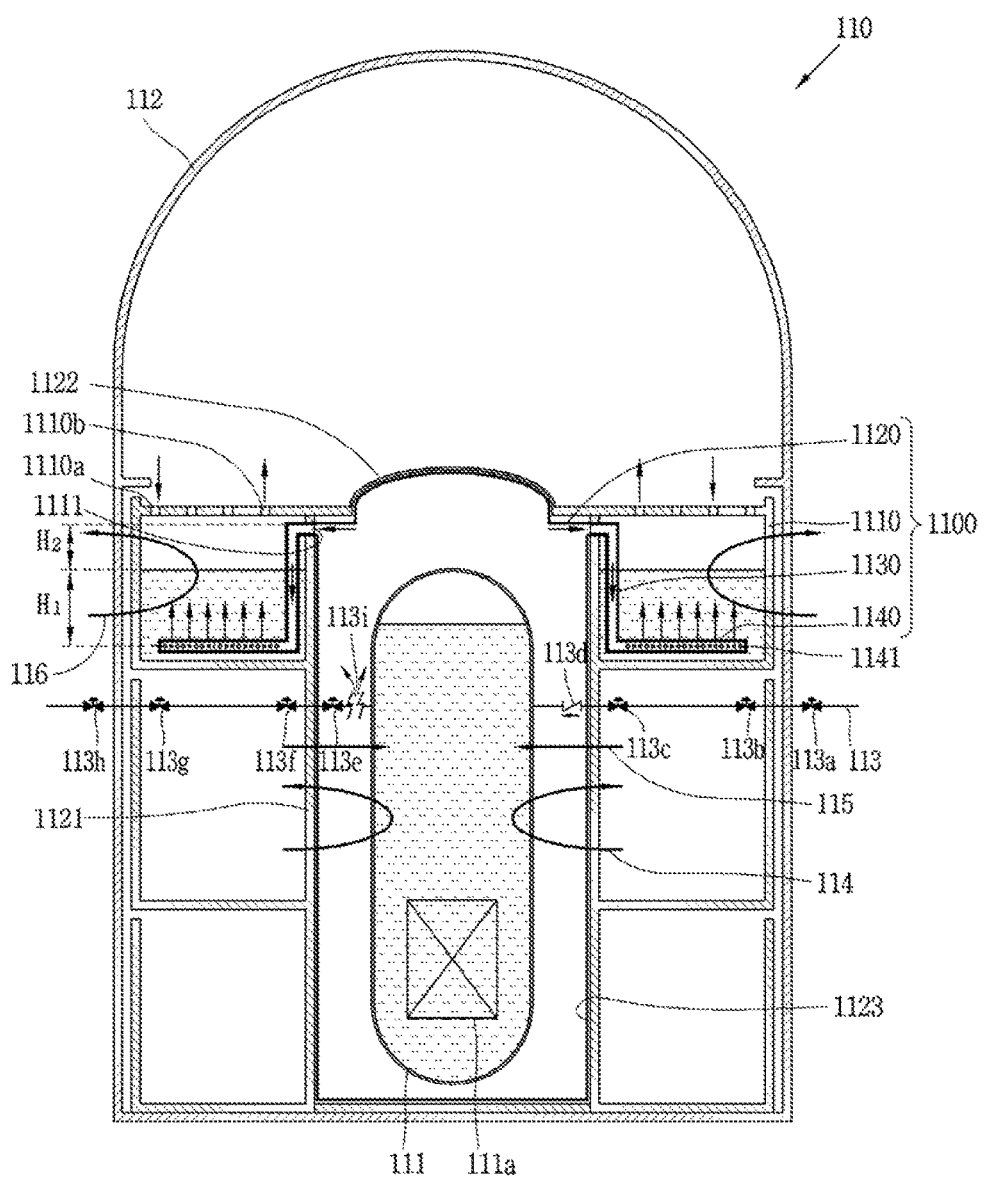
FIGS. 1E and 1F are concept views illustrating a passive safety system other than the facility for reducing radioactive material.
Figure 1F:
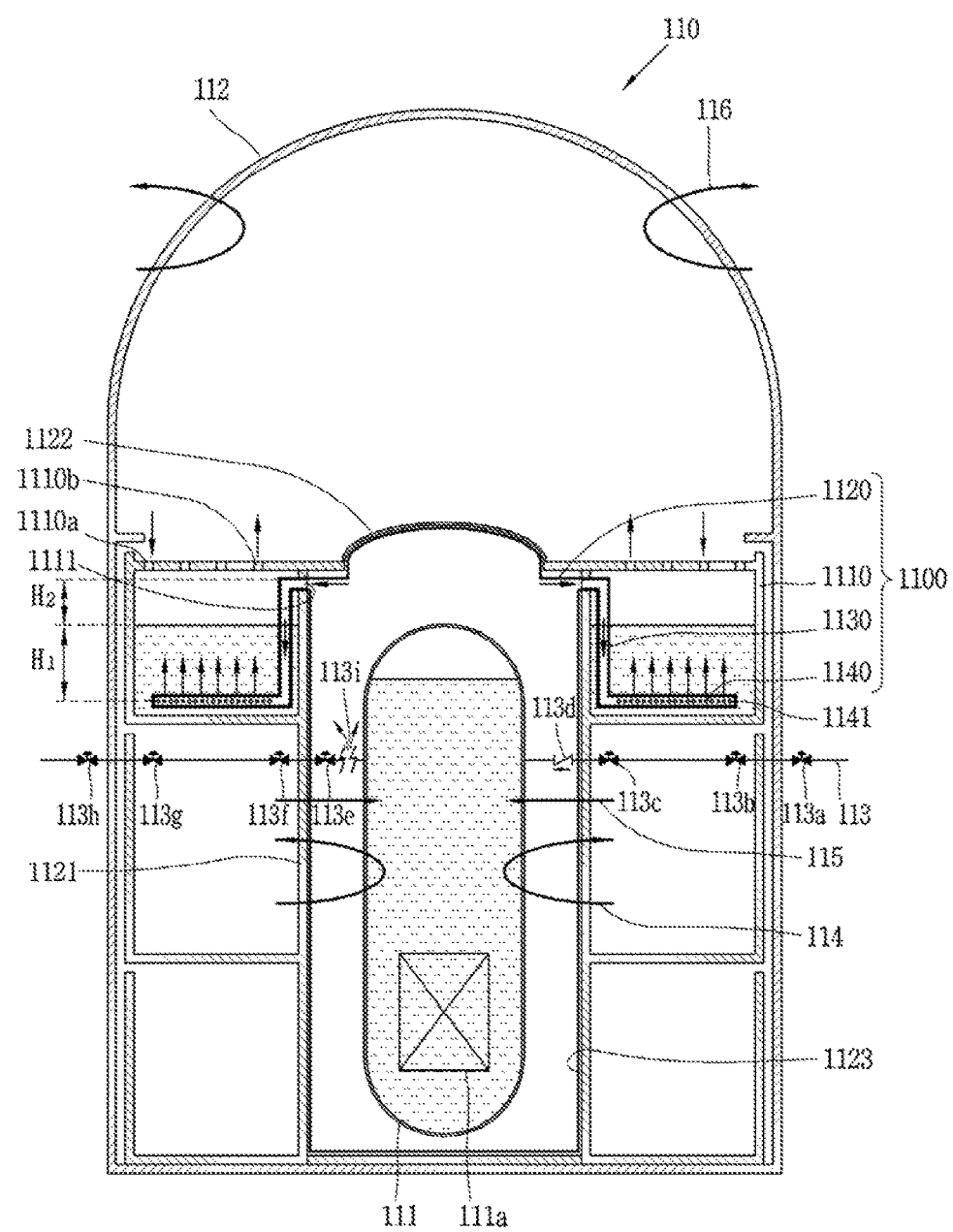

FIGS. 1E and 1F are concept views illustrating a nuclear power plant 110 including passive safety systems other than a facility 1100 for reducing radioactive material.

The nuclear power plant 110 includes a passive containment cooling system 116 that reduces pressure inside the containment 112 through cooling. The passive containment cooling system 116 has a heat exchanger (not shown). The cooling fluid passing through the heat exchanger exchanges heat with the fluid inside the containment 112. Accordingly, heat is delivered from the inside of the containment 112 to the cooling fluid, and the cooling fluid is discharged to the outside along the fluid path connected with the heat exchanger. Such process is repeated to suppress the increasing pressure inside the containment 112.

Referring to FIG. 1E, the heat exchanger (not shown) provided in the passive containment cooling system 116 may be installed inside the cooling water storage unit 1110. If the cooling fluid passing through the heat exchanger exchanges heat with the atmosphere or cooling water and/or atmosphere inside the cooling water storage unit 1110, the cooling water storage unit 1110 is cooled. Since the cooling water storage unit 1110 and the inside of the containment 112 are formed to communicate with each other through the cooling water recollecting portion 1110a or opening portion 1110b, cooling the cooling water storage unit 1110 leads to the containment 112 being cooled, and the increasing pressure inside the containment 112 may be suppressed.

Referring to FIG. 1F, the heat exchanger (not shown) provided in the passive containment cooling system 116 may be installed at an upper side of the containment 112. The cooling fluid flowing through the inner fluid path of the heat exchanger exchanges heat with the atmosphere inside the containment 112.

If the facility 1100 for reducing radioactive material and the passive containment cooling system 116 are both adopted in the nuclear power plant 110, the steam discharged to the inside of the containment 112 is cooled and condensed by the passive containment cooling system 116. Since the condensed water formed as the steam is condensed may be recollected to the cooling water storage unit 1110, the water in the cooling water storage unit 1110 may be maintained at a proper level or more.

Another embodiment of the present invention is now described.

Figure 2:
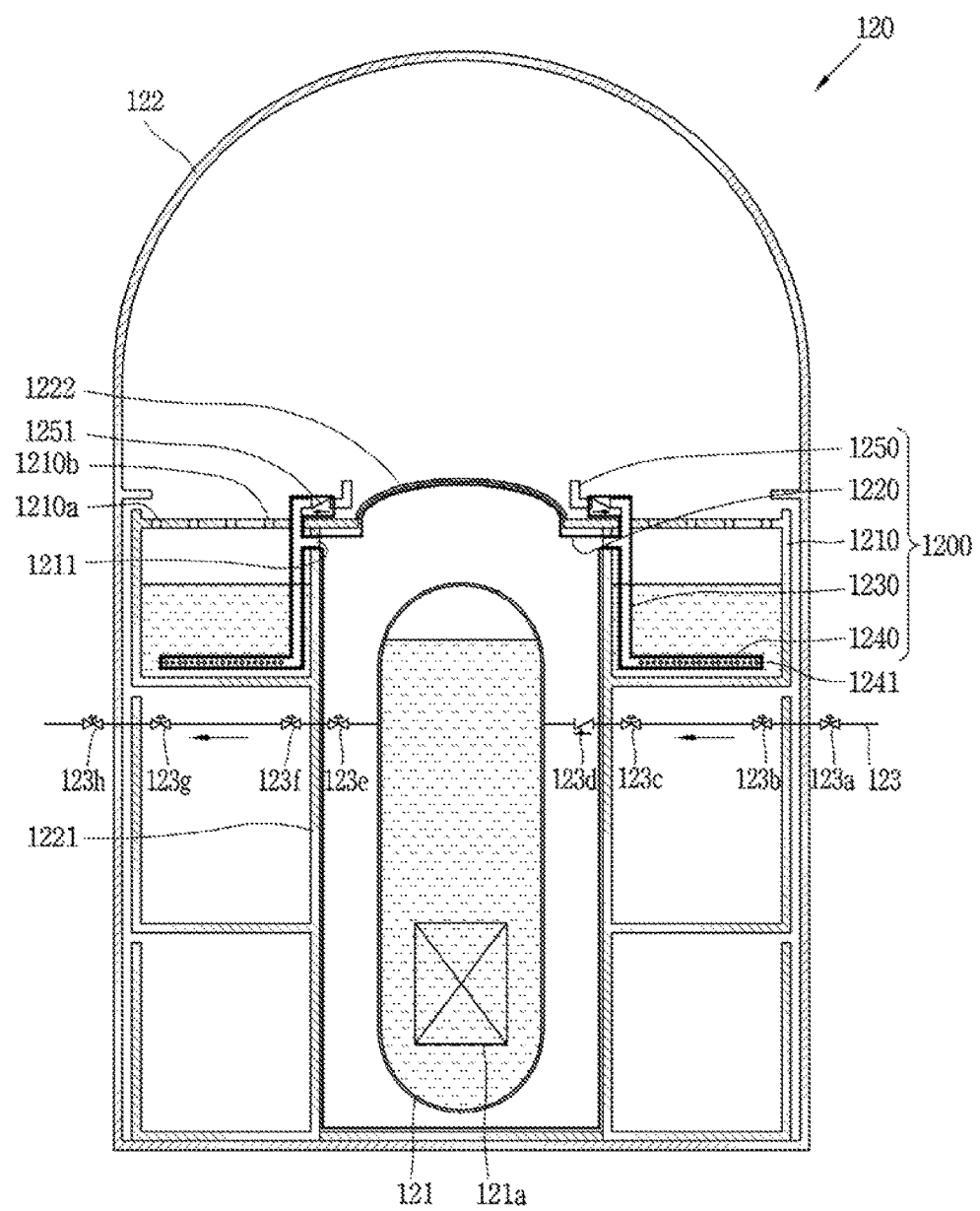
FIG. 2 is a concept view illustrating a facility for reducing radioactive material and a nuclear power plant having the same according to another embodiment of the present invention.

FIG. 2 is a concept view illustrating a facility 1200 for reducing radioactive material and a nuclear power plant 120 having the same according to another embodiment of the present invention.

The facility 1200 for reducing radioactive material includes a cooling water storage unit 1110, a boundary unit 1120, a sparging unit 1140, and a pressure balance line 1250. The description of the cooling water storage unit 1210, the boundary unit 1220, the connecting pipe 1230, and the sparging unit 1240 is not repeated and replaced with the above description thereof.

The boundary unit 1220 forms a boundary of radioactive material. The pressure balance line 1250 passes through at least a portion of the boundary unit 1220 to form a flow path of atmosphere passing through the boundary of radioactive material and extends to the inside of the containment 122.

The pressure balance line 1250, in case the pressure inside the containment 122 is higher than the pressure inside the boundary unit 1220, introduces the atmosphere inside the containment 122 to the inside of the boundary unit 1220. By doing so, the pressure balance line 1250 prevents backflow of the cooling water in the cooling water storage unit 1210 to the inside of the boundary unit 1220. The inflow of atmosphere through the pressure balance line 1250 is passively made by the pressure difference between the containment 122 and the boundary unit 1220.

The pressure balance line 1250 may be split from the connecting pipe 1230 as shown in FIG. 2. The pressure balance line 1250 may pass through an upper side of the cooling water storage unit 1210 and may extend to the inside of the containment 122. The atmosphere inside the containment 122 is introduced to the inside of the boundary unit 1220 through the pressure balance line 1250. Since the pressure balance line 1250 suppresses an increase in the pressure difference in an opposite direction of the boundary unit 1220, the mechanical integrity of the boundary unit 1220 may be more safely maintained.

The check valve 1251 is installed in the pressure balance line 1250. The check valve 1251 is formed to allow for a flow only in one direction. The check valve 1251 prevents the atmosphere inside the boundary unit 1220 from being discharged to the inside of the containment 122 through the pressure balance line 1250. According to the conditions of accident, the pressure inside the boundary unit 1220 may be higher than the pressure inside the containment 122. In such case, the atmosphere inside the boundary unit 1220 may be discharged to the inside of the containment 122 through the pressure balance line 1250 to lose the unique functions of the facility 1200 for reducing radioactive material. The check valve 1251 cuts off the flow to the pressure balance line 1250 to thus prevent the atmosphere inside the boundary unit 1220 from being discharged to the inside of the containment 122.

Figure 3:
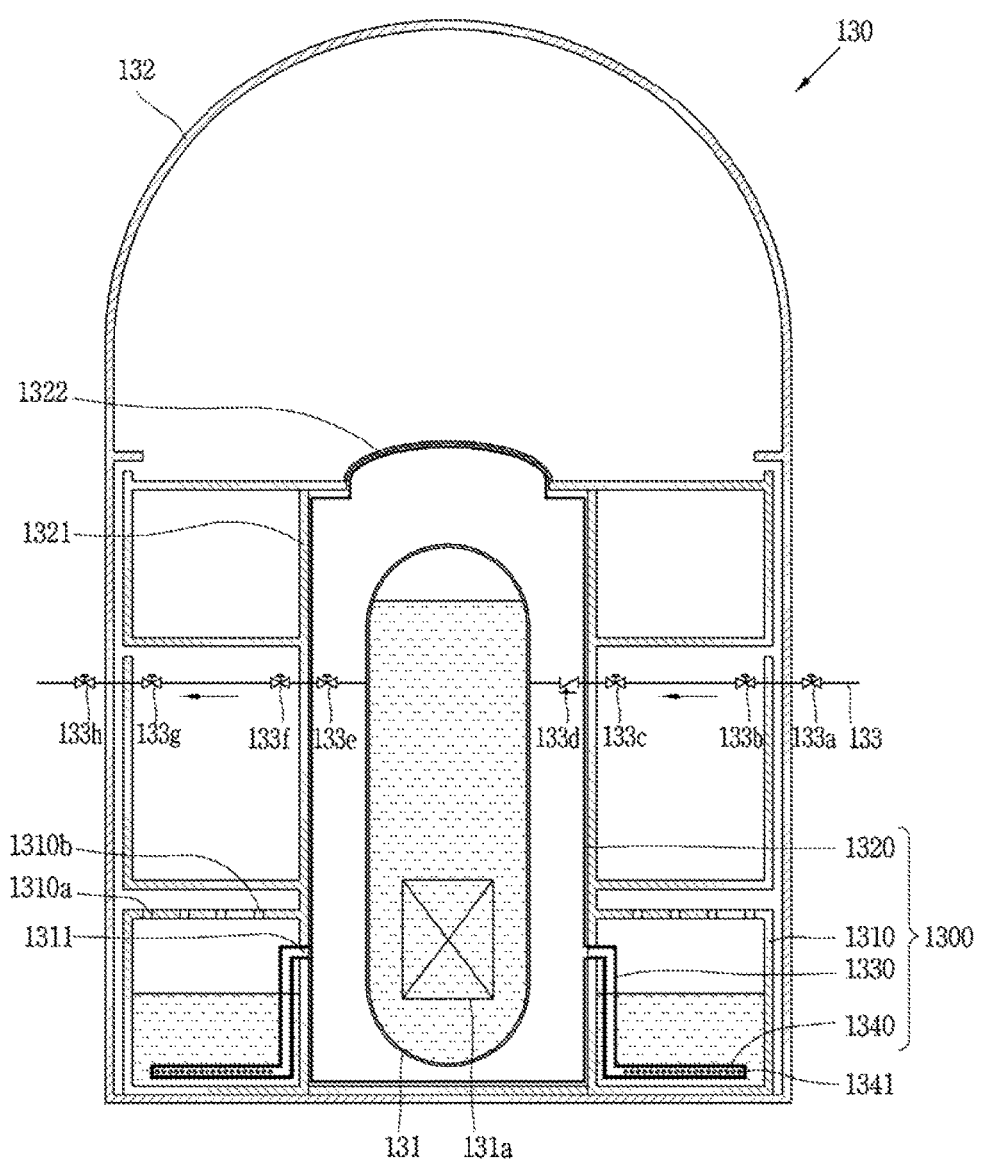
FIG. 3 is a concept view illustrating a facility for reducing radioactive material and a nuclear power plant having the same according to still another embodiment of the present invention.

FIG. 3 is a concept view illustrating a facility 1100 for reducing radioactive material and a nuclear power plant 130 having the same according to still another embodiment of the present invention.

The facility 1300 for reducing radioactive material includes a cooling water storage unit 1310, a boundary unit 1320, a connecting pipe 1330, and a sparging unit 1340. The description of the similar components is not repeated and replaced with the above description thereof.

The cooling water storage unit 1310 of the facility 1300 for reducing radioactive material may be installed at a lower region in the inner space of the containment 132. The cooling water storage unit 1310 has a cooling water recollecting portion 1310*a* and an opening portion 1310*b*. A space is formed between the outer wall of the containment 132 and the inner structure of the containment 132. The fluid inside the containment 132 may flow to the cooling water storage unit 1310 through the space between the outer wall and the structure, the cooling water recollecting portion 1310*a*, and the opening portion 1310*b*. Likewise, the fluid inside the cooling water storage unit 1310 may flow to the inside of the containment 132 through the cooling water recollecting portion 1310*a*, the opening portion 1310*b*, and the space between the outer wall and the structure.

Comparison between the facility 1100 for reducing radioactive material shown in FIG. 1A and the facility 1300 for reducing radioactive material shown in FIG. 3 shows that the positions where the cooling water storage units 1110 and 1310 are installed may vary depending on the requirements for the internal design of the containments 112 and 132. Even when the positions where the cooling water storage units 1110 and 1310 are installed differently, the facilities 1100 and 1300 for reducing radioactive material may be configured to not cause a deterioration of their functions.

Figure 4:
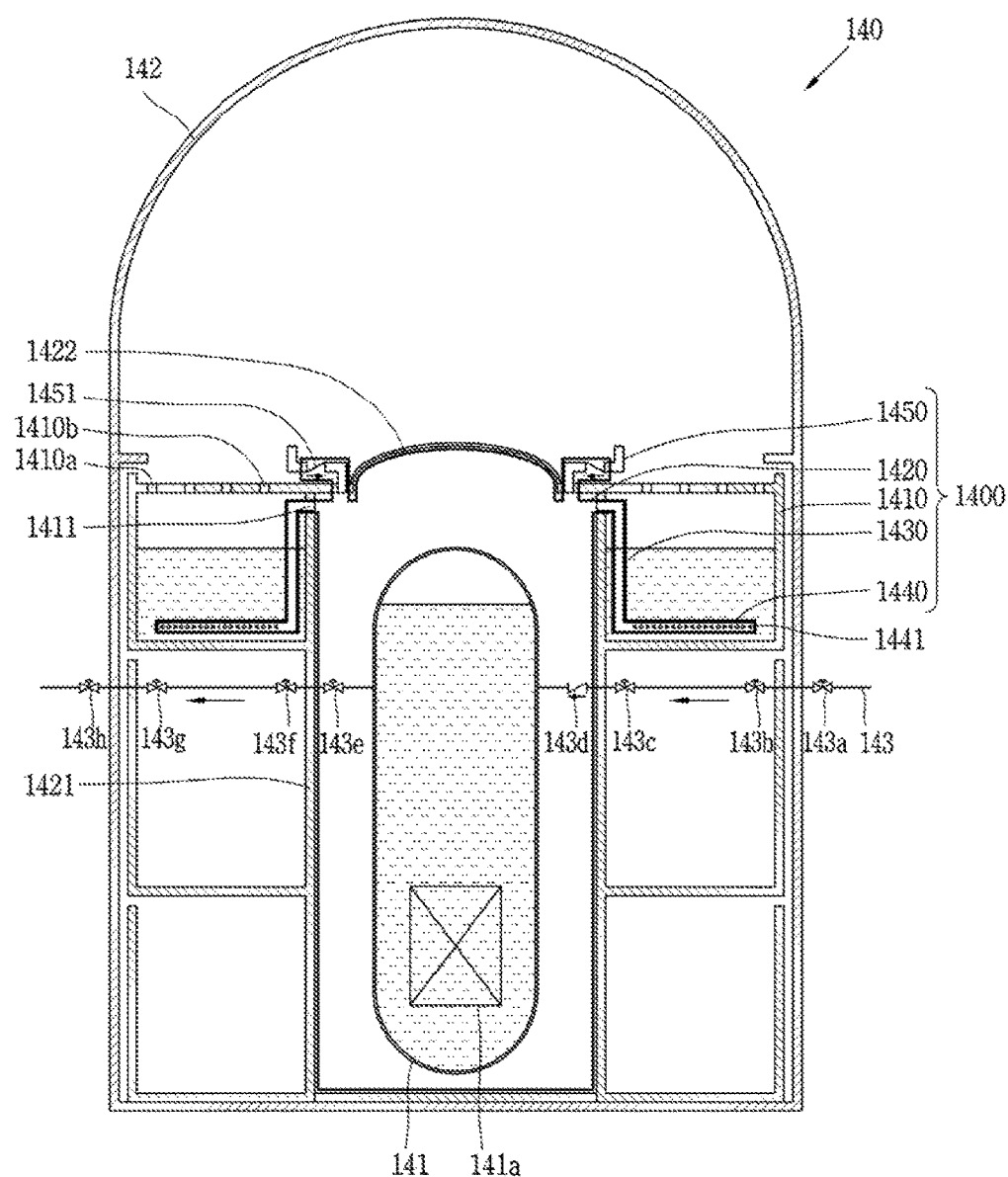
FIG. 4 is a concept view illustrating a facility for reducing radioactive material and a nuclear power plant having the same according to yet still another embodiment of the present invention.

FIG. 4 is a concept view illustrating a facility 1400 for reducing radioactive material and a nuclear power plant 140 having the same according to still another embodiment of the present invention.

The facility 1400 for reducing radioactive material includes a cooling water storage unit 1410, a boundary unit 1420, a connecting pipe 1430, a sparging unit 1440, and a pressure balance line 1450.

Unlike the facility 1200 for reducing radioactive material shown in FIG. 2, the pressure balance line 1450 is not split from the connecting pipe 1430 but is formed independently. The pressure balance line 1450 passes through a boundary of the radioactive material, which is formed by the boundary unit 1420, and extends up to the inside of the containment 142. The pressure balance line 1450, in case the pressure inside the containment 142 is higher than the pressure of the boundary unit 1420, introduces atmosphere to decrease the pressure inside the containment 142. The pressure balance line 1450 prevents the cooling water in the cooling water storage unit 1410 from flowing back to the inside of the boundary unit 1420.

The pressure balance line 1450 has a check valve 1451. The check valve 1451 is formed to allow for a flow only in a direction. The check valve 1451 prevents atmosphere from being discharged from the inside of the boundary unit 1420 to the inside of the containment 142. The mechanical integrity of the boundary unit 1420 may be more safely maintained by the pressure balance line 1450 and the check valve 1451.

Figure 5:
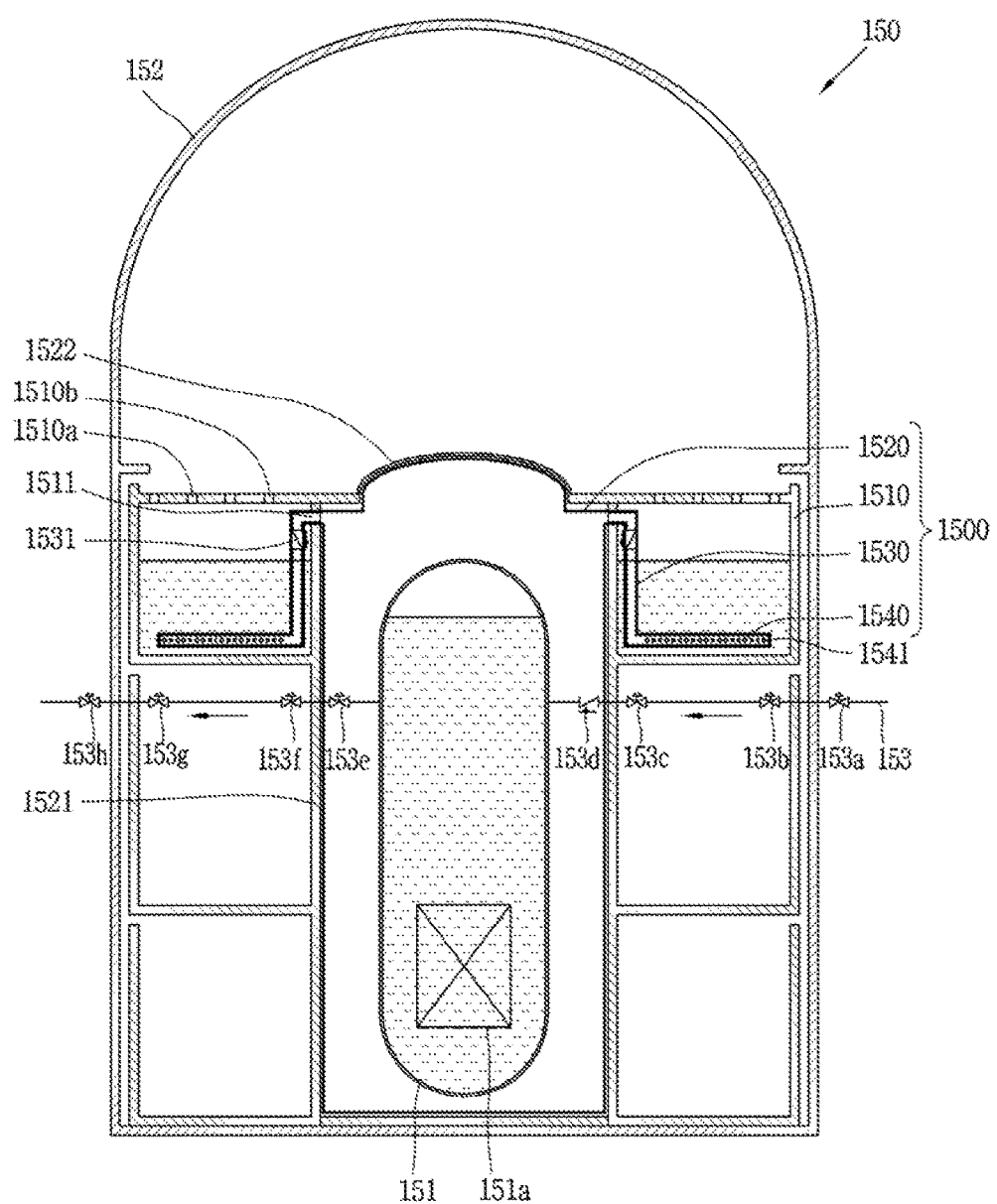
FIG. 5 is a concept view illustrating a facility for reducing radioactive material and a nuclear power plant having the same according to yet still another embodiment of the present invention.

FIG. 5 is a concept view illustrating a facility 1500 for reducing radioactive material and a nuclear power plant 150 having the same according to yet still another embodiment of the present invention.

The facility 1500 for reducing radioactive material includes a cooling water storage unit 1510, a boundary unit 1520, a connecting pipe 1530, and a sparging unit 1540.

The connecting pipe 1530 has a check valve 1531 to prevent the cooling water inside the cooling water storage unit 1510 from flowing back to the boundary unit 1520 through the connecting pipe 1530. The check valve 1531 allows for only flow that is formed from the boundary unit 1520 to the cooling water storage unit 1510 and cuts off flow in an opposite direction. Even when the pressure inside the cooling water storage unit 1510 is higher than the pressure inside the boundary unit 1520 due to an accident, the check valve 1531 may prevent the cooling water retained in the cooling water storage unit 1510 from flowing back to the boundary unit 1520.

Figure 6:
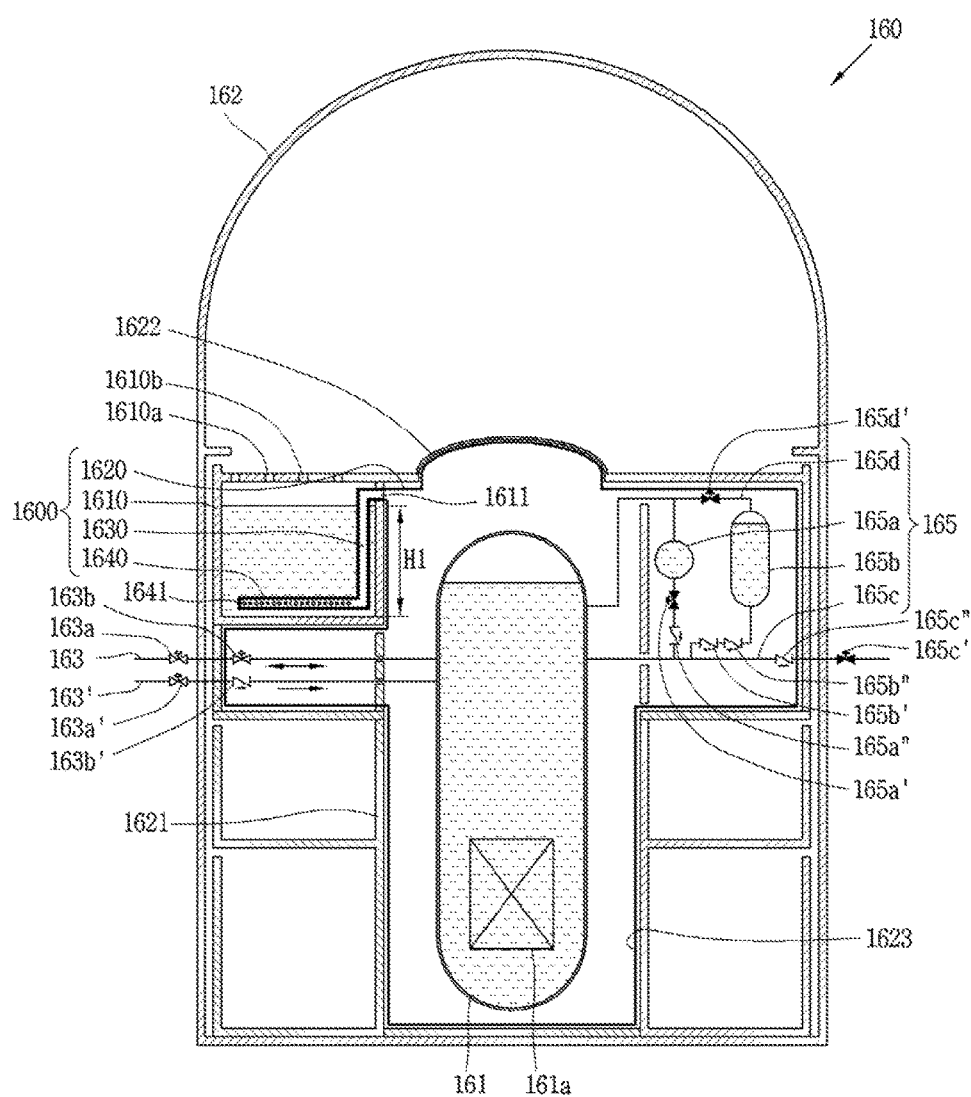
FIG. 6 is a concept view illustrating a facility for reducing radioactive material and a nuclear power plant having the same according to yet still another embodiment of the present invention.

FIG. 6 is a concept view illustrating a facility 1600 for reducing radioactive material and a nuclear power plant 160 having the same according to yet still another embodiment of the present invention.

The facility 1600 for reducing radioactive material is installed inside the containment 162, and when an accident occurs, is configured to sparge, to the cooling water storage unit 1610, the radioactive material discharged from a reactor coolant system 161 or pipes 163, 163', and 165*c* connected with the reactor coolant system 161.

The cooling water storage unit 1610 is installed inside the containment 162. The cooling water storage unit 1610 may be formed as a tank or pool to store cooling water therein. Further, as the cooling water storage unit 1610, an in-containment refueling water storage tank may be used as well. When an accident occurs, the atmosphere (steam and air) inside the boundary unit 1620 is sparged into the cooling water as the facility 1600 for reducing radioactive material operates.

The cooling water storage unit 1610 may be shared by other safety systems of the nuclear power plant 160 than the facility 1600 for reducing radioactive material. For example, the facility 1600 for reducing radioactive material and a safety injection system 165 may share the cooling water storage unit 1610. As another example, the facility 1600 for reducing radioactive material and a passive residua heat removal system (not shown) may share the cooling water storage unit 1610.

The cooling water storage unit 1610 may be installed at an upper side or lower side of an inner space of the containment 162. Condensed water may be formed inside the containment 162 and may fall. The cooling water storage unit 1610 may be installed at an upper side of the inner space of the containment 162 to collect the falling condensed water. In case the nuclear power plant 160 has a containment spray system (not shown), the cooling water storage unit 1610 may be installed at an upper or lower side of the containment 162 to receive the sprayed cooling water.

The cooling water storage unit 1610 has an inlet 1611 through which a connecting pipe 1630 to be described below passes. The highest part of the connecting pipe 1630 may be formed at a predetermined height from the bottom of the cooling water storage unit 1610 to prevent backflow of the cooling water retained in the cooling water storage unit 1610.

The boundary unit 1620 is installed between the reactor coolant system 161 and the containment 162 to form a boundary of the radioactive material. The boundary unit 1620 surrounds the reactor coolant system 161 to prevent release of the radioactive material from the pipes 163, 163', and 165c connected with the reactor coolant system 161 to the containment 162.

The boundary unit 1620 forms a sealing structure around the reactor coolant system 161 to prevent release of the radioactive material along a path other than the connecting pipe 1630 to be described below. The pipes 163, 163', and 165c passing through the boundary unit 1620 has isolation valves 163a, 163b, 163a', and 165c' and check valves 163b', 163b", 165c". The isolation valves 163a, 163b, 163a', and 165c' and the check valves 163b', 163b", 165c" are closed when an accident occurs to maintain the sealing structure. The boundary unit 1620 is formed to have a design pressure to withstand a pressure of a head difference or more between the cooling water storage unit 1610 and the sparging unit 1640. At least a portion of the boundary unit 1620 may be formed by a concrete structure inside the containment 162 and a coating member (1623) such as steel liner et. al. installed on the concrete structure.

The boundary unit 1620 may include a barrier 1621 and a cover 1622. The barrier 1621 is formed to surround the periphery of the reactor coolant system 161. The cover 1622 is formed to cover an upper portion of the reactor coolant system 161. The barrier 1621, the cover 1622, and the bottom surface (or dual bottom surface) of the containment 162 may form a sealing structure around the reactor coolant system 161.

The nuclear power plant 160 includes penetration pipes 163 and 163' passing through the containment 162. The penetration pipes 163 and 163' are connected with the reactor coolant system 161 or a secondary system. The penetration pipes 163 and 163' may include a plurality of isolation valves 163a, 163b, and 163a' or check valve 163b' arranged to be spaced apart from each other to close both sides of the broken line when breakage occurs.

In case the boundary unit 1620 and the containment 162 are spaced apart from each other and the penetration pipes 163 and 163' pass through a region between the boundary unit 1620 and the containment 162, a loss-of-coolant accident may occur in the region between the boundary unit 1620 and the containment 162. In case a loss-of-coolant accident occurs in the region between the boundary unit 1620 and the containment 162, the radioactive material might not be trapped in the inside of the facility 1600 for reducing radioactive material. Accordingly, in case a loss-of-coolant accident occurs in the region between the boundary unit 1620 and the containment 162, the penetration pipes 163 and 163' should have isolation valves to prevent additional release of the radioactive material.

However, since the isolation valves have the mechanism to be opened or closed by a related safety system signal, the isolation valves may abnormally operate or might not operate. Addition of isolation valves is not preferred in view of simplifying the facility. To resolve such issue, the present invention has a structure that may prevent release of radioactive material even without installation of additional isolation valves.

Specifically, at least a portion of the boundary unit 1620 is expanded up to a region adjacent to the containment 162 while wrapping around the penetration pipes 163 and 163' in order to prevent the loss-of-coolant accident that may occur due to breakage of the penetration pipes 163 and 163' between the boundary unit 1620 and the containment 162. As a result, the penetration pipes 163 and 163' passing through the containment 162 up to the inside of the containment 162 is caused to be positioned inside the boundary unit 1620. Accordingly, the present invention may significantly lower the possibility that a loss-of-coolant accident occurs, e.g., by breakage of the pipes 163 and 163' in the region between the boundary unit 1620 and the containment 162 and may prevent release of radioactive material even without installation of additional isolation valves.

The connecting pipe 1630 is connected with the boundary unit 1620 and the cooling water storage unit 1610 to guide the fluid flow caused in the boundary unit 1620 to the cooling water storage unit 1610. The atmosphere inside the boundary unit 1620 includes steam or air, and when a loss-of-coolant accident occurs, may be caused to contain radioactive material. If an accident that causes the pressure inside the boundary unit 1620 to rise occurs and thus the difference between the pressure inside the boundary unit 1620 and the pressure inside the containment 162 is increased to H1 or more, the atmosphere inside the boundary unit 1620 is passively caused to flow to the cooling water storage unit 1610 through the connecting pipe 1630.

The connecting pipe 1630 passes through the inlet 1611 of the cooling water storage unit 1610 up to the inside of the cooling water storage unit 1610 to deliver the atmosphere inside the boundary unit 1620 and radioactive material contained in the atmosphere to the sparging unit 1640.

The sparging unit 1640 is connected with the connecting pipe 1630 to receive the atmosphere inside the boundary unit 1620 and the radioactive material contained in the atmosphere from the connecting pipe 1630. At least a portion of the sparging unit 1640 is submerged in the cooling water of the cooling water storage unit 1610 so that the sparging unit 1640 sparges the atmosphere and the radioactive material contained in the atmosphere to the cooling water.

The sparging unit 1640 has a plurality of sparging holes 1641 formed to sparge the atmosphere inside the boundary unit 1620 and the radioactive material contained in the atmosphere finely. Further, the sparging unit 1640 has a plurality of fine fluid paths (not shown) that run to the plurality of sparging holes 1641. The sparging unit 1640 has a flow resistance in its inner fluid path to evenly distribute the fluid into the plurality of fine fluid paths.

The steam sparged through the sparging unit 1640 to the cooling water storage unit 1610 is condensed, and the air is cooled to rise. The soluble radioactive material is mostly dissolved in the cooling water. In case the cooling water in the cooling water storage unit 1610 maintains a predetermined water level, and the pressure difference between the boundary unit 1620 and the containment 162 is H1 or more, the facility 1600 for reducing radioactive material remains in steady operation.

In case a single connecting pipe 1630 and a single sparging unit 1640 are provided, the facility 1600 for reducing radioactive material may be caused to be impossible to operate as the connecting pipe 1630 or the sparging unit 1640 is blocked. Accordingly, it is preferable to provide a plurality of connecting pipes 1630 and a plurality of sparging units 1640 considering redundancy.

The facility 1600 for reducing radioactive material may further include a cooling water recollecting portion 1610a and an opening portion 1610b. The opening portion 1610b prevents overpressure in the cooling water storage unit 1610. In contrast, the cooling water recollecting portion 1610a recollects the steam discharged from the cooling water storage unit 1610.

The cooling water in the cooling water storage unit 1610 is evaporated as its temperature goes up, turning into steam. The steam may be discharged through the opening portion 1610b to the inside of the containment 162. The steam discharged to the inside of the containment 162 is cooled, turning into condensed water. The cooling water recollecting portion 1610a forms a fluid path at an upper part of the cooling water storage unit 1610 to recollect the condensed water to the cooling water storage unit 1610. The connection between the cooling water recollecting portion 1610a and the cooling water storage unit 1610 may be made by way of a pipe or structure.

As shown in FIG. 6, the cooling water recollecting portion 1610a and the opening portion 1610b may be formed at an upper part of the cooling water storage unit 1610. More specifically, a portion of the upper structure forming the cooling water storage unit 1610 may form the cooling water recollecting portion 1610a and the opening portion 1610b. The cooling water recollecting portion 1610a and the opening portion 1610b are installed at separate regions from each other. However, the cooling water recollecting portion 1610a and the opening portion 1610b may be formed to share the same fluid path.

The nuclear power plant 160 may have various safety systems other than the facility 1600 for reducing radioactive material. For example, as shown in FIG. 6, a passive safety injection system 165 may be installed in the nuclear power plant 160. The passive safety injection system 165 is a system form maintaining the water level of the reactor coolant system 161 by injecting a coolant to the inside of the reactor coolant system 161 when an accident, such as loss of coolant accident, occurs.

The passive safety injection system 165 may include various types of tanks such as a core makeup tank 165a or safety injection tank 165b. The core makeup tank 165a or the safety injection tank 165b is connected with the reactor coolant system 161 by way of a safety injection line 165c and the pressure balance line 165d.

The coolant is injected from the tanks 165a and 165b through the safety injection line 165c to the reactor coolant system 161. In case the facility 1600 for reducing radioactive material and the passive safety injection system 165 are both installed in the nuclear power plant 160, the passive safety injection system 165 may be installed in the inside of the boundary unit 1620 to prevent release of radioactive material.

The facility 1600 for reducing radioactive material proposed herein, unlike when double containments 162 are installed, does not form a high-pressure boundary with the containment 162 and thus may minimize an increase in the economical expense that may occur due to added facilities. The facility 1600 for reducing radioactive material may minimize an increase in the number of isolation valves.

Figure 7A:
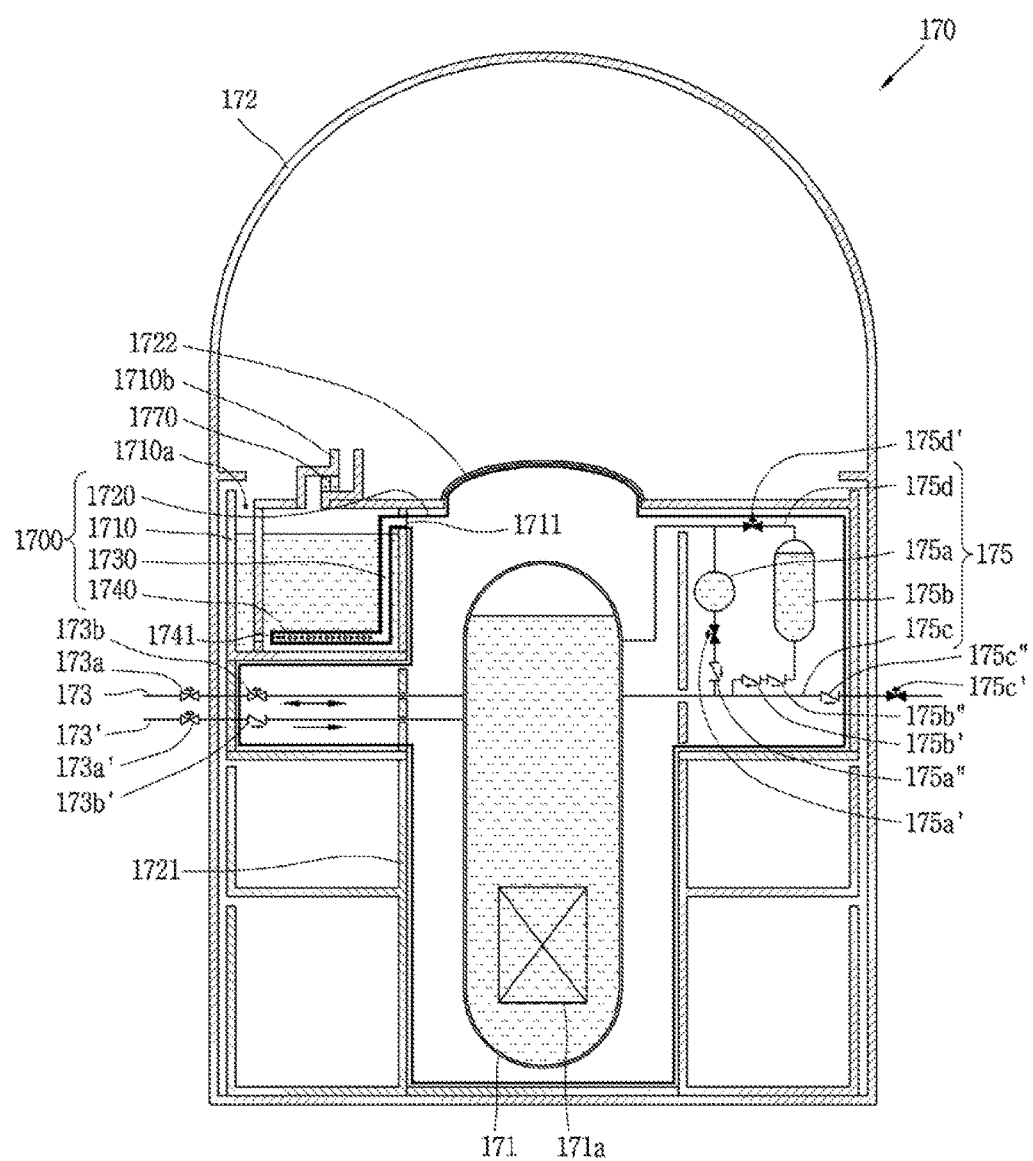
FIG. 7A is a concept view illustrating a facility for reducing radioactive material and a nuclear power plant having the same according to yet still another embodiment of the present invention.

FIG. 7A is a concept view illustrating a facility 1700 for reducing radioactive material and a nuclear power plant 170 having the same according to yet still another embodiment of the present invention.

An opening portion 1710b is formed to protrude from an upper part of a cooling water storage unit 1710 to the inside of a containment 172. The opening portion 1710b forms a fluid path by way of a pipe or structure. A filter facility 1770 is disposed on the fluid path to capture the radioactive material that is about to exit the cooling water storage unit 1710.

If the pressure in the cooling water storage unit 1710 goes up, the steam or air inside the cooling water storage unit 1710 is discharged through the opening portion 1710b. During the course, some of the radioactive materials dissolved in the cooling water storage unit 1710 are re-volatilized, and together with the steam or air, may be thus discharged through the opening portion 1710b to the containment 172. If the radioactive materials are discharged to the containment 172, the concentration of the radioactive material in the containment 172 may increase.

The filter facility 1770 is disposed on the fluid path of the opening portion 1710b to capture the radioactive material that, together with the steam, is about to be discharged to the containment 172. The filter facility 1770 includes at least one of a filter and an absorbent. The filter and the absorbent are adapted to pass steam or air while capturing the radioactive material.

As the filter, a high-efficiency particulate air (HEPA) filter may be adopted. The gaseous radioactive material contained in the steam or air is filtered out when passing through the filter. For example, in case the radioactive material is iodine, iodine is combined with silver nitrate while passing through the filter to thus turn into iodic silver, and is thus removed from the steam or air.

As the absorbent, charcoal may be employed. Organic iodine compounds are combined with the materials impregnated in the charcoal to turn into quaternary ammonium salt and are absorbed into the charcoal. Molecular iodine is combined with the charcoal through chemisorption. The charcoal is typically utilized as an absorbent material thanks to its large internal surface area.

Either or both of the filter and the absorbent may be disposed. However, the above-described filter and absorbent are offered merely as an example, and according to the present invention, the type of the filter and absorbent is not necessarily limited thereto.

The cooling water recollecting portion 1710a, like the opening portion 1710b, has a fluid path formed by a pipe or structure. The fluid path of the cooling water recollecting portion 1710a may be formed to be submerged into the cooling water storage unit 1710. However, the cooling water storage unit 1710 and the cooling water recollecting portion 1710a, rather than separated from each other, are connected with each other.

Hereinafter, the normal operation of the nuclear power plant 170 and the operation under accident of the nuclear power plant 170 are described with reference to FIGS. 7B and 7C.

Figure 7B:
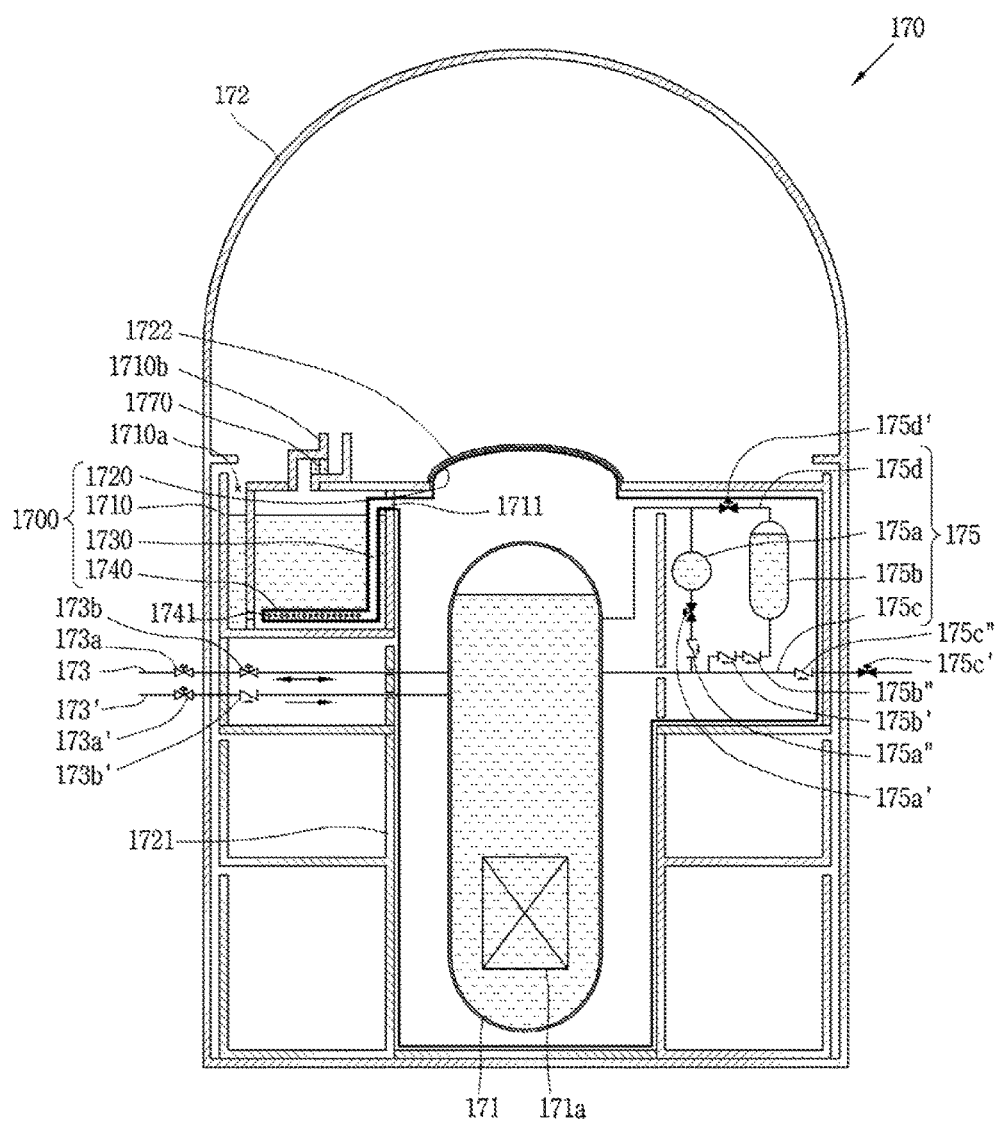
FIG. 7B is a concept view illustrating the normal operation state of the nuclear power plant shown in FIG. 7A.

FIG. 7B is a concept view illustrating a normal operation state of the nuclear power plant 170 shown in FIG. 7A.

The pipes 173 and 173' connected with a system (not shown) relating to the normal operation of the nuclear power plant 170 have isolation valves 173a, 173b, and 173a' or a check valve 173b'. When the nuclear power plant is in normal operation, the isolation valves necessary for the normal operation remain opened. When the nuclear power plant 170 is in normal operation, the water in the reactor coolant system 171 remains at a normal level. Accordingly, the passive safety injection system 175 remains in the standby state.

The facility 1700 for reducing radioactive material is a facility that is passively operated by a pressure difference between a boundary unit 1720 and a containment 172. When the nuclear power plant 170 is in normal operation, little pressure difference is created between the boundary unit 1720 and the cooling water storage unit 1710, and thus, the facility 1700 for reducing radioactive material remains in the standby state.

Figure 7C:
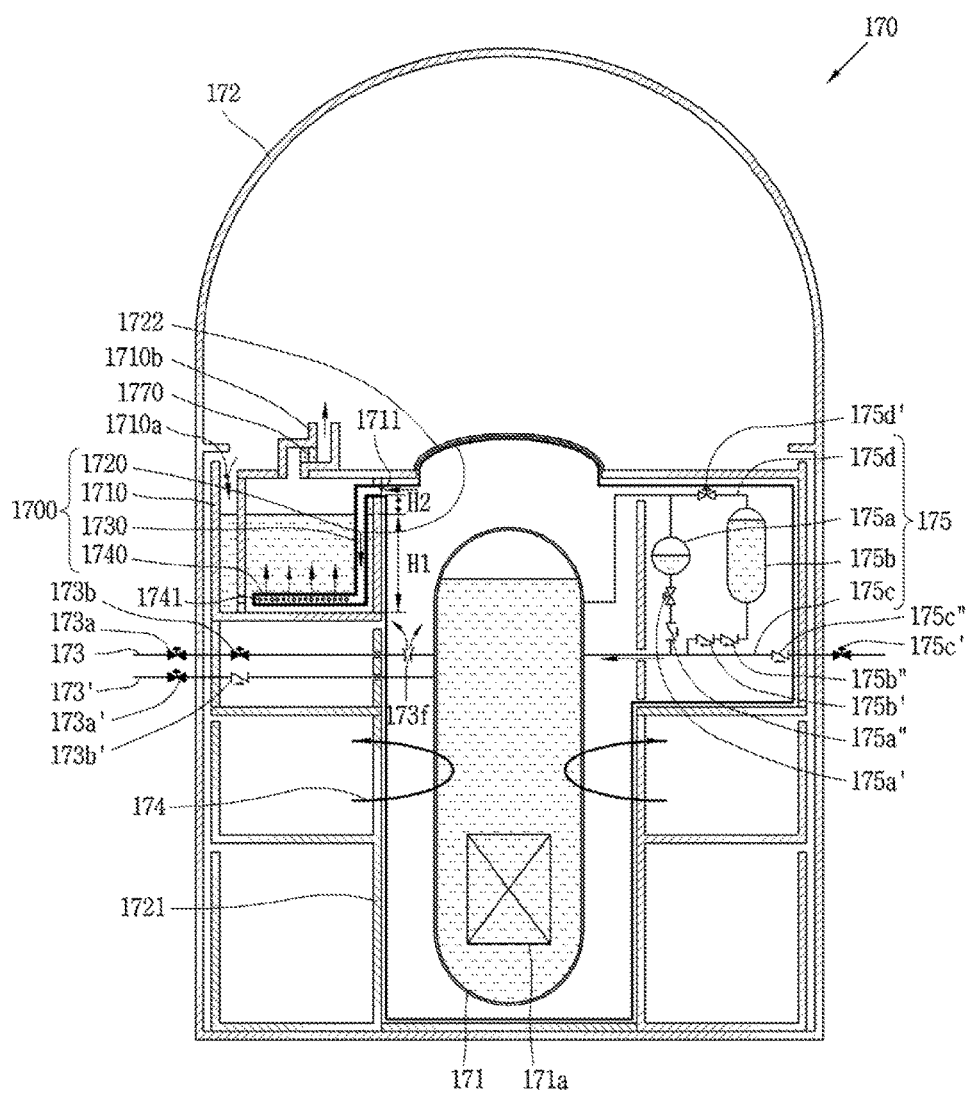
FIG. 7C is a concept view illustrating an example in which an accident occurs in the nuclear power plant shown in FIG. 7A.

FIG. 7C is a concept view illustrating the operation under accident of the nuclear power plant 170 shown in FIG. 7A.

If an accident such as a loss-of-coolant accident occurs in the nuclear power plant 170 due to, e.g., pipe breakage, steam and radioactive material are discharged through the broken line 173*f*. A number of safety systems installed in the nuclear power plant 170 start operations.

When an accident occurs, the isolation valves 173*a*, 173*b*, and 173*a*' relating to the normal operation of the nuclear power plant 170 are closed by a related signal. In case check valves 173*b*' and 175*c*" are installed to form a fluid path in a direction toward the reactor coolant system 171, the flow in the direction coming from the reactor coolant system 171 is shut off, and the boundary unit 1720 of the facility 1700 for reducing radioactive material maintains a sealing structure. The isolation valves 173*a*, 173*b*, 173*a*', and 175*c*' may share an operation signal. Accordingly, even when no separate signal is applied for the operation signal of the facility for reducing radioactive material, the operation of the isolation valves 173*a*, 173*b*, 173*a*', 175*c*' may allow the facility 1700 for reducing radioactive material to be operated.

The nuclear power plant 170 may include a passive residual heat removing system 174 and a passive safety injection system 175. The passive residual heat removing system 174 removes sensible heat in the reactor coolant system 171 and residual heat in the core 171*a*. The passive safety injection system 175 injects a coolant into the reactor coolant system 171 to maintain the water level of the reactor coolant system 171.

The passive safety injection system 175 is first described. The pipe connected with the core makeup tank 175*a* has an isolation valve 175*a*' and a check valve 175*a*". If the isolation valve 175*a*' and the check valve 175*a*" are opened, the coolant in the core makeup tank 175*a* is swiftly injected into the reactor coolant system 171.

If the isolation valve 175*d*' installed in the pressure balance line 175*d* is opened, steam is introduced from the high-pressure reactor coolant system 171 through the pressure balance line 175*d* to the safety injection tank 175*b*. As time goes by, the reactor coolant system 171 and the safety injection tank 175*b* form a pressure balance. If the reactor coolant system 171 and the safety injection tank 175*b* form the pressure balance, the coolant in the safety injection tank 175*b* is also injected into the reactor coolant system 171 by gravity water head. The coolant in the core makeup tank 175*a* and the safety injection tank 175*b* is injected through the safety injection line 175*c* to the reactor coolant system 171.

Next, the passive residual heat removing system 174 is described. The passive residual heat removing system 174 may remove sensible heat from the reactor coolant system 171 and residual heat from the core 171*a*. A steam generator (not shown) is installed at the boundary between the primary system and the secondary system. The passive residual heat removing system is configured to circulate the coolant to the steam generator. As the coolant circulates, the sensible heat from the reactor coolant system 171 and the residual heat from the core 171*a* are removed to the outside.

The nuclear power plant 170, as necessary, may further include other systems than the above-mentioned safety systems.

If steam is discharged from the broken line 173*f*, the radioactive material, together with the steam, is discharged to the inside of the boundary unit 1720. As the steam and radioactive material are continuously discharged from the broken line 173*f*, the pressure inside the boundary unit 1720 is gradually increased. As the pressure inside the boundary unit 1720 is increased to H1 or more, a flow of the fluid (including steam, air, and radioactive material) is caused by a pressure difference from the boundary unit 1720 that has a relatively high pressure to the cooling water storage unit 1710 that has a relatively low pressure.

The connecting pipe 1730 guides the flow of the fluid caused by the pressure difference to the cooling water storage unit 1710. The atmosphere that has passed through the connecting pipe 1730 is sparged into the cooling water through the sparging unit 1740 submerged in the cooling water storage unit 1710. Accordingly, the steam is sparged into the cooling water and is condensed. The air is cooled to rise. The soluble radioactive material is dissolved in the cooling water and is collected. Accordingly, the facility 1700 for reducing radioactive material may suppress the radioactive material from releasing from the containment 172 to the external environment.

In particular, iodine, which has the highest concentration among the radioactive materials spread to the external environment, is soluble and thus is mostly dissolved in the cooling water. The facility 1700 for reducing radioactive material remains in steady operation when the amount of cooling water in the cooling water storage unit 1710 maintains a predetermined value or more and the pressure difference between the boundary unit 1720 and the containment 172 is H1 or more.

The sparging unit 1740 sparges the steam that may lead to an increase in the pressure inside the containment 172 to the cooling water storage unit 1710 to condense the steam. Accordingly, the facility 1700 for reducing radioactive material may suppress the increasing pressure inside the containment 172 and may reduce the design pressure in the containment 172.

As time goes by, the steam may be discharged from the cooling water storage unit 1710 through the opening portion 1710*b*. However, the radioactive material contained in the steam is captured while passing through the filter facility 1770 and is not discharged to the containment 172. A portion of the steam discharged to the inside of the containment 172 is re-condensed and is recollected to the cooling water storage unit 1710 through the cooling water recollecting portion 1710*a*.

Figure 8:
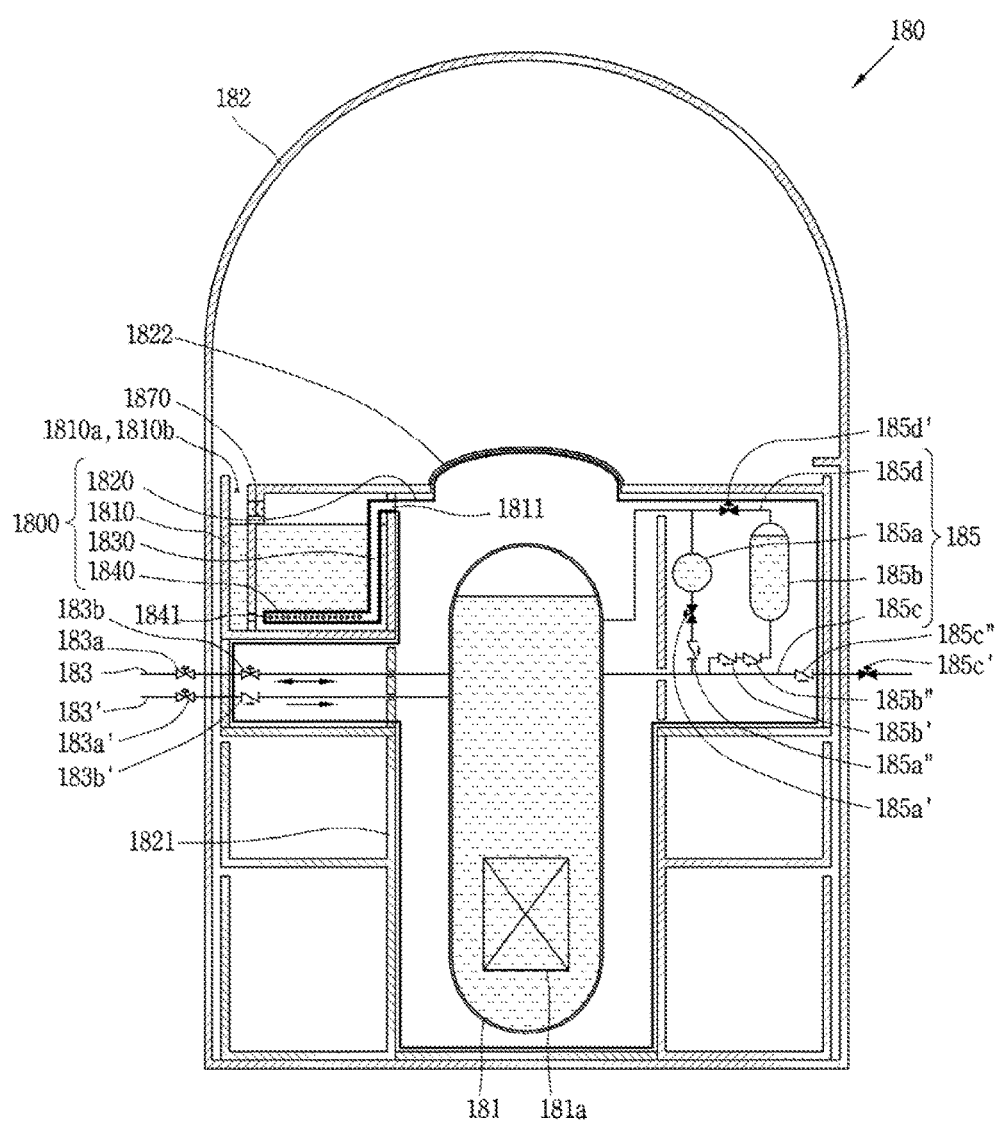
FIG. 8 is a concept view illustrating a facility for reducing radioactive material and a nuclear power plant having the same according to yet still another embodiment of the present invention.

FIG. 8 is a concept view illustrating a facility 1800 for reducing radioactive material and a nuclear power plant 180 having the same according to yet still another embodiment of the present invention.

The opening portion 1810*b* and the cooling water recollecting portion 1810*a* share the same fluid path. The steam or air in the cooling water storage unit 1810 is discharged overtime through the opening portion 1810*b* to the containment 182. The condensed water created in the containment 182 is recollected to the cooling water storage unit 1810 through the cooling water recollecting portion 1810*a*.

The filter facility 1870, as shown in FIG. 8, is disposed inside the cooling water storage unit 1810. Specifically, the filter facility 1870 is installed at an upper part of the inner space in the cooling water storage unit 1810. Accordingly, the radioactive material contained in the steam or air is captured while passing through the filter facility 1870 and is restricted for being discharged to the containment 182.

Figure 9:
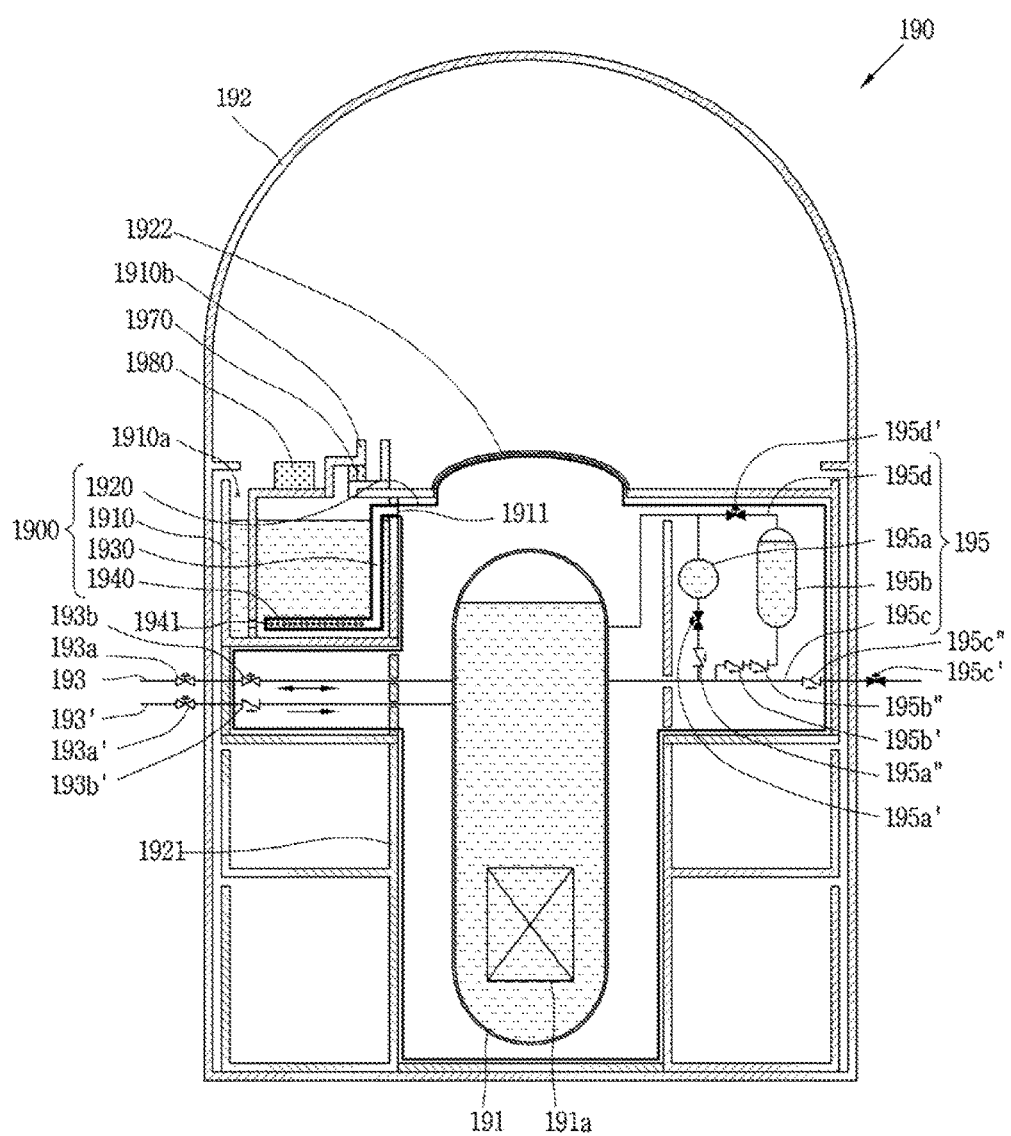
FIG. 9 is a concept view illustrating a facility for reducing radioactive material and a nuclear power plant having the same according to yet still another embodiment of the present invention.

FIG. 9 is a concept view illustrating a facility 1900 for reducing radioactive material and a nuclear power plant 190 having the same according to yet still another embodiment of the present invention.

The facility 1900 for reducing radioactive material may further include an additive injection unit 1980. The additive injection unit 1980 supplies the cooling water storage unit 1910 with an additive to maintain the pH of the coolant to a predetermined value or more (typically pH 7 or more) so as to prevent volatilization of the radioactive material dissolved in the cooling water storage unit 1910. The additive injection unit 1980 may be installed in the fluid path of the cooling water recollecting portion 1910a as shown in FIG. 4.

Radioactive iodine dissolved in the cooling water exists in the form of negative ions. In case the pH of the cooling water in which iodine is dissolved is low, the amount of radioactive iodine that is to be re-volatilized may be significantly increased. This is why the amount of radioactive iodine that is converted into volatilizable elemental iodine (12) is sharply increased in the cooling water of pH 7 or less.

The additive injection unit 1980 injects an additive to the cooling water (or condensed water) to prevent the radioactive material dissolved in the cooling water from being re-volatilized. For example, the additive may be sodium phosphate. Sodium phosphate adjusts the pH of the cooling water to prevent corrosion inside the containment 192 and re-volatilization of a radioactive nuclide. However, the type of additives according to the present invention is not limited thereto. The additive may include materials to passively manage the water quality of the cooling water storage unit 1910. For example, boric acid to suppress reactivity of the core 191a or other additives for suppressing corrosion of the device may be added.

Referring to FIG. 9, the condensed water in the containment 192 is recollected through the cooling water recollecting portion 1960 to the cooling water storage unit 1910. The additive injection unit 1980 may be installed in the fluid path of the cooling water recollecting portion 1910a to dissolve the additive in the recollected condensed water. Accordingly, if the additive is dissolved in the condensed water introduced to the cooling water recollecting portion 1910a, the additive increases the pH of the condensed water to prevent re-volatilization of the radioactive material. If the condensed water is introduced into the cooling water storage unit 1910 and is mixed with the cooling water, the mixture of the cooling water and the condensed water may be kept at a pH of 7 or more.

Figure 10A:
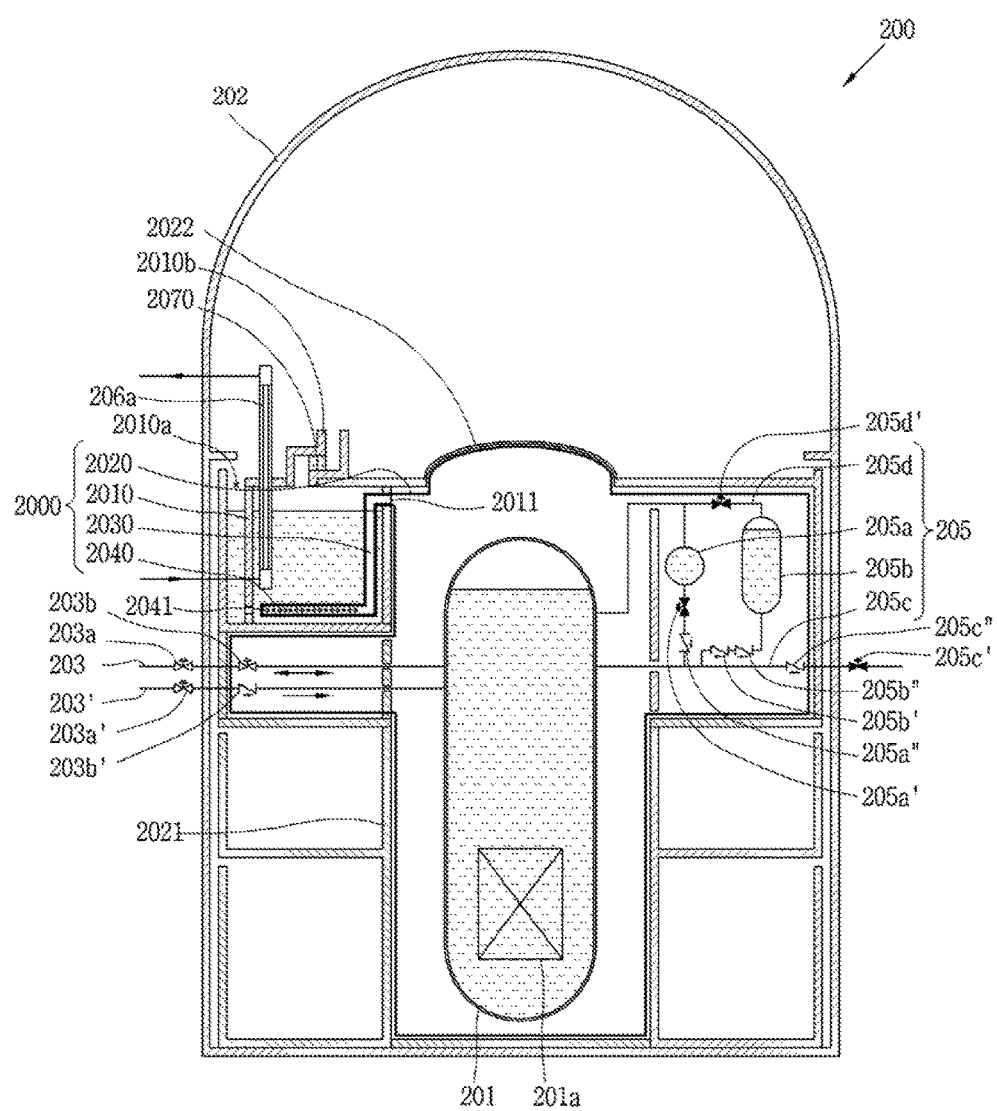
FIG. 10A is a concept view illustrating a facility for reducing radioactive material and a nuclear power plant having the same according to yet still another embodiment of the present invention.

FIG. 10A is a concept view illustrating a facility 2000 for reducing radioactive material and a nuclear power plant 200 having the same according to yet still another embodiment of the present invention.

The nuclear power plant 200 may have a passive containment cooling system along with the facility 2000 for reducing radioactive material. The passive containment cooling system is a system for cooling the inside of the containment 202 to suppress a rise in the pressure inside the containment 202. The passive containment cooling system includes a heat exchanger 206a. The atmosphere inside the containment 202 and the cooling water in the cooling water storage unit 2010 are cooled by the heat exchanger 206a. The steam and air contained in the atmosphere inside the containment 202 may be condensed or cooled. If the temperature inside the containment 202 is decreased, a portion of the steam inside the containment 202 is decreased. Accordingly, the rise in the pressure inside the containment 202 may be suppressed by the passive containment cooling system.

The heat exchanger 206a of the passive containment cooling system may be installed in an inner space of the containment 202. Unlike this, the heat exchanger 206a may be installed to be submerged in the cooling water in the cooling water storage unit 2010. The heat exchanger 206a may be installed in both side an inner space of the containment 202 and the cooling water storage unit 2010. Referring to FIG. 10A, a portion of the heat exchanger 206a is disposed in the inner space of the containment 202 and another portion of the heat exchanger 206a is disposed inside the cooling water storage unit 2010.

Figure 10B:
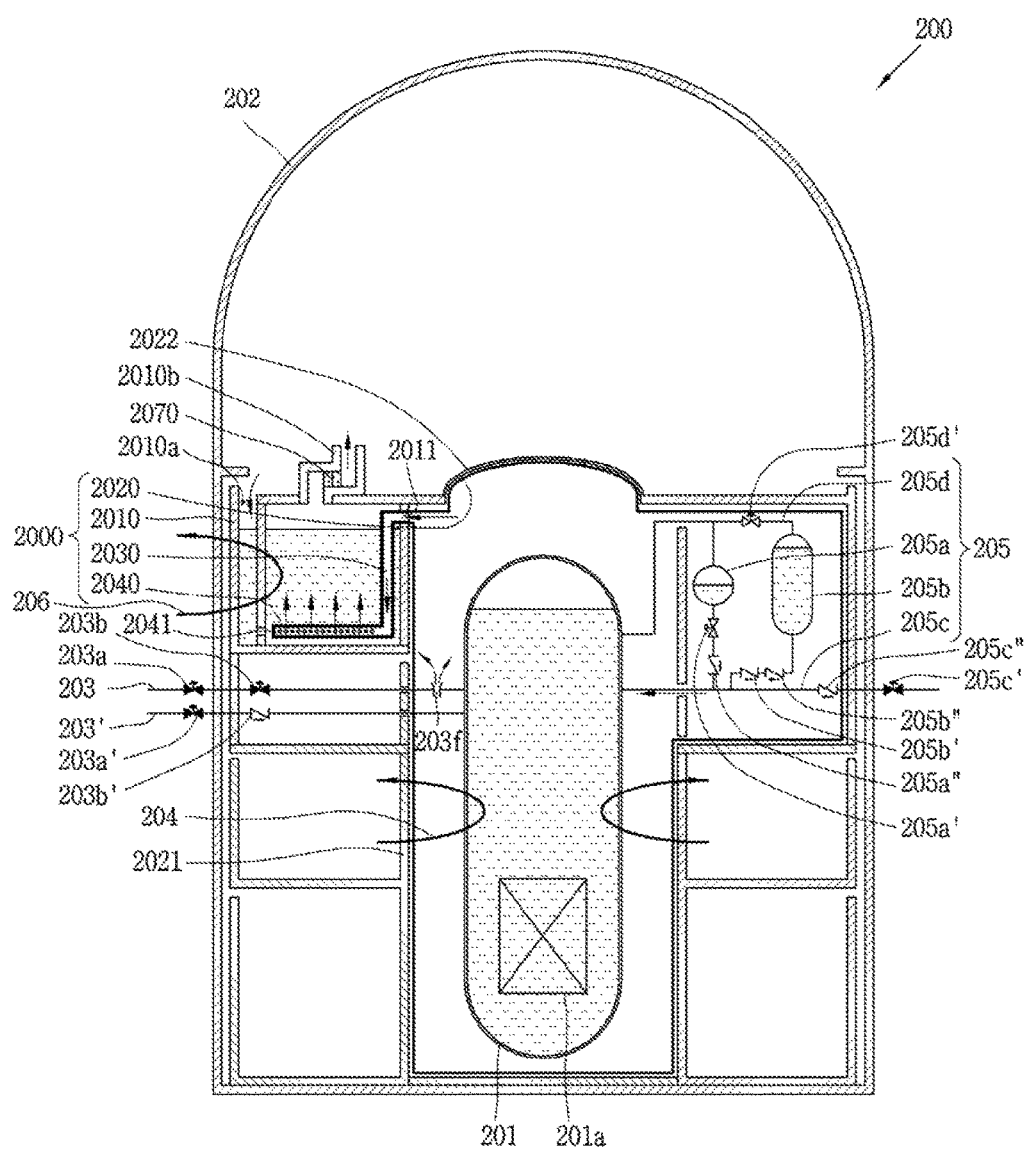
FIG. 10B is a concept view illustrating an example in which an accident occurs in the nuclear power plant shown in FIG. 10A.

FIG. 10B is a concept view illustrating an example where an accident occurs in the nuclear power plant 200 shown in FIG. 10A.

If pipe breakage occurs in a pipe connected with the reactor coolant system 201, steam and radioactive material are discharged through the broken line 203". The passive safety injection system 205 installed inside the boundary unit 2020 injects a coolant into the reactor coolant system 201. The passive residual heat removing system 204 removes sensible heat in the reactor coolant system 201 and residual heat in the core 201a.

As steam is discharged, the pressure inside the boundary unit 2020 is increased to be higher than the pressure inside the containment 202, and a fluid flow is created due to the pressure difference between inside the boundary unit 2020 and inside the containment 202. The connecting pipe 2030 guides the fluid flow to the cooling water storage unit 2010. The sparging unit 2040 sparges, into the cooling water, the fluid and the radioactive material contained in the fluid delivered from the connecting pipe 2030. The soluble radioactive material is collected in the cooling water storage unit 2010. The passive containment cooling system 206 cools at least one of the containment 202 and the cooling water storage unit 2010.

As time goes by, the steam or air in the cooling water storage unit 2010 is discharged to the inside of the containment 202 through the opening portion 2010b. However, the radioactive material is captured by the filter facility 2070 installed in the fluid path of the opening portion 2010b and is not discharged to the containment 202. A portion of the steam that has been discharged to the containment 202 is re-condensed to form condensed water. The condensed water is recollected to the cooling water storage unit 2010 through the cooling water recollecting portion 2010a.

Figure 10C:
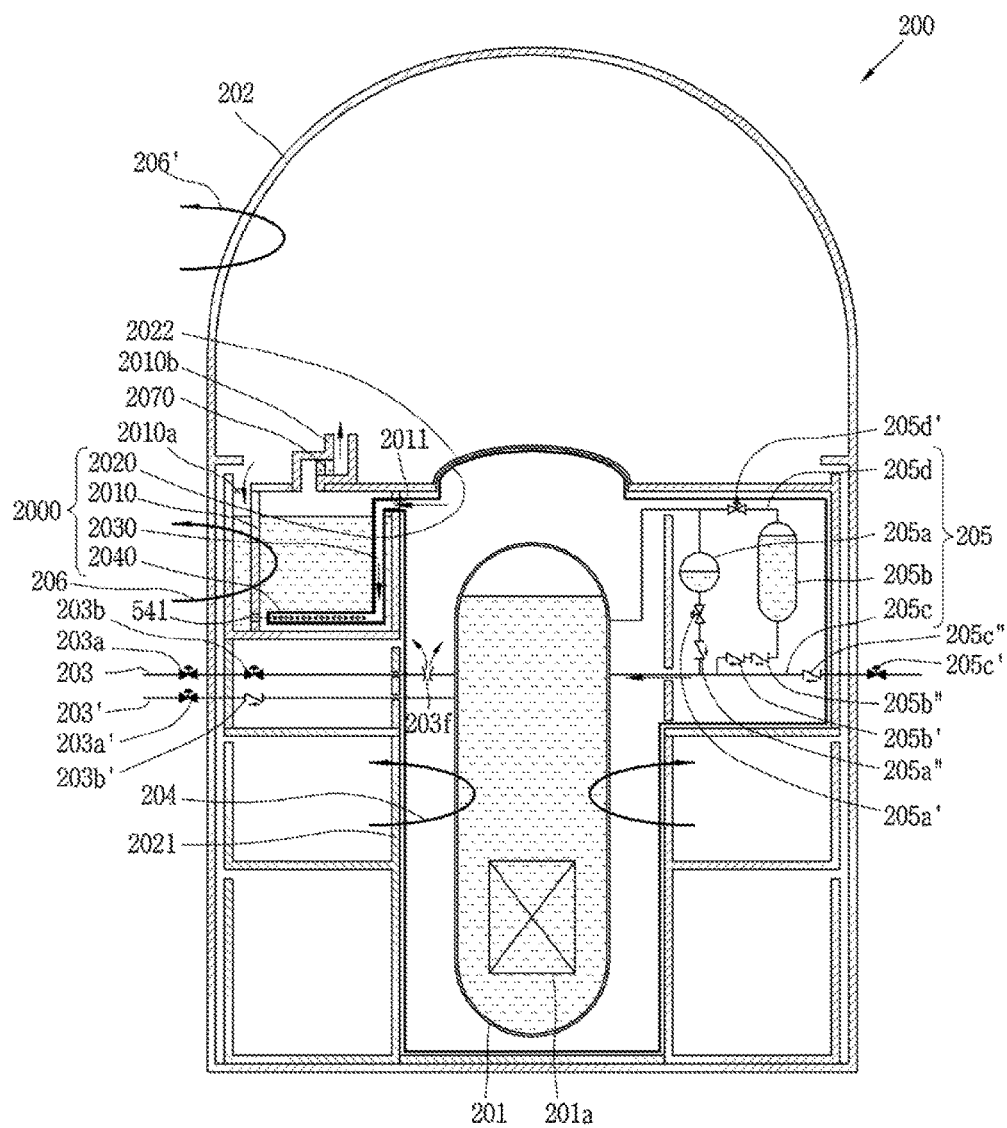
FIG. 10C is a concept view illustrating a variation to the nuclear power plant shown in FIG. 10B.

FIG. 10C is a concept view illustrating a variation to the nuclear power plant 200 shown in FIG. 10B.

The passive containment cooling systems 206 and 206' are formed to cool the atmosphere in the containment 202 and the cooling water in the cooling water storage unit 2010. The heat exchanger (not shown) of the passive containment cooling system may be installed in an inner space of each of the cooling water storage unit 2010 and the containment 202. When an accident occurs, the operation of the facility 2000 for reducing radioactive material, the passive safety injection system 205, and the passive residual heat removing system 204 is the same as that described above in connection with FIG. 10B.

The passive containment cooling systems 206 and 206' cool the atmosphere in the containment 202. Accordingly, the steam evaporated from the cooling water storage unit 2010 to the containment 202 or the atmosphere inside the containment 202 may be cooled or condensed. The condensed water generated as the steam is condensed is collected through the cooling water recollecting portion 2010a, and this has been described above.

Figure 10D:
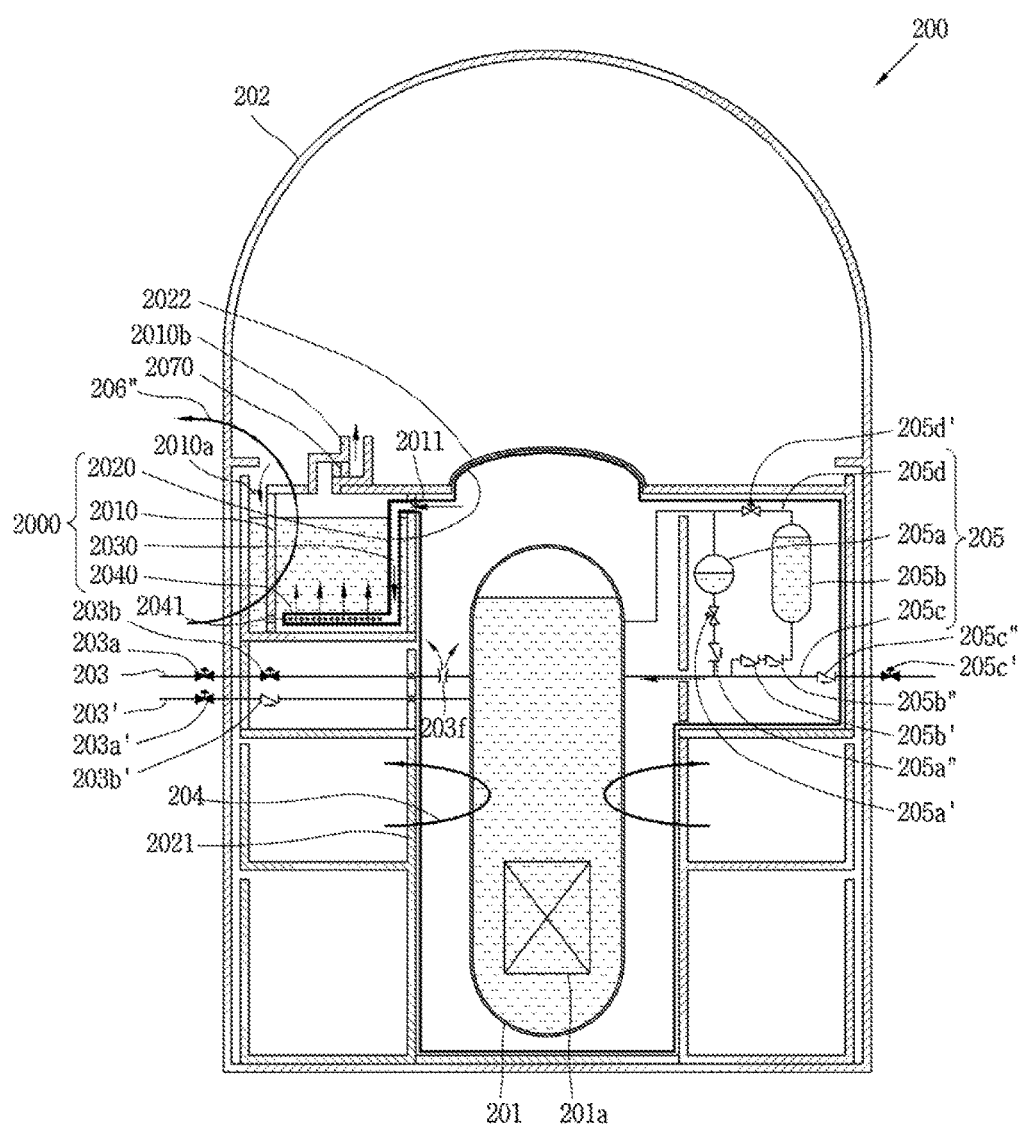
FIG. 10D is a concept view illustrating another variation to the nuclear power plant shown in FIG. 10B.

FIG. 10D is a concept view illustrating another variation to the nuclear power plant 200 shown in FIG. 10B.

The passive containment cooling system 206" is formed to cool the atmosphere in the containment 212 and the cooling water in the cooling water storage unit 2010. The heat exchanger (not shown) of the passive containment cooling system 206" is formed to penetrate an upper structure of the cooling water storage unit 2010 to simultaneously cool the containment 202 and the cooling water storage unit 2010. Other configurations are the same as those described above in connection with FIG. 10C.

Figure 11:
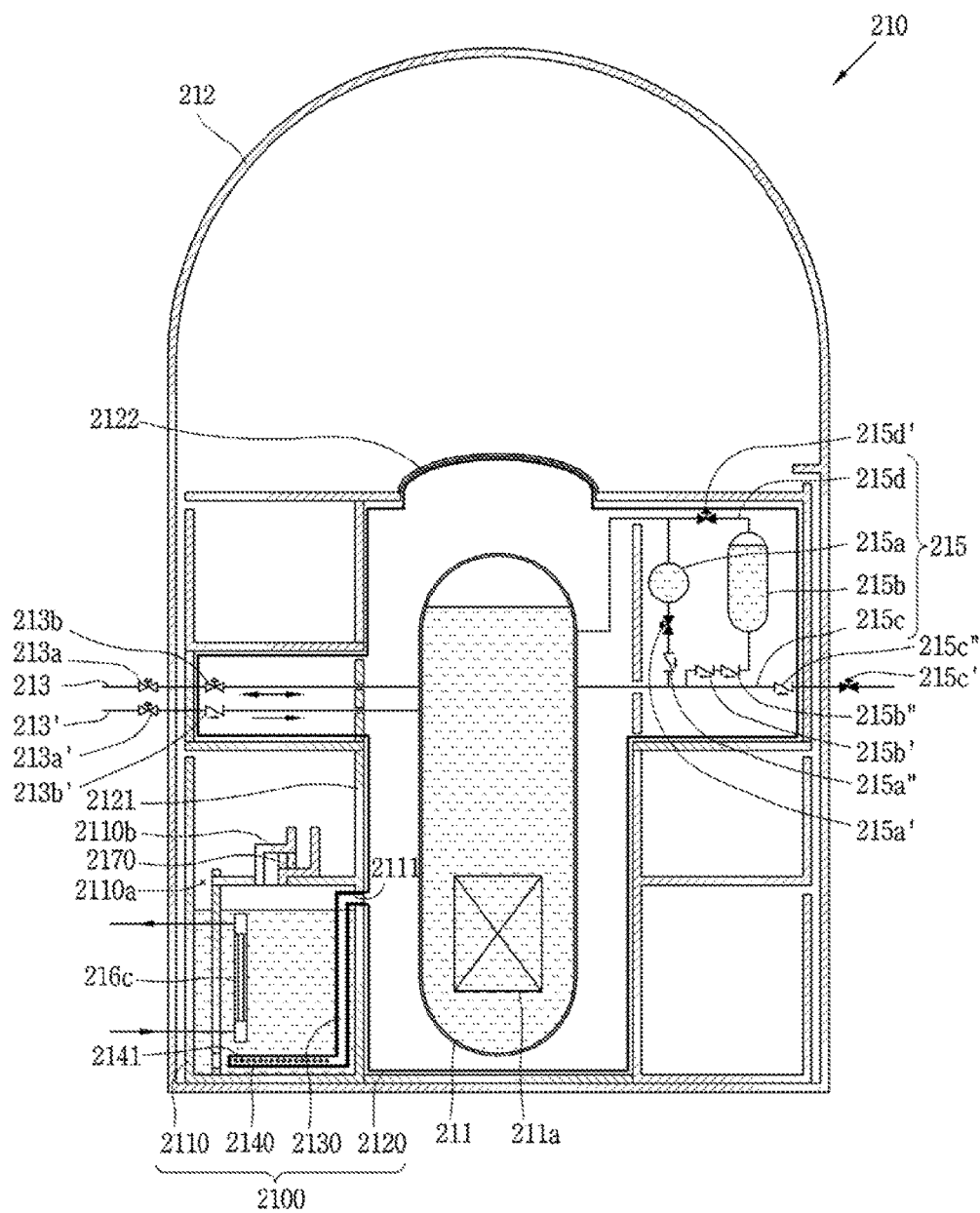
FIG. 11 is a concept view illustrating a facility for reducing radioactive material and a nuclear power plant having the same according to yet still another embodiment of the present invention.

FIG. 11 is a concept view illustrating a facility 2100 for reducing radioactive material and a nuclear power plant 210 having the same according to still another embodiment of the present invention.

The cooling water storage unit 2110 may be installed at a lower region of an inner space in the containment 212. As in the embodiments described above, the connecting pipe 2130 passes through the inlet 2111 of the cooling water storage unit 2110 and extends to a lower part of the cooling water storage unit 2110. The sparging unit 2140 is connected with the connecting pipe 2130 to receive the radioactive material that has passed through the connecting pipe 2130.

The opening portion 2110b is formed to project to an inner space of the containment 212. A filter facility 2170 is installed in a fluid path of the opening portion 2110b. The cooling water recollecting portion 2110a is formed to collect condensed water. The heat exchanger 216c of the passive containment cooling system is installed in the cooling water storage unit 2110 to cool the cooling water in the cooling water storage unit 2110.

Figure 12:
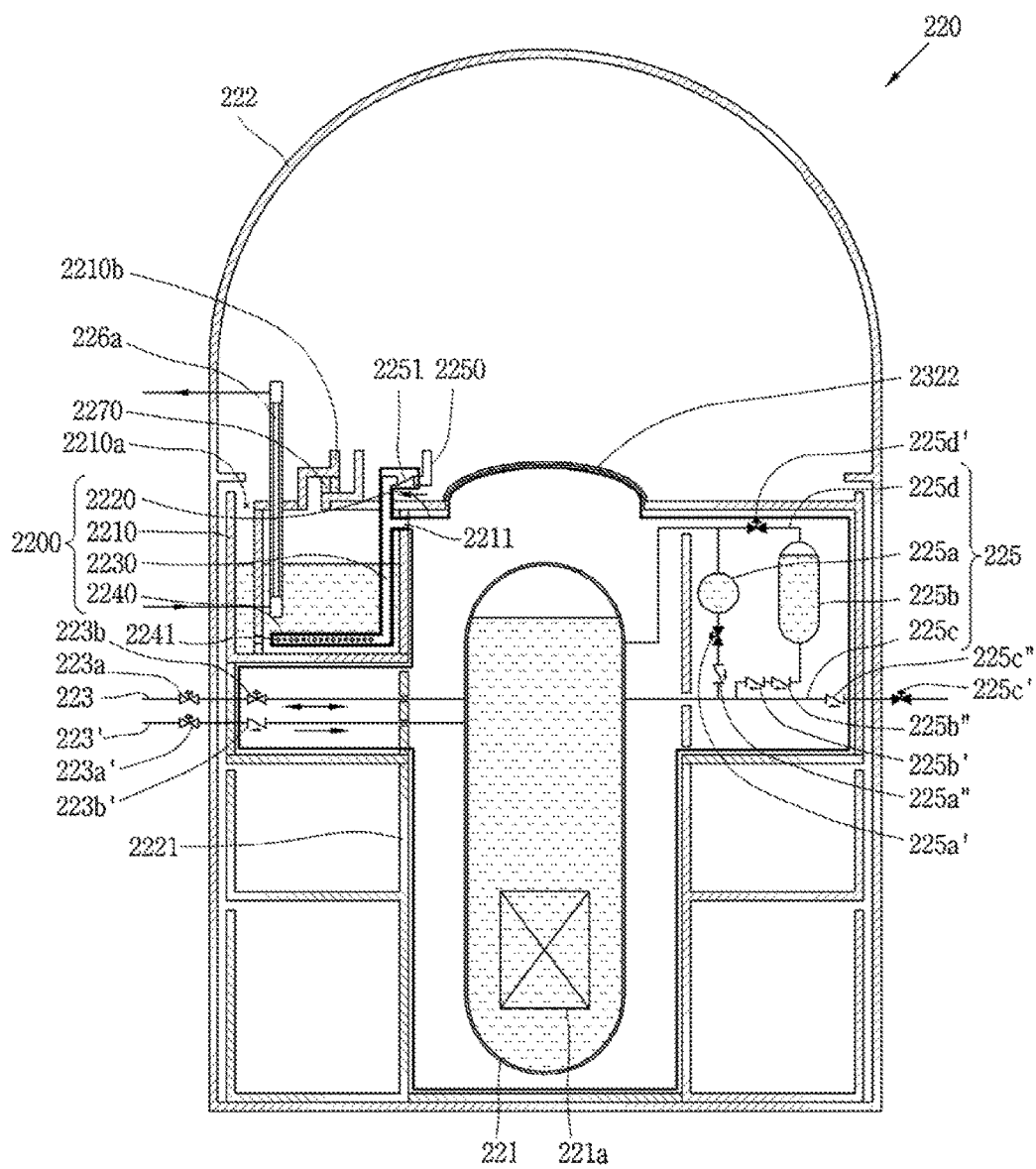
FIG. 12 is a concept view illustrating a facility for reducing radioactive material and a nuclear power plant having the same according to yet still another embodiment of the present invention.

FIG. 12 is a concept view illustrating a facility 2200 for reducing radioactive material and a nuclear power plant 220 having the same according to yet still another embodiment of the present invention.

The facility 2200 for reducing radioactive material further includes a pressure balance line 2250. The pressure balance line 2250 of the facility 2200 for reducing radioactive material needs to be distinguished from the pressure balance line 215d of the passive safety injection system 215. The pressure balance line 2250 of the facility 2200 for reducing radioactive material forms a fluid path that runs from the inside of the containment 222 to the inside of the boundary unit 2220. In case the pressure inside the containment 222 is higher than the pressure inside the boundary unit 2220, the pressure balance line 2250 introduces the atmosphere inside the containment 222 to the inside of the boundary unit 2220. Accordingly, the cooling water in the cooling water storage unit 2210 may be prevented from flowing back to the inside of the boundary unit 2220. The pressure balance line 2050 may be branched from the connecting pipe 2230 and may extend up to the inside of the containment 222. The pressure balance line 2250, as shown, may pass through the upper structure of the cooling water storage unit 2210.

The pressure balance line 2250 may have a check valve 2251 that allows for a flow only in one direction. The check valve 2251 prevents the atmosphere inside the boundary unit 2220 from being discharged through the pressure balance line 2250 to the inside of the containment 222.

Figure 13:
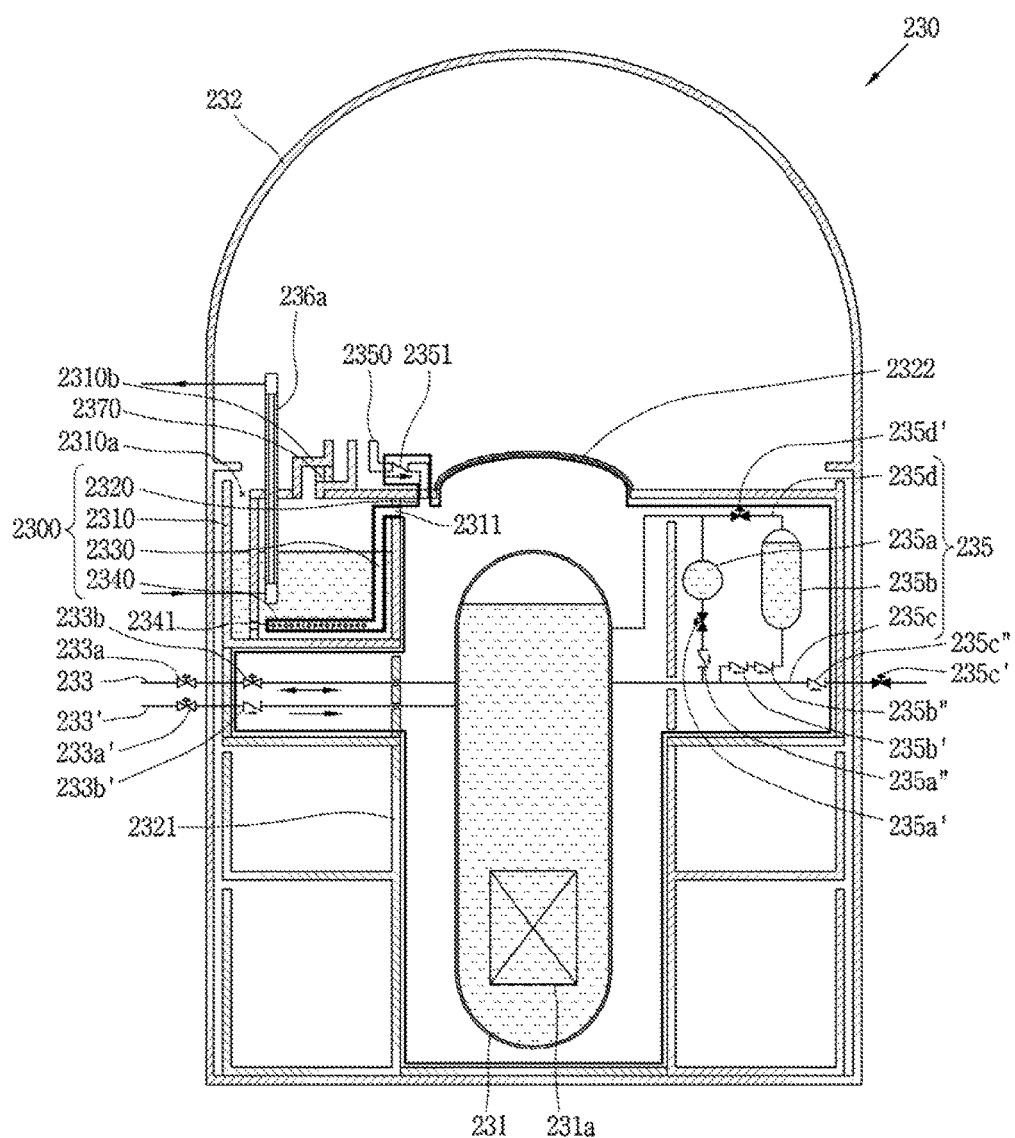
FIG. 13 is a concept view illustrating a facility for reducing radioactive material and a nuclear power plant having the same according to yet still another embodiment of the present invention.

FIG. 13 is a concept view illustrating a facility 2300 for reducing radioactive material and a nuclear power plant 230 having the same according to yet still another embodiment of the present invention.

The pressure balance line 2350 forms a fluid path that runs from the inside of the containment 232 to the inside of the boundary unit 2320. The inner space of the boundary unit 2320 and the inner space of the containment 232 are connected with each other by way of the pressure balance line 2350. The pressure balance line 2350, rather than branched from the connecting pipe 2330, is formed independently from the connecting pipe 2330. In this point of view, the pressure balance line 2350 shown in FIG. 13 differs from the pressure balance line 2250 shown in FIG. 12. The pressure balance line 2350 passes through the upper part of the boundary unit 2220 and may extend to the inside of the boundary unit 2220. The check valve 2351 may be installed in the pressure balance line 2350, and the function of the check valve 2351 is the same as that described above in connection with FIG. 7.

Figure 14:
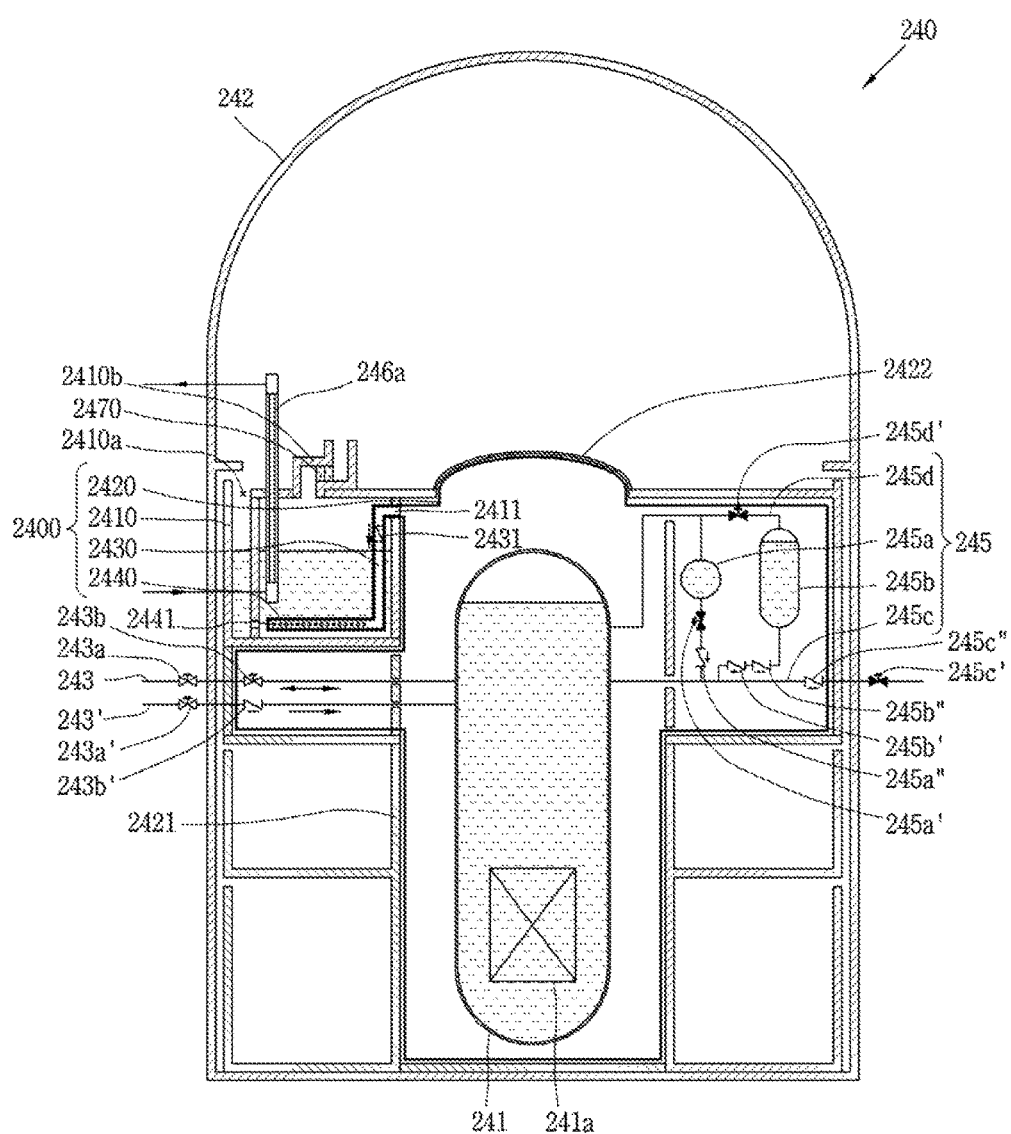
FIG. 14 is a concept view illustrating a facility for reducing radioactive material and a nuclear power plant having the same according to yet still another embodiment of the present invention.

FIG. 14 is a concept view illustrating a facility 2400 for reducing radioactive material and a nuclear power plant 240 having the same according to yet still another embodiment of the present invention.

The connecting pipe 2430 has a check valve 2431 that allows for a flow only in one direction. The check valve 2431 prevents the cooling water in the cooling water storage unit 2410 from flowing back to the boundary unit 2420 through the connecting pipe 2430.

Figure 15:
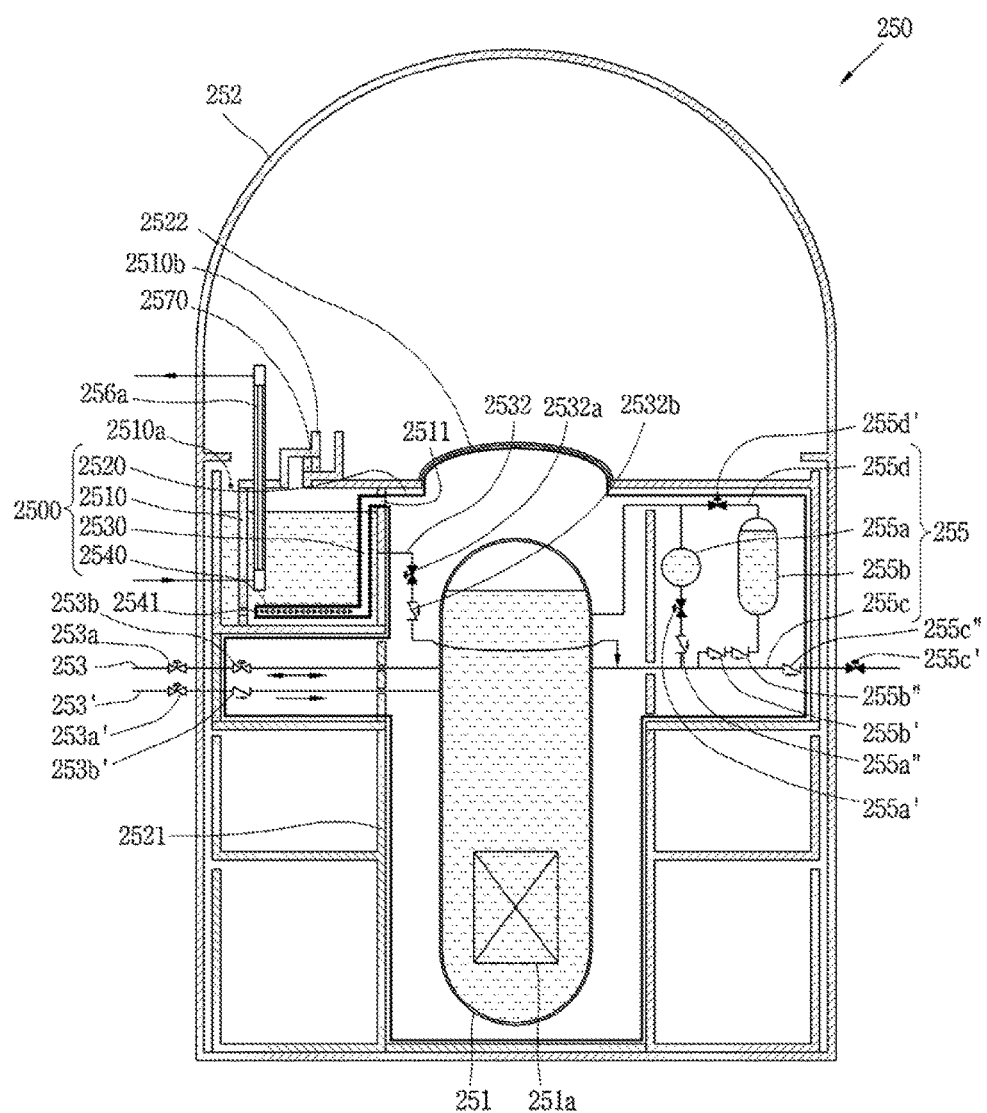
FIG. 15 is a concept view illustrating a facility for reducing radioactive material and a nuclear power plant having the same according to yet still another embodiment of the present invention.

FIG. 15 is a concept view illustrating a facility for reducing radioactive material and a nuclear power plant having the same according to yet still another embodiment of the present invention.

The cooling water storage unit 2500 may be connected with the safety injection line 255c. The pipe 2532 connecting the cooling water storage unit 2500 with the safety injection line 255c has an isolation valve 2532a and a check valve 2532b. If the isolation valve 2532a and the check valve 2532b are opened, the cooling water stored in the cooling water storage unit 2510 is injected into the reactor coolant system 251.

Figure 16:
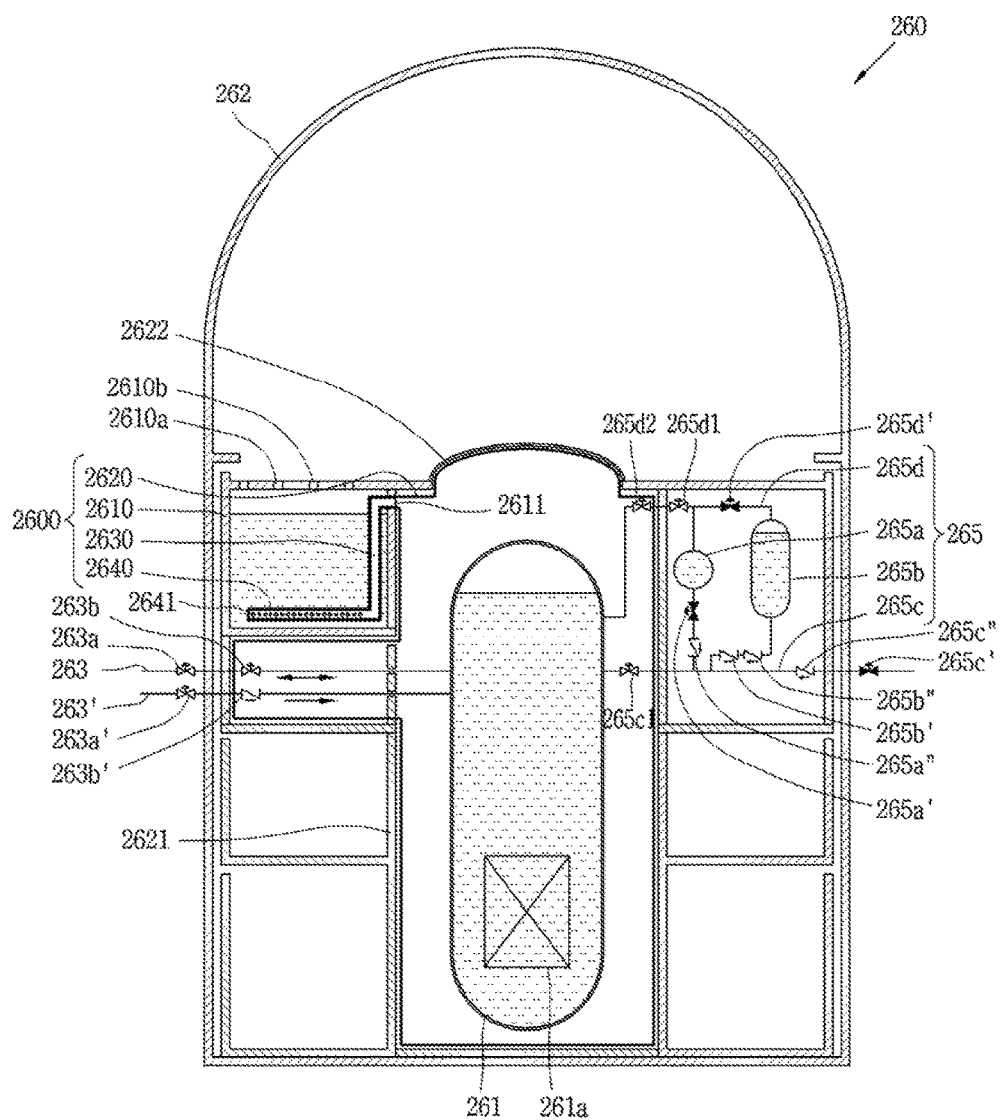
FIG. 16 is a concept view illustrating a facility for reducing radioactive material and a nuclear power plant having the same according to yet still another embodiment of the present invention.

FIG. 16 is a concept view illustrating a facility 2600 for reducing radioactive material and a nuclear power plant 260 having the same according to yet still another embodiment of the present invention.

The passive safety injection system 265 may be installed selectively in or outside the boundary unit 2620. Referring to FIG. 16, the passive safety injection system 265 is installed outside the boundary unit 2620.

The safety injection line 265c may have an isolation valve 265c1. The isolation valve 265c1 may be installed inside the boundary unit 2620.

The pressure balance line 265d may also have isolation valves 265d1 and 265d2. The isolation valves 265d1 and 265d2, respectively, may be installed in and outside the boundary unit 2620. Further, isolation valves or check valves may be added to the inside or outside of the boundary unit 2620.

Figure 17:
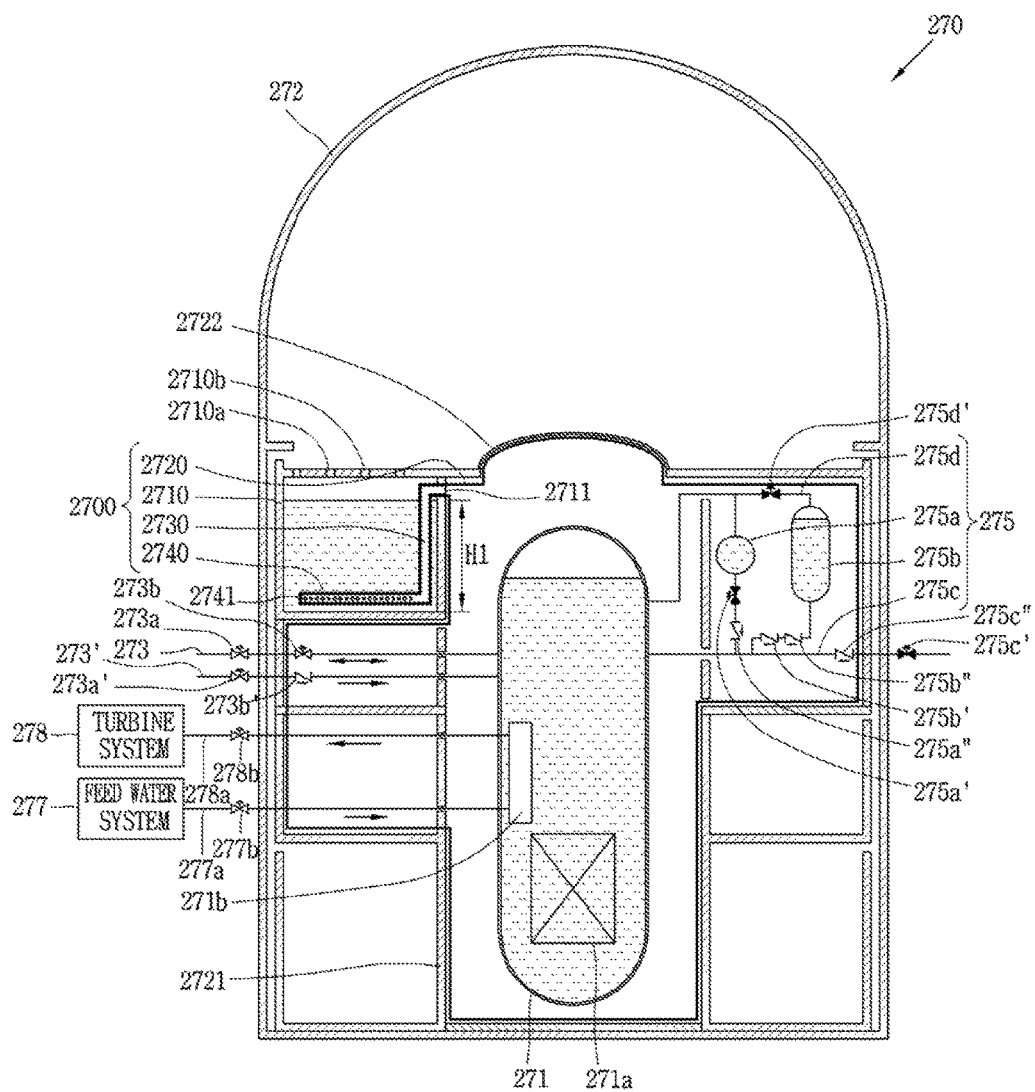
FIG. 17 is a concept view illustrating a facility for reducing radioactive material and a nuclear power plant having the same according to yet still another embodiment of the present invention.

FIG. 17 is a concept view illustrating a facility 2700 for reducing radioactive material and a nuclear power plant 270 having the same according to yet still another embodiment of the present invention.

The nuclear power plant 270 includes a feed water system 277 and a feed water supply line 277a. The feed water supply line 277a has an isolation valve 277b. Further, the nuclear power plant 270 includes a turbine system 278 and a steam line 278a. The steam line 278a also has an isolation valve 278b. When the nuclear power plant is in normal operation, water is supplied through the water supply line 277a to the reactor coolant system 271. The water receives heat from the core 271a while passing through the steam generator 271*b*, and generates steam. The steam may be supplied through the steam line 278*a* to the turbine system 278.

The feed water supply line 277*a* and the steam line 278*a* also pass through the boundary unit 2720 and the containment 272. Accordingly, the feed water supply line 277*a* and the steam line 278*a* are also examples of the penetration line described above.

The boundary unit 2720 extends up to a region adjacent to the containment 272 while surrounding the steam line 278*a*, the feed water supply line 277*a*, and the pipes 273 and 273' penetrating the containment. Accordingly, even when pipe breakage occurs in the boundary unit 2720, the radioactive material cannot exit the boundary unit 2720. Further, the boundary unit 2720 is expanded to the region adjacent to the containment 272, and the possibility that an accident such as feed line or steam line break accident occurs in the region between the boundary unit 2720 and the containment 272 may be significantly lowered. Accordingly, no isolation valve needs to be installed in the region between the boundary unit 2720 and the containment 272. Resultantly, the present invention may reduce the number of isolation valves for closing the pipe line when an accident occurs.

Figure 18:
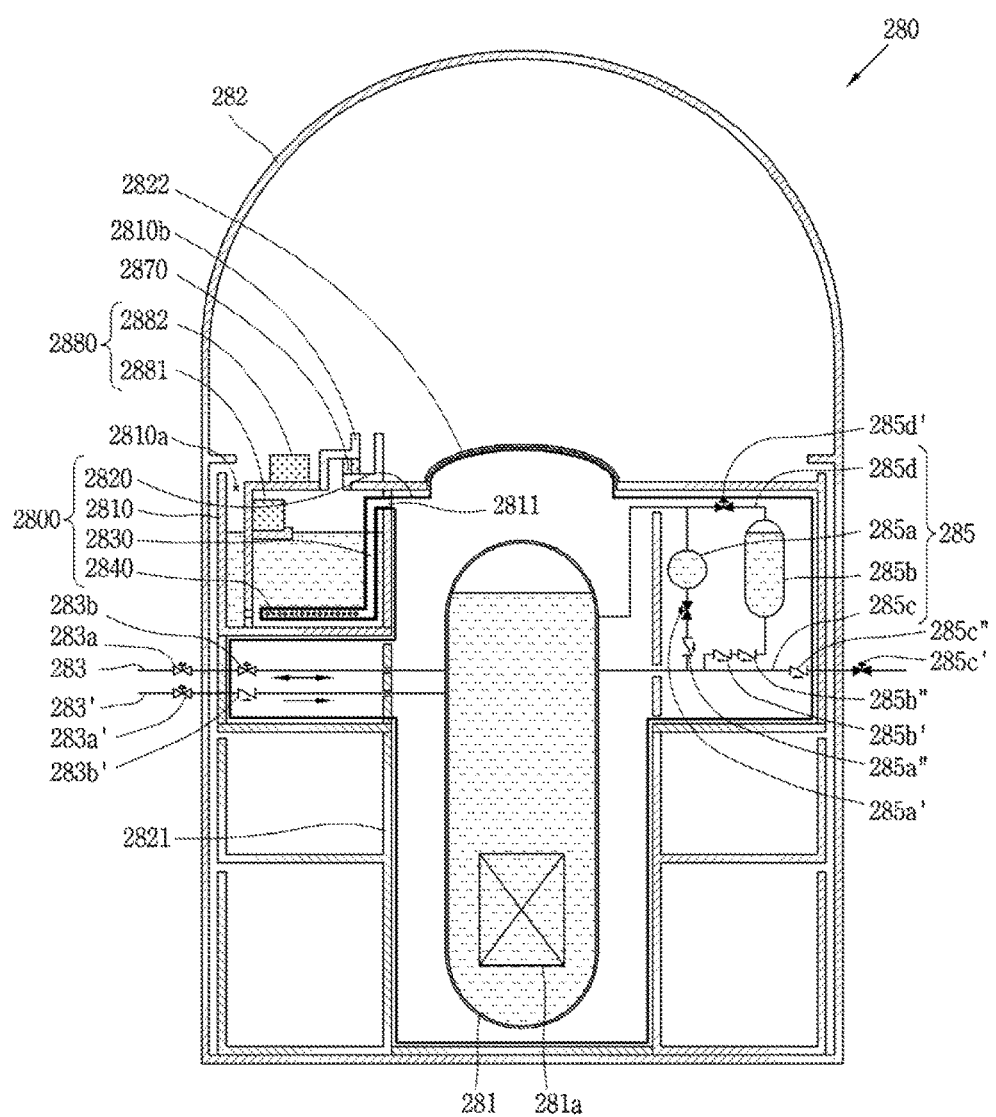
FIG. 18 is a concept view illustrating a facility for reducing radioactive material and a nuclear power plant having the same according to yet still another embodiment of the present invention.

FIG. 18 is a concept view illustrating a facility 2800 for reducing radioactive material and a nuclear power plant 280 having the same according to yet still another embodiment of the present invention.

Additive injection units 2880 include a first additive injection unit 2881 and a second additive injection unit 2882. The first additive injection unit 2881 is installed inside the cooling water storage unit 2810. The second additive injection unit 2882 may be installed in a fluid path of the cooling water recollecting portion 2810*a*.

The first additive injection unit 2881 may be installed at a predetermined height from the bottom of the cooling water storage unit 2810 to be submerged in the cooling water as the water level of the cooling water increases. If the fluid in the boundary unit 2820 is continuously sparged into the cooling water storage unit 2810, the water level of the cooling water storage unit 2810 gradually increases. If the water level of the cooling water storage unit 2810 is higher than the water level of the additive injection unit 2881, the additive injection unit 2881 is submerged in the cooling water. As the additive injection unit 2881 is submerged in the cooling water, the additive is dissolved in the cooling water.

Further, the second additive injection unit 2882 dissolves the additive in the condensed water recollected through the cooling water recollecting portion 2810*a* as described above.

Figure 19:
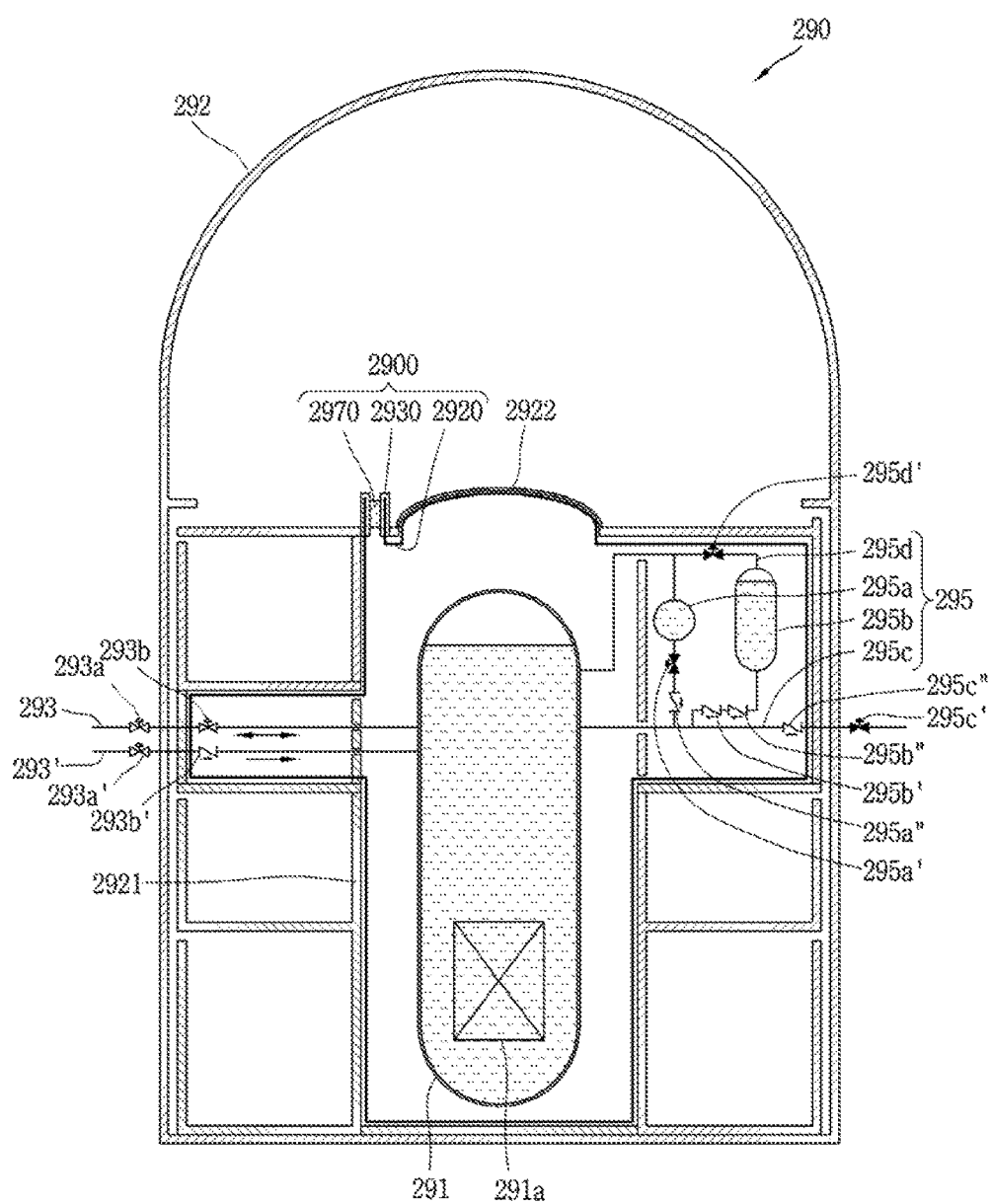
FIG. 19 is a concept view illustrating a facility for reducing radioactive material and a nuclear power plant having the same according to yet still another embodiment of the present invention.

FIG. 19 is a concept view illustrating a facility 2900 for reducing radioactive material and a nuclear power plant 290 having the same according to yet still another embodiment of the present invention.

The facility 2900 for reducing radioactive material is formed to configure a boundary of radioactive material between the containment 292 and the reactor coolant system 291. The facility 2900 for reducing radioactive material is configured to capture radioactive material that may be discharged to the containment 292 when an accident occurs in the nuclear power plant 290. The facility 2900 for reducing radioactive material includes a boundary unit 2920, a discharging unit 2930, and a filter facility 2970.

The boundary unit 2920 is installed inside the containment 292. The boundary unit 2920 forms a boundary of radioactive material in the containment 292. When an accident occurs, radioactive material may release from the reactor coolant system 291 or pipes 293, 293', and 295*c* connected with the reactor coolant system 291 to the inside of the containment 292. The boundary unit 2920 wraps around the reactor coolant system 291 and the pipes 293, 293' and 295*c* to prevent release of radioactive material to the containment 292.

The design pressure for radioactive material formed by the boundary unit 2920 is designed to withstand the pressure difference of a flow discharged from the discharging unit 2930 when an accident occurs. At least a portion of the boundary unit 2920 may be formed by a concrete structure inside the containment 292. Further, at least a portion of the boundary unit 2920 may be formed by a coating member such as a steel liner et. al. installed on the concrete structure.

The boundary unit 2920 may include a barrier 2921 and a cover 2922. The barrier 2921 is formed to wrap around the reactor coolant system 291. As shown in FIG. 19, the barrier 2921 is configured to wrap around the remaining part except the upper part of the reactor coolant system 291 at a position spaced apart from the reactor coolant system 291. The cover 2922 is formed to cover the upper part of the reactor coolant system 291 and is coupled with the barrier 2921. Accordingly, at the time the reactor coolant system 291 disposed inside the boundary unit 2920 needs maintenance, the cover 2922 may be separated from the barrier 2921 to expose the reactor coolant system 291.

The nuclear power plant 290 includes penetration pipes 293, 293' and 295*c* penetrating the containment 292. The terms "penetration pipes 293, 293' and 295*c*" may be used to denote all the pipes that have the feature of penetrating the containment 292. For example, if a pipe used to make a primary fluid flow and a pipe used to make a secondary fluid flow penetrate the containment 292, the pipes belong to the penetration pipes 293, 293' and 295*c*. Further, the safety injection line 295*c* that runs to the reactor coolant system 291 to form a safety injection fluid path also belongs to the penetration pipes 293, 293' and 295*c*. The penetration pipes 293, 293' and 295*c* are connected to the reactor coolant system 291 or connected to a secondary system.

The penetration pipes 293 and 203' may have isolation valves 293*a*, 293*b*, and 293*a*' or check valves 293*b*' at positions spaced apart from each other to doubly close the containment 292 and the boundary unit 2920 when breakage occurs. If the boundary unit 2920 and the containment 292 are spaced apart from each other and the penetration pipes 293 and 293' pass through the region between the boundary unit 2920 and the containment 292, an accident may occur due to breakage of the penetration pipes 293 and 293' in the region between the boundary unit 2920 and the containment 292. In such case, the radioactive material might not be trapped in the reactive boundary unit 2920. The isolation valves 293*a*, 293*b*, and 293*a*' have a mechanism to be opened and closed in response to a related safety system signal and thus may be likely to malfunction or halt. The check valve 293*b*' has a moving part and thus it is impossible to remove the possibility of malfunctioning or halting.

For the above reasons, the possibility of occurrence of a single failure may be granted an exception for some high-reliability devices, but the nuclear power plant 290 is basically designed to assume occurrence of a single failure when an accident occurs. Accordingly, considering a single failure, the isolation valves 293*a*, 293*b*, and 293*a*' or check valves 293*b*' should be installed at the portions of the penetration pipes 293 and 293' disposed between the containment 292 and the boundary unit 2920 to prevent additional release of radioactive material.

However, addition of the isolation valves 293*a*, 293*b*, and 293*a*' or check valves 293*b*' is not preferred in view of simplifying the facility. To address such issue, the present invention provides a structure that may prevent release of radioactive material even without installation of additional isolation valves 293a, 293b, and 293a' or check valves 293b'. Hereinafter, the structure is described in detail.

At least a portion of the boundary unit 2920 is expanded up to a region adjacent to the containment 292 while surrounding the penetration pipes 293 and 293' to prevent an accident from occurring due to breakage of the penetration pipes 293 and 293' in a region between the boundary unit 2920 and the containment 292. Due to such expanded structure of the boundary unit 2920, the portions of the penetration pipes 293 and 293', which pass through the containment 292 to the inside of the containment 292 are mostly positioned inside the boundary unit 2920. Accordingly, the present invention may significantly lower, by the expanded structure of the boundary unit 2920, the possibility that a loss-of-coolant accident, feed line break accident or steam line break accident occurs due to, e.g., breakage of the penetration pipes 293 and 293' in the region between the boundary unit 2920 and the containment 292.

The penetration pipes 293 and 293' may have a portion (first portion) disposed outside the containment 292, a portion (second portion) disposed inside the boundary unit 2920, and a portion (third portion) disposed between the containment 292 and the boundary unit 2920. Under accident, as a combination of valves for isolating the containment 292 from the boundary unit 2920, isolation valves 293a, 293b, and 293a' or check valve 293b' may be selectively adopted considering the direction of a flow in the penetration pipes 293 and 293' and flow resistance according to the characteristics of the nuclear power plant. The expanded structure of the boundary unit 2920 is configured to minimize the gap between the containment 292 and the boundary unit 2920. Accordingly, the expanded structure of the boundary unit 2920, even without additional installation of the isolation valves 293a, 293b, and 293a' at the third portion, may exclude the possibility that the penetration pipes 293 and 293' are broken at the third portion.

The discharging unit 2930 is installed at the boundary of radioactive material to form a fluid path that runs from the boundary unit 2920 to the containment 292. If a pressure difference is created between the containment 292 and the boundary unit 2920, the fluid flows from a place with a relatively high pressure to a place with a relatively low pressure. For example, when a loss-of-coolant accident occurs due to, e.g., pipe breakage, steam may be discharged from the reactor coolant system 291 or pipe connected with the reactor coolant system 291. In such case, the pressure inside the boundary unit 2920 is rendered to be higher than the pressure inside the containment 292. Accordingly, the fluid inside the containment 2920 is caused to flow to the containment 292. As used herein, the term "pressure inside the containment 292" refers to the pressure in the remaining space except the inner space in the containment 292 of the boundary unit 2920.

The discharging unit 2930 is configured to guide the fluid flow caused by the pressure difference between the containment 292 and the boundary unit 2920 from the boundary unit 2920 through the fluid path to the containment 292. The boundary unit 2920 forms a sealing structure around the reactor coolant system 291 to prevent the fluid from flowing from the boundary unit 2920 to the containment 292 through a path other than the fluid path formed by the discharging unit 2930. For example, the boundary unit 2920 may be configured to surround the reactor coolant system 291 at the position spaced apart from the reactor coolant system 291.

Accordingly, the fluid inside the boundary unit 2920 may be discharged into the containment 292 only through the fluid path formed by the discharging unit 2930 but cannot be discharged via other paths. As used herein, the term "inside the containment 292" refers to the remaining space in the containment 292 other than the inner space of the boundary unit 2920.

The filter facility 2970 is installed in the fluid path of the discharging unit 2930 to capture the radioactive material contained in the fluid passing through the discharging unit 2930 in the boundary unit 2920. The filter facility 2970 is configured to capture radioactive material in the boundary unit 2920 while the atmosphere inside the boundary unit 2920 is discharged through the fluid path of the discharging unit 2930 to the inside of the containment 292.

The filter facility 2970 includes at least one of a filter and an absorbent. The term "additive" may be interchangeably used with the term "absorbent."

As the filter, a high-efficiency particulate air (HEPA) filter may be adopted. The gaseous radioactive material contained in the fluid is removed while passing through the filter. For example, in case the radioactive material is iodine, iodine is combined with silver nitrate while passing through the filter to thus turn into iodic silver. Iodic silver may be separated from the fluid. Accordingly, the filter is configured to allow silver nitrate react with iodine contained in the fluid to form iodic silver. The filter is formed to eliminate iodic silver from the fluid.

As the absorbent, charcoal may be employed. Organic iodine compounds are combined with the materials impregnated in the charcoal to turn into quaternary ammonium salt and are absorbed into the charcoal. Molecular iodine is combined with the charcoal through chemisorption. The charcoal is utilized as an absorbent material thanks to its large internal surface area. Accordingly, the absorbent is configured to remove iodine contained in the fluid through chemisorption that is made by charcoal.

However, the above-described filter and the absorbent are merely an example, and the type of filter and absorbent according to the present invention is not limited thereto.

In order to prevent damage to the containment 292 that may occur due to a significant increase in the pressure inside the containment 292 and occurrence of an accident and to decrease the concentration of radioactive material discharged to the external environment, AREVA, France, and Westinghouse, U.S., have developed a filtered containment ventilation system (FCVS). The FCVS has a filter facility at the boundary between the inside and outside of the containment 292 and opens the boundary (using a breaking plate or valve) when an accident occurs to significantly increase the pressure inside the containment 292, and discharges the atmosphere inside the containment 292 through the filter facility.

In case a beyond design basis accident (the beyond design basis accident refers to an accident that causes the pressure inside the containment 292 to be significantly increased to a design pressure or more) occurs in the nuclear power plant 290 adopting the FCVS, the breaking plate or valve installed between the inside of the containment 292 and the filter facility is opened, and a flow is caused by the pressure difference between the inside and outside of the containment 292 (between the high pressure created inside the containment 292 and the atmospheric pressure outside the containment 292). The flow causes the atmosphere (air and steam) inside the containment 292 to pass through the filter facility and to be then discharged to the outside of the containment 292.

However, the above-described, conventional FCVS is not operated when the design basis accident occurs, and the radioactive material is directly discharged to the inside of the containment 292. Accordingly, the conventional FCVS, upon occurrence of a design basis accident, cannot lower the concentration of radioactive material inside the containment 292 and cannot resultantly suppress a certain amount of radioactive material releasing to the outside of the containment 292.

In contrast, the present invention is configured to operate even when all types of accidents occur including a design basis accident and beyond design basis accident. The present invention is configured to force radioactive material in the boundary unit 2920 and to discharge a fluid having a low concentration of radioactive material to be discharged to the containment 292. The radioactive material is captured in the boundary unit 2920 while passing through the filter facility 2970. The present invention may reduce the concentration of radioactive material in the containment 292 in a very efficient manner, thus leading to a significant reduction in the amount of radioactive material releasing to the outside of the containment 292.

The nuclear power plant 290 may further include a passive safety injection system 295 configured to inject a coolant into the reactor coolant system 291 using a natural force when an accident occurs. The passive safety injection system 295 may include a core makeup tank 295a and a safety injection tank 295b.

The core makeup tank 295a is formed to store a coolant such as low-temperature boric acid solution. The core makeup tank 295a is installed to have a height gap from the reactor coolant system 291. The core makeup tank 295a and the reactor coolant system 291 may be connected with each other by the pressure balance line 295d. The pressure balance line 295d is configured to form a pressure balance between the reactor coolant system 291 and the core makeup tank 295a and is for allowing for coolant injection from the core makeup tank 295a by gravity.

The safety injection tank 295b is formed to store a coolant such as low-temperature boric acid solution. The safety injection tank 295b and the reactor coolant system 291 may be connected with each other through the pressure balance line 295d. The safety injection tank 295b may be filled with some gas (typically, nitrogen gas). The pressure of the gas is set to be lower than the pressure of the reactor coolant system 291 that is in normal operation. When the nuclear power plant 290 is in normal plant operation, the safety injection tank 295b is isolated by the check valve, so that the coolant inside the safety injection tank 295b is not injected to the reactor coolant system 291.

The passive safety injection system 295 includes a safety injection line 295c connected with the reactor coolant system 291 to form an injection fluid path for coolant. The core makeup tank 295a and the safety injection tank 295b are connected with the reactor coolant system 291 through the safety injection line 295c. The safety injection line 295c forms a fluid path for the coolant injected from the core makeup tank 295a and the safety injection tank 295b to the reactor coolant system 291.

The safety injection line 295c may penetrate the containment 292. Accordingly, the safety injection line 295c may be configured of an example of the above-described penetration pipes 293 and 293'. The expanded structure of the boundary unit 2920 may apply to the safety injection line 295c as well. At least a portion of the boundary unit 2920 may be expanded up to a region adjacent to the containment 292 while surrounding the safety injection line 295c to prevent a loss-of-coolant accident that may occur due to breakage of the safety injection line 295c between the boundary unit 2920 and the containment 292. The other description of the expanded structure of the boundary unit 2920 is replaced by what has been described above therefor.

FIG. 19 is a view illustrating a normal operation state of the nuclear power plant 290. Accordingly, the isolation valves 293a, 293b, and 293a' installed on the pipes 293 and 293' for normal operation of the nuclear power plant 290 stay opened. In the normal operation of the nuclear power plant 290, no steam is discharged from the reactor coolant system 291, and thus, the pressure balance is maintained between the boundary unit 2920 and the containment 292.

Figure 20:
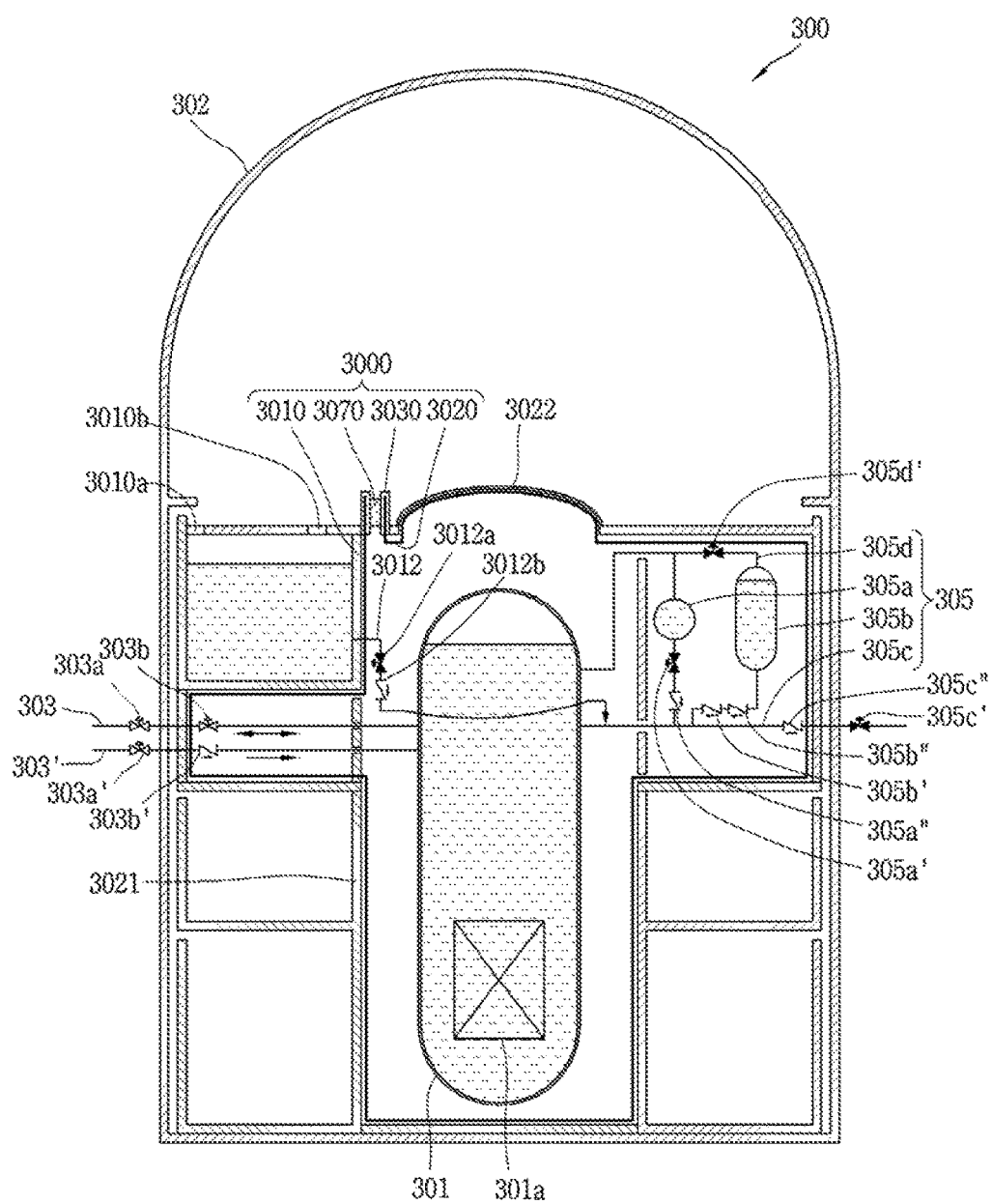
FIG. 20 is a concept view illustrating a facility for reducing radioactive material and a nuclear power plant having the same according to yet still another embodiment of the present invention.

FIG. 20 is a concept view illustrating a facility 3000 for reducing radioactive material and a nuclear power plant 300 having the same according to yet still another embodiment of the present invention.

The facility for reducing radioactive material includes a boundary unit 3020, a discharging unit 3030, and a filter facility 3070. The facility for reducing radioactive material further includes a cooling water storage unit 3010, a cooling water recollecting portion 3010a and an opening portion 3010b.

The cooling water storage unit 3010 is installed inside the containment 302. For example, the cooling water storage unit 3010 may be installed in an upper or lower part of an inner space of the containment 302. The cooling water storage unit 3010 is formed to store cooling water and may be formed as a tank or pool.

Among other radioactive materials spread to the external environment when an accident occurs in the nuclear power plant 300, iodine may have a highest concentration. Iodine, when contacting water, is mostly dissolved in the water. The cooling water storage unit 3010 retains cooling water that may dissolve iodine.

Most of the radioactive materials are captured in the boundary unit 3020 by the filter facility 3070 while passing through the discharging unit 3030. However, a small amount of radioactive material is not captured by the filter facility 3070 and may be discharged to the containment 302 or a small amount of radioactive material may leak from the boundary unit 3020. However, a small amount of radioactive material discharged to the containment 302, if dissolved by sprayed or condensed water of other containment 302 safety systems (for example, a containment spray system or cooling system) that may be employed as per the characteristics of the nuclear power plant 300 to be captured in the cooling water of the cooling water storage unit 3010, may be cut off from releasing to the external environment. Accordingly, the cooling water storage unit 3010 may support the function of the filter facility 3070.

The cooling water recollecting portion 3010a forms a fluid path that runs from the containment 302 to the cooling water storage unit 3010 to recollect the condensed water created from the fluid discharged through the discharging unit 3030 to the containment 302 to the cooling water storage unit 3010. However, in case the safety system is configured in combination with the spray system (not shown), the sprayed cooling water is also recollected to the cooling water recollecting portion 3010a. For example, the cooling water recollecting portion 3010a may be disposed to be adjacent to the inner wall of the containment 302 so that the condensed water flowing down the inner wall of the containment 302 is collected to the cooling water storage unit 3010. However, the shape of the cooling water recollecting portion 3010 may be selectively adopted according to the characteristics of the nuclear power plant 300. According to the present invention, the cooling water recollecting portion 3010a has a structure of introducing the cooling water inside the containment 302 such as sprayed water or condensed water to the cooling water storage unit 3010 and is not limited to a special shape of the cooling water recollecting portion 3010a.

A portion of the fluid discharged through the discharging unit 3030 to the containment 302 is condensed to form condensed water. The concentration of boric acid in the condensed water is low, and the condensed water may contain a small amount of radioactive material. The condensed water is recollected from the containment 302 through the cooling water recollecting portion 3010a to the cooling water storage unit 3010.

The opening portion 3010b is formed by opening at least a portion of the cooling water storage unit 3010 to maintain a pressure balance between the inside of the containment 302 and the cooling water storage unit 3010. If a pressure difference is created between the cooling water storage unit 3010 and the containment 302, the cooling water storage unit 3010 and the containment 302 may re-form a pressure balance by the opening portion 3010b.

The cooling water storage unit 3010 may be configured of a single facility for the facility 3000 for reducing radioactive material only, but may be shared with other systems (for example, passive safety injection system 305, residual heat removing system, etc.). Hereinafter, an example where the facility 3000 for reducing radioactive material and the passive safety injection system 305 share the cooling water storage unit 3010 is described.

The cooling water storage unit 3010 is connected to the safety injection line 305c to inject the cooling water retained therein to the inside of the reactor coolant system 301. The cooling water storage unit 3010 is installed at a higher position than the reactor coolant system 301. The pipe 3012 connecting the cooling water storage unit 3010 with the safety injection line 305c has an isolation valve 3012a and a check valve 3012b. If the isolation valve 3012a is opened by a related signal when an accident occurs, a cooling water flow is generated from the cooling water storage unit 3010 to the reactor coolant system 301. The check valve 3012b is opened by the flow of cooling water, and the cooling water is injected through the safety injection line 305c to the reactor coolant system 301.

Figure 21:
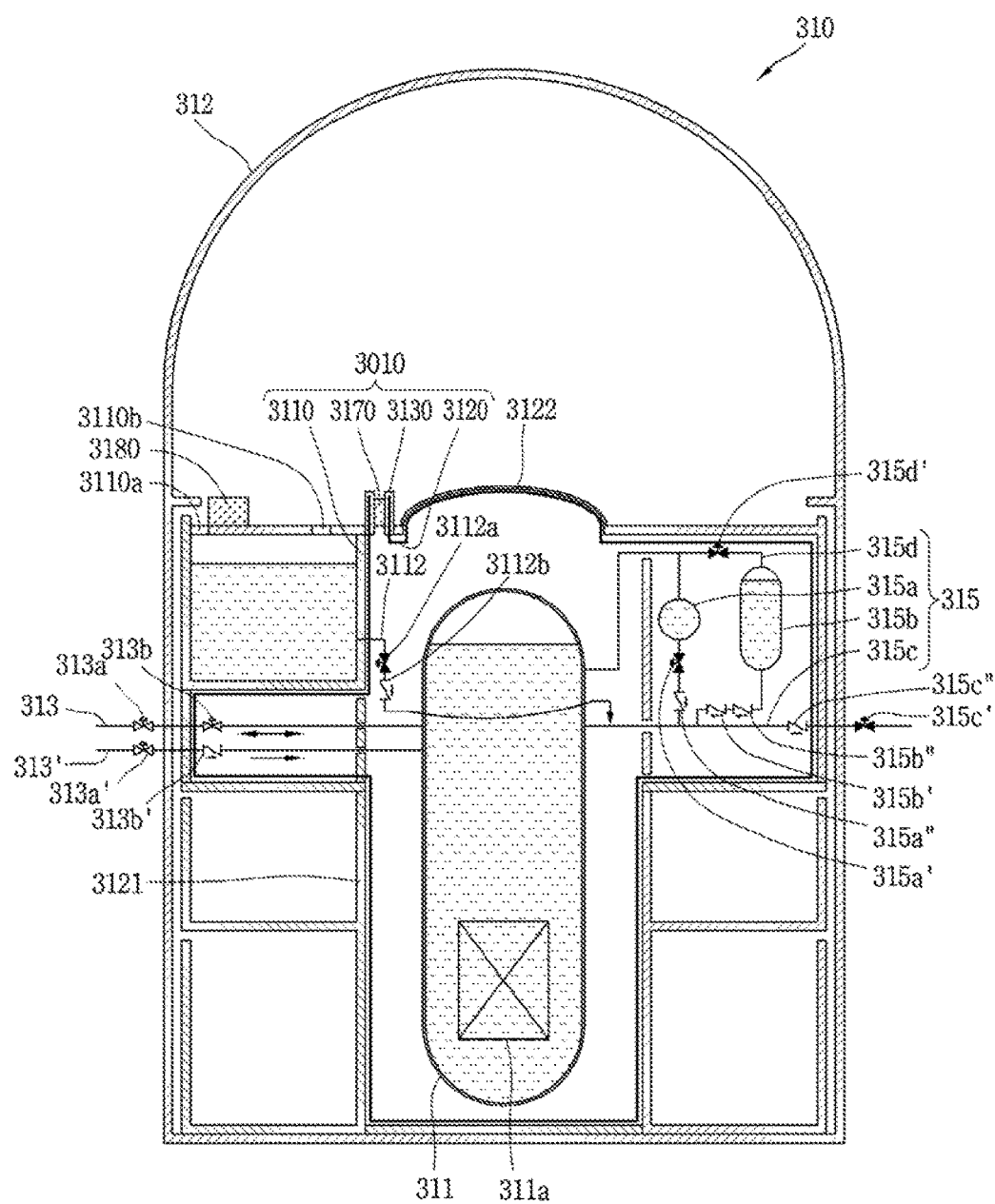
FIG. 21 is a concept view illustrating a facility for reducing radioactive material and a nuclear power plant having the same according to yet still another embodiment of the present invention.

FIG. 21 is a concept view illustrating a facility 3100 for reducing radioactive material and a nuclear power plant 310 having the same according to yet still another embodiment of the present invention.

The facility 3100 for reducing radioactive material further includes an additive injection unit 3180.

The additive injection unit 3180 supplies an additive to increase the pH of the coolant to a predetermined value or more (typically pH 7 or more) to prevent volatilization of the radioactive material dissolved in the cooling water storage unit 3110. As illustrated, the additive injection unit 3180 may be installed in a fluid path of the cooling water recollecting portion 3110a to dissolve the additive in the cooling water, such as sprayed water or condensed water, to the cooling water storage unit 3110.

Radioactive iodine dissolved in the cooling water exists in the form of negative ions. In case the pH of the cooling water in which iodine is dissolved is low, the amount of radioactive iodine that is to be re-volatilized may be significantly increased. This is why the amount of radioactive iodine that is converted into volatilizable elemental iodine (12) is sharply increased in the cooling water of pH 7 or less. Besides, the amount that turns into elemental iodine is associated with the temperature of the cooling water and the concentration of iodine in the solution. The elemental iodine may be re-volatilized in the atmosphere according to a separation coefficient defined as a ratio in concentration of iodine in the atmosphere to iodine in the cooling water. According to related regulations, in case the pH of the cooling water is higher than 7.0, the amount that turns into elemental iodine is significantly reduced, so that re-volatilization may be negligible.

The additive injection unit 3180 supplies an additive to the cooling water, such as sprayed or condensed water, recollected to the cooling water storage unit 3110 to prevent re-volatilization of radioactive material. As the additive, sodium phosphate may be adopted. Sodium phosphate adjusts the pH of the cooling water to prevent re-volatilization of the radioactive nuclide or corrosion of the inside of the containment 312 upon accident. However, the type of additive according to the present invention is necessarily limited thereto. Boric acid to suppress the reactivity of the core 311a or other additives to suppress corrosion of the device may be added so that the water quality of the cooling water storage unit 3110 is passively managed.

Figure 22:
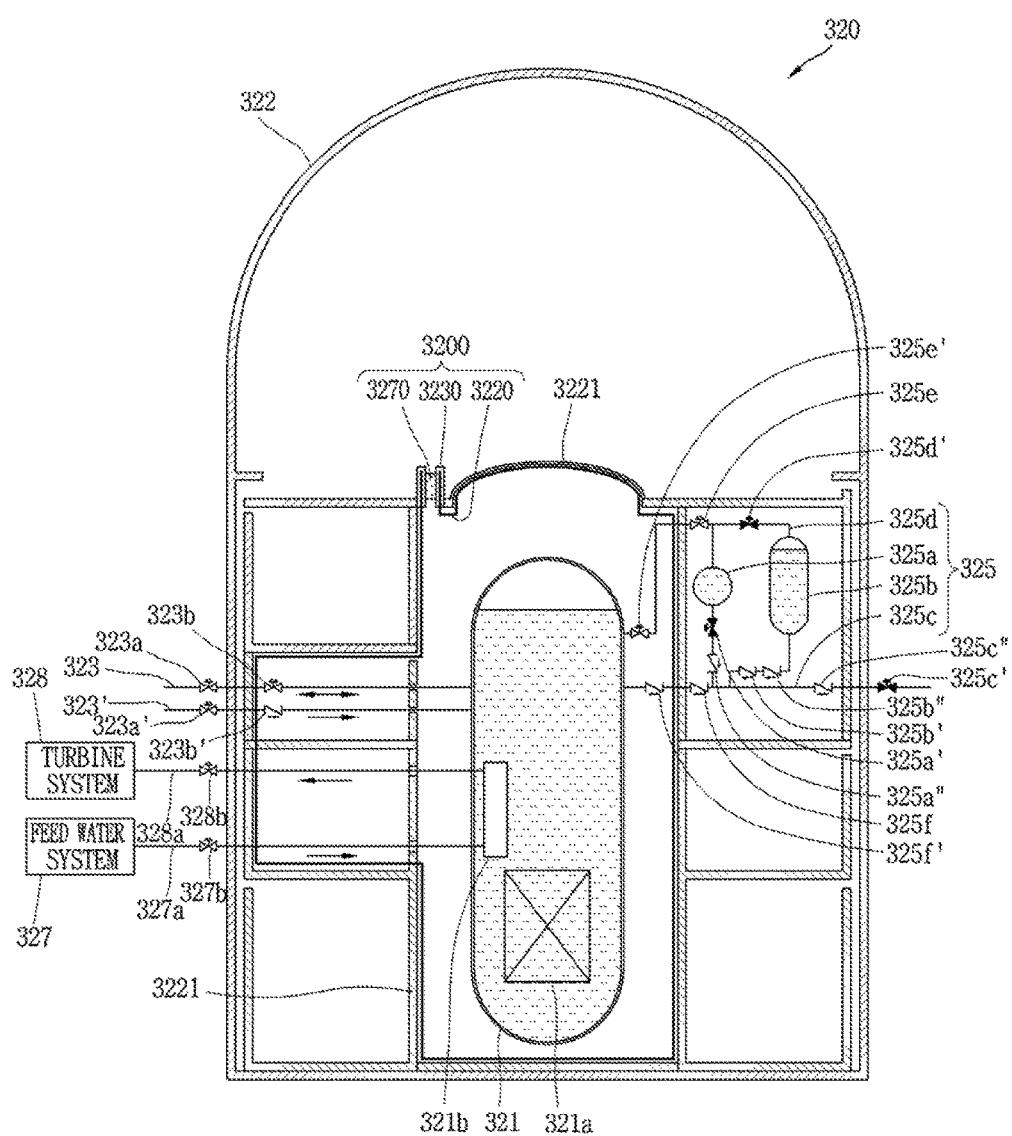
FIG. 22 is a concept view illustrating a facility for reducing radioactive material and a nuclear power plant having the same according to yet still another embodiment of the present invention.

FIG. 22 is a concept view illustrating a facility 3200 for reducing radioactive material and a nuclear power plant 320 having the same according to yet still another embodiment of the present invention.

The nuclear power plant 320 includes a steam generator 321b. The steam generator 321b is installed at the boundary between the primary system and the secondary system and generates steam through heat transfer of the primary fluid and secondary fluid. The steam generator 321b forms a pressure boundary between the fluid path of the primary fluid and the fluid path of the secondary fluid path and thus the primary fluid and the secondary fluid are not mixed with each other.

In the normal operation of the nuclear power plant 320, the feed water system 327 supplies water (secondary fluid) through the feed water supply line 327a to the steam generator 321b. The heat generated in the core 321a is transferred to the primary fluid, and the primary fluid transfers heat to the secondary fluid while passing through the steam generator 321b. The supplied water receives heat from the primary fluid while passing through the steam generator 321b, and turns into steam. The steam discharged from the steam generator 321b is delivered through the steam line 328a to the turbine system 328. In normal operation of the nuclear power plant 320, the isolation valves 327b and 328b installed on the feed water supply line 327a and the steam line 328a remain opened.

The feed water supply line 327a and the steam line 328a may pass through the containment 322. Accordingly, the feed water supply line 327a and the steam line 328a may be configured as examples of the above-described penetration pipes 323 and 323'. At least a portion of the boundary unit 3220 may be expanded up to a region adjacent to the containment 322 while surrounding the feed water supply line 327a and the steam line 328a as well as the penetration pipes 323 and 323' to prevent an accident from occurring due to breakage of the feed water supply line 327a and the steam line 328a between the boundary unit 3220 and the containment 322.

Accordingly, the present invention may significantly lower the possibility that a steam line break accident or feed line break accident occurs due to breakage of the water supply line 327a or steam line 328a in the region between the boundary unit 3220 and the containment 322 by way of the expanded structure of the boundary unit 3220. The facility 3200 for reducing radioactive material may minimize the gap between the boundary unit 3220 and the containment 322 by the expanded structure of the boundary unit 3220 to exclude the possibility that the penetration pipes 323 and 323' occur at the portion therebetween.

Unlike described above, various tanks 325a and 325b of the passive safety injection system 325, rather than positioned inside the boundary unit 3220, may be disposed between the boundary unit 3220 and the containment 322. The safety injection line 325c may be split into a portion disposed inside the boundary unit 3220, a portion disposed between the boundary unit 3220 and the containment 322, and a portion disposed outside the containment 322. Since the passive safety injection system 325 is disposed outside the boundary unit 3220, check valves 325f and 325f' are added to the safety injection line 325c, and isolation valves 325e and 325e' are added to the pressure balance line 325d. However, the check valves 325f and 325f' or isolation valves 325e and 325e' may be selectively adopted considering the conditions such as direction of flow and flow resistance.

Figure 23:
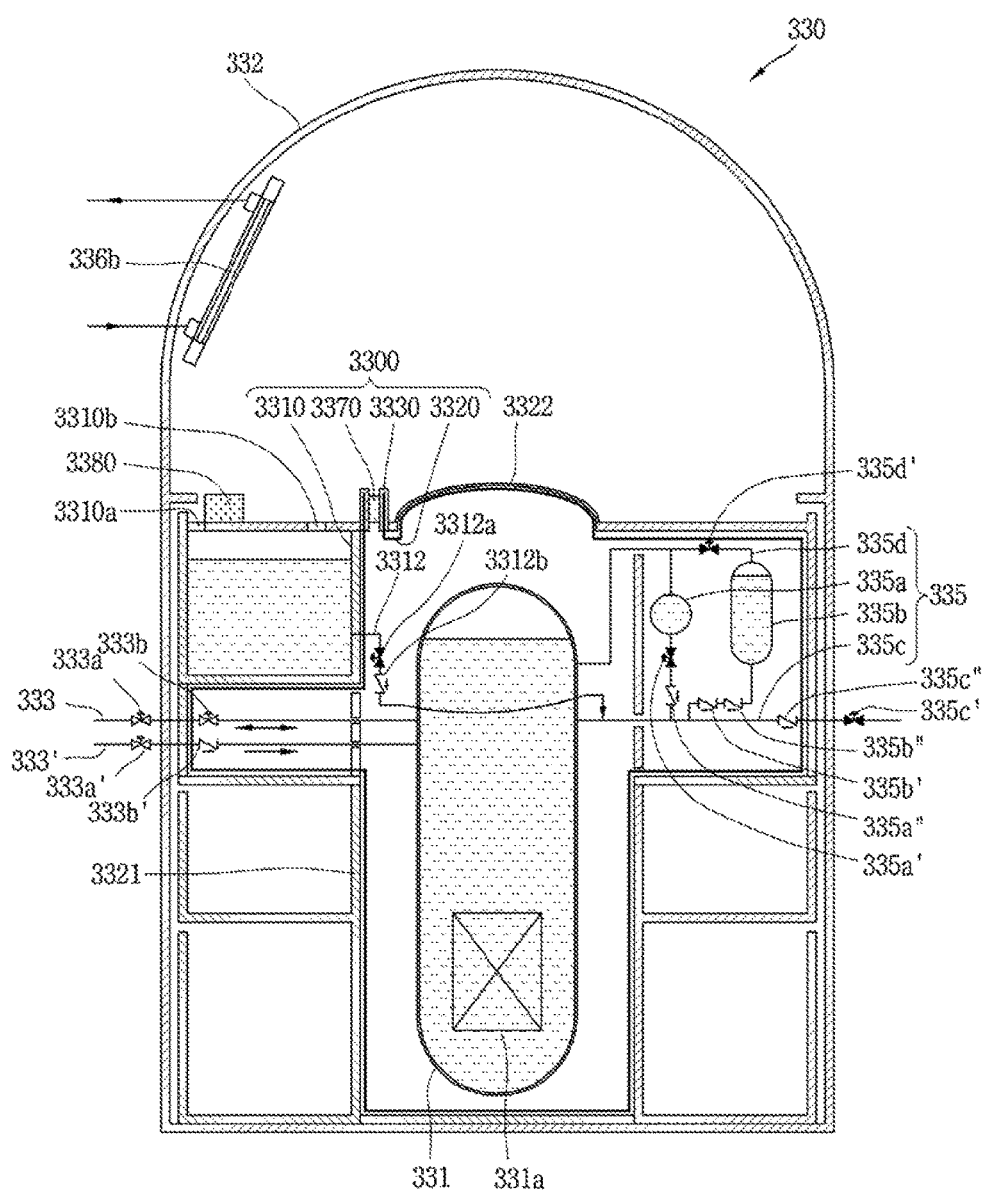
FIG. 23 is a concept view illustrating a facility for reducing radioactive material and a nuclear power plant having the same according to yet still another embodiment of the present invention.

FIG. 23 is a concept view illustrating a facility 3300 for reducing radioactive material and a nuclear power plant 330 having the same according to yet still another embodiment of the present invention.

The nuclear power plant 330 further includes a containment cooling system configured to suppress a rise in pressure inside the containment 332. The containment cooling system may be a passive containment cooling system that suppresses a rise in the pressure inside the containment 332 using natural circulation.

The passive containment cooling system has a heat exchanger 336b. The heat exchanger 336b, as shown in FIG. 23, may be installed in the atmosphere of the containment 332. However, the position of the heat exchanger 336b is not necessarily limited thereto, and may be disposed in the cooling water storage unit 3310. The cooling fluid is heat-exchanged with the atmosphere inside the containment 332 while passing through the heat exchanger 336b and is heated. The density of the heated cooling fluid is reduced, and the cooling fluid goes up along the fluid path of the heat exchanger 336b. The cooling fluid is discharged from the heat exchanger 336b to the outside of the containment 332.

The steam discharged from the boundary unit 3320 to the containment 332 is condensed in the heat exchanger 336b by natural circulation. The phenomenon that the steam is condensed to turn into condensed water reduces the steam partial pressure inside the containment 332 and thus functions to suppress a rise in the pressure inside the containment 332. Typically, the passive containment cooling system shows a lower efficiency of reducing radioactive material as compared with the typical active containment spray system. However, in case the facility 3300 for reducing radioactive material proposed herein is adopted along with the passive containment cooling system, the concentration of radioactive material discharged by the facility 3300 for reducing radioactive material to the inside of the containment 332 may be remarkably reduced to solving the problems of the passive containment cooling system.

The cooling water recollecting portion 3310a is disposed at a lower part of the heat exchanger 336b to recollect the condensed water created by the operation of the heat exchanger 336b to the cooling water storage unit 3310. The condensed water generated in the heat exchanger 336b may be dropped and recollected to the cooling water storage unit 3310 through the fluid path of the cooling water recollecting portion 3310a. In the process of recollecting the condensed water, the condensed water may be supplied with an additive from the additive injection unit 3380. Accordingly, the pH of the condensed water may be adjusted, and the condensed water may be prevented from re-volatilization.

Figure 24A:
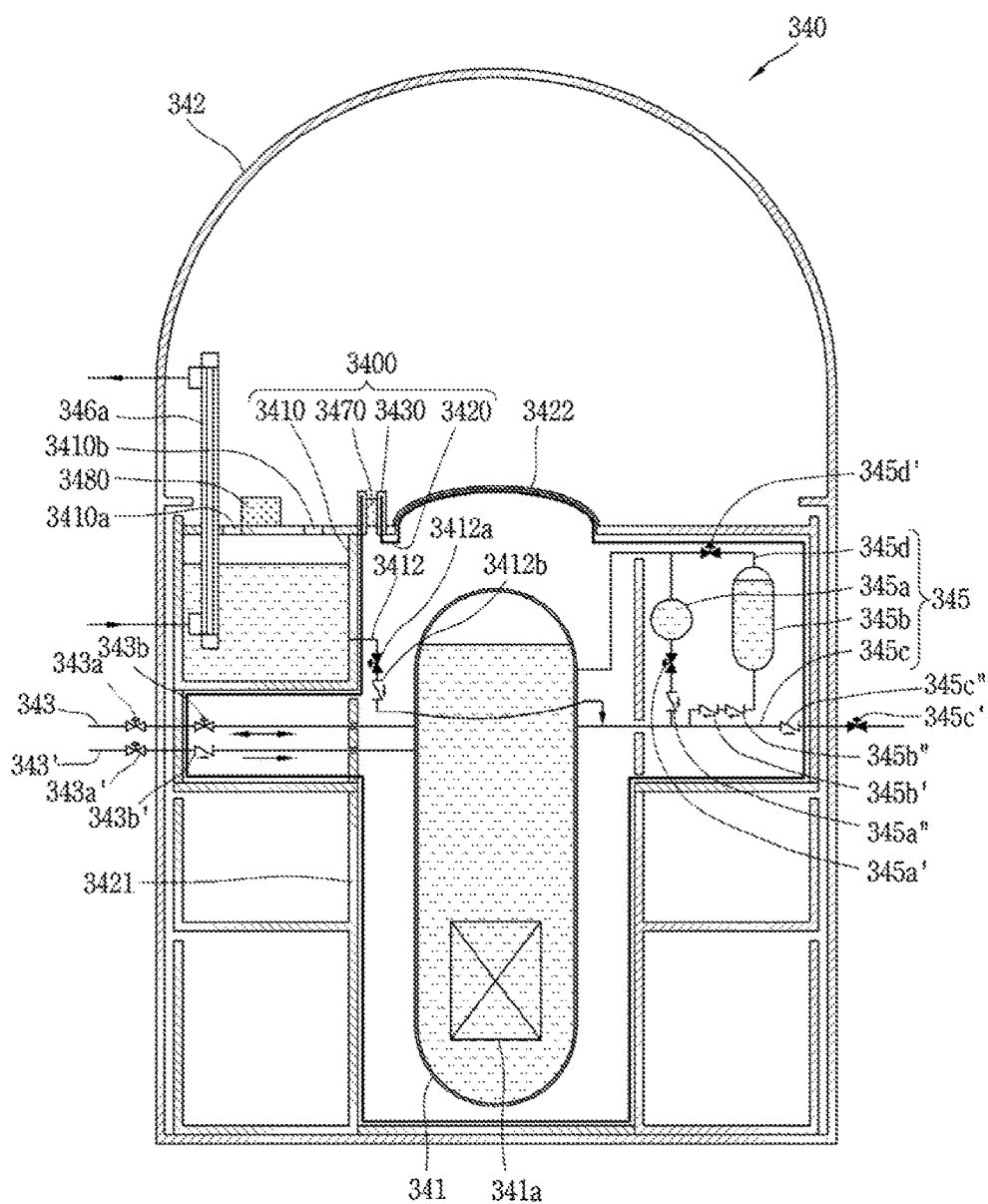
FIG. 24A is a concept view illustrating the normal operation of a facility for reducing radioactive material and a nuclear power plant having the same according to yet still another embodiment of the present invention.

FIG. 24A is a concept view illustrating the normal operation of a facility 3400 for reducing radioactive material and a nuclear power plant 340 having the same according to yet still another embodiment of the present invention.

The heat exchanger 346a of the passive containment cooling system may be formed to cool both the cooling water in the cooling water storage unit 3410 and the atmosphere in the containment 342. At least a portion of the heat exchanger 346a is submerged in the cooling water storage unit 3410 and may be extended up to the inner space of the containment 342 from the cooling water storage unit 3410.

Among the pipes 343, 343' and 345c penetrating the containment 342, the pipes 343 and 343' for normal operation of the nuclear power plant 340 allow the fluid to flow therethrough. The isolation valves 343a, 343b, and 343a' and the check valve 343b' installed on the pipes 343 and 343' are required for normal operation of the nuclear power plant 340. During the normal operation of the nuclear power plant 340, the isolation valves 343a, 343b, and 343a' and the check valve 343b' installed on the pipes 343 and 343' remain opened.

Figure 24B:
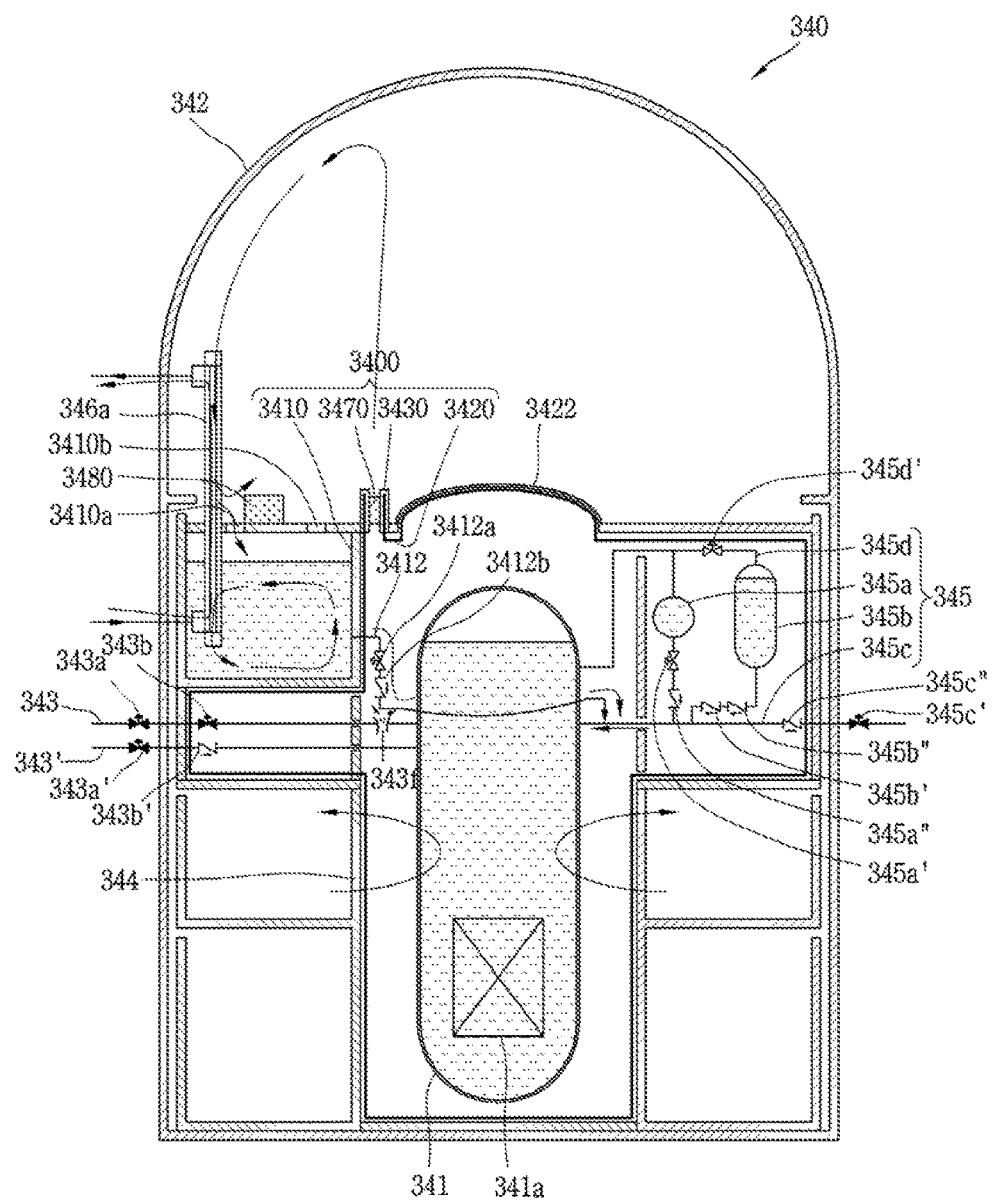
FIG. 24B is a concept view illustrating an example in which an accident occurs in a facility for reducing radioactive material and a nuclear power plant having the same according to yet still another embodiment of the present invention.

FIG. 24B is a concept view illustrating an example in which an accident occurs in a facility 3400 for reducing radioactive material and a nuclear power plant 340 having the same according to yet still another embodiment of the present invention.

If an accident occurs in the nuclear power plant 340, the nuclear power plant 340 may remain in safe shutdown condition by the operation of various safety systems. The passive residual heat removing system 344 removes sensible heat in the reactor coolant system 341 and residual heat in the core 341a. The passive containment cooling system suppresses a rise in the pressure inside the containment 342. The passive safety injection system 345 maintains the water level of the reactor coolant system 341. The facility 3400 for reducing radioactive material captures radioactive material in the boundary unit 3420.

If an accident such as a loss-of-coolant accident occurs, steam is discharged from the broken line 343f. The discharged steam may be mixed with the atmosphere present inside the boundary unit 3420. Since upon accident the isolation valves 343a, 343b, and 343a' and the check valve 343b' are closed, the fluid does not flow any longer through the pipes 343 and 343' for normal operation of the nuclear power plant 340.

As steam is continuously discharged from the reactor coolant system 341, the pressure inside the boundary unit 3420 is gradually increased, and a pressure difference is generated between the inside of the boundary unit 3420 and the inside of the containment 342. The fluid created as the atmosphere and steam are mixed with each other forms a flow by the pressure difference. The fluid is discharged from the boundary unit 3420 through the discharging unit 3430 to the containment 342. The radioactive material contained in the fluid is captured in the boundary unit 3420 while passing through the filter facility 3470 installed in the discharging unit 3430.

The remaining fluid except the radioactive material is discharged to the inner space of the containment 342. The fluid discharged to the containment 342 is mixed with the atmosphere in the containment 342. Accordingly, the pressure and temperature of the containment 342 are gradually increased. However, the heat exchanger 348 of the passive containment cooling system is operated to suppress a rise in the pressure of the containment 342. The atmosphere in the containment 342 (including the fluid discharged to the containment 342) and the fluid supplied from the outside of the containment 342 exchange heat with each other while flowing through different fluid paths from each other. Accordingly, the atmosphere in the containment 342 is cooled and condensed in the heat exchanger 346a by natural circulation.

The atmosphere in the containment 342 is cooled and condensed by the operation of the heat exchanger 346a. The air contained in the atmosphere of the containment 342 is discharged back to the inside of the containment 342, and the condensed water generated as the steam is condensed is recollected to the cooling water storage unit 3410 through the cooling water recollecting portion 3410a. In this process, the condensed water is supplied with an additive for preventing re-volatilization from the additive injection unit 3480. Accordingly, the condensed water is recollected to the cooling water storage unit 3410, and the condensed water may be prevented from re-volatilization.

The cooling water stored in the cooling water storage unit 3410 is cooled by the heat exchanger 346a by natural circulation.

The passive safety injection system 345 injects cooling water to the reactor coolant system 341.

If upon accident a phenomenon such as reduction in pressure of the reactor coolant system 341 occurs, the isolation valve 345a' installed on the pipe connecting the core makeup tank 345a with the safety injection line 345c is opened in response to a related signal. A flow of the cooling water is caused by gravity water head from the core makeup tank 345a to the reactor coolant system 341, and the check valve 345a" is opened by the flow of the cooling water. The cooling water is injected from the core makeup tank 345a through the safety injection line 345c to the reactor coolant system 341.

If, upon accident, a phenomenon in which the pressure inside the reactor coolant system 341 is reduced to a predetermined value or less, for example, the isolation valve 345d' installed on the pressure balance line 345d is opened by a related signal. The steam supplied from the reactor coolant system 341 is injected to the safety injection tank 345b through the pressure balance line 345d, and the pressure inside the safety injection tank 345b increases. If the pressure balance is formed between the reactor coolant system 341 and the safety injection tank 345b, the cooling water inside the safety injection tank 345b is injected to the reactor coolant system 341 by gravity water head. The check valve 345b' is opened by the flow of the cooling water, and the cooling water is injected to the reactor coolant system 341 through the safety injection line 345c.

The cooling water retained in the cooling water storage unit 3410 may be used for safety injection. The isolation valve 3412a installed on the pipe 3412 connecting the cooling water storage unit 3410 with the safety injection line 345c is opened by a related signal, and as the reactor coolant system 341 is cooled after accident, the pressure inside the reactor coolant system 341 and the pressure inside the cooling water storage unit 3410 form a pseudo-balanced state, a flow of the cooling water is caused by gravity from the cooling water storage unit 3410. The term "pseudo-balance" refers to a state that is not the theoretically complete balanced state but is close to the balanced state enough to form a flow of the cooling water. As the cooling water flows, the check valve 3412b is opened, and the cooling water may be injected to the reactor coolant system 341.

Figure 25A:
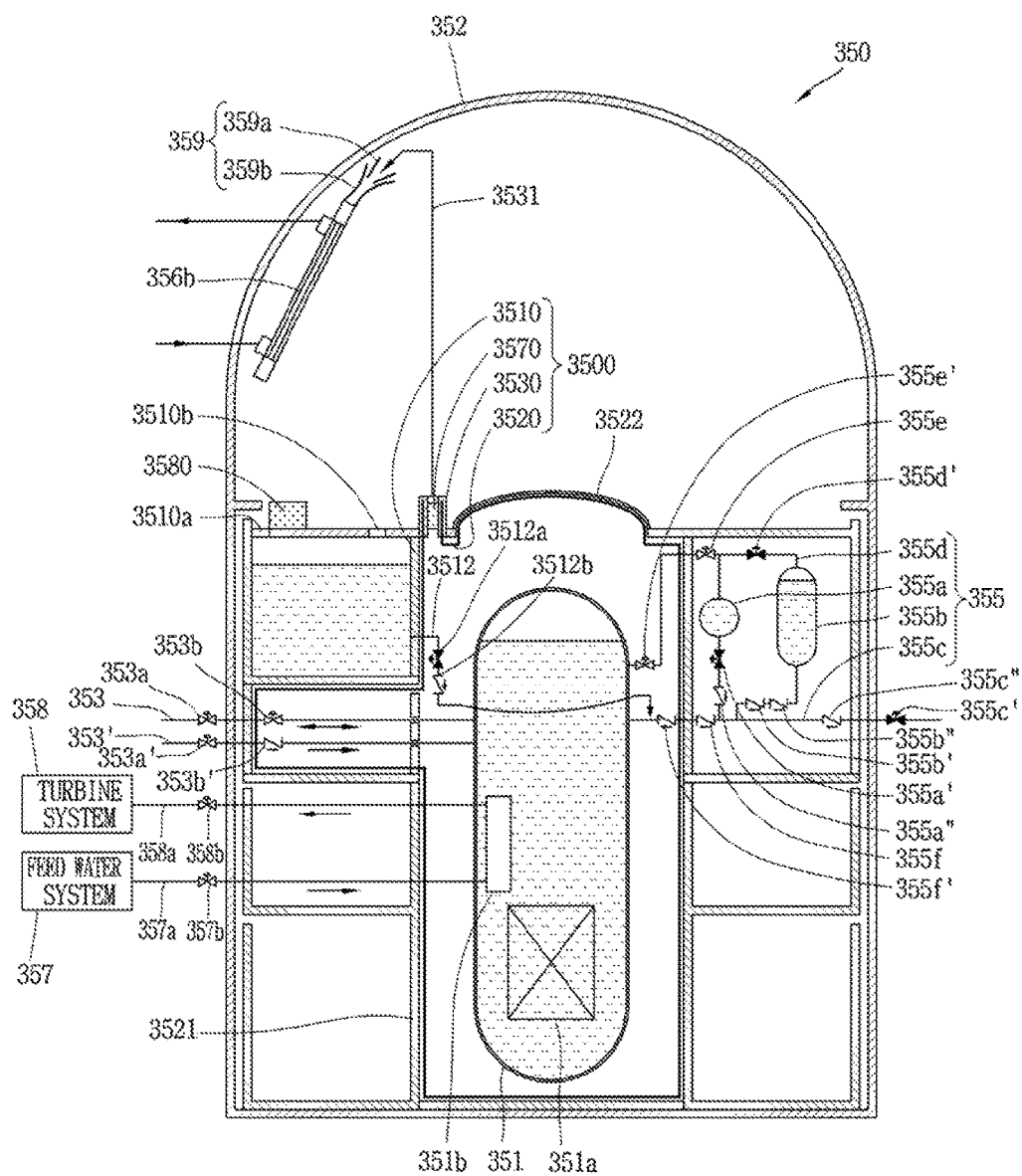
FIG. 25A is a concept view illustrating the normal operation of a facility for reducing radioactive material and a nuclear power plant having the same according to yet still another embodiment of the present invention.

FIG. 25A is a concept view illustrating the normal operation of a facility 3500 for reducing radioactive material and a nuclear power plant 350 having the same according to yet still another embodiment of the present invention.

The nuclear power plant 350 further includes an extended path 3531 and a circulation enhancement facility 359.

The extended path 3531 is extended from the discharging unit 3530 up to an upper part of the heat exchanger 356b to discharge the fluid from the discharging unit 3530 to the heat exchanger 356b. The fluid in the boundary unit 3520 flows along the extended path 3531 and is discharged through the outlet of the extended path 3531.

The circulation enhancement facility 359 is installed at the outlet of the extended path 3531. The fluid is discharged through the circulation enhancement facility 359. The circulation enhancement facility 359 may be configured in the form of a jet pump, for example. The circulation enhancement facility 359 is configured to introduce the atmosphere included in the containment 352 by a pressure decrease that is caused as the fluid is discharged with high velocity. The circulation enhancement facility 359 is configured to inject the introduced atmosphere together with the fluid.

The circulation enhancement facility 359 includes a zet nozzle unit 359a and an atmosphere entrainment unit 359b.

The zet nozzle unit 359a is connected with the outlet of the extended path 3531 to receive the fluid from the extended path 3531. The zet nozzle unit 359a is formed to inject the received fluid to the heat exchanger 356b.

The atmosphere entrainment unit 359b wraps around the zet nozzle unit 359a at the position spaced apart from the zet nozzle unit 359a to form an atmosphere inlet space around the zet nozzle unit 359a. For example, the atmosphere entrainment unit 359b may form a ring-shaped atmosphere inlet space around the zet nozzle unit 359a. The atmosphere entrainment unit 359b is configured to inject the atmosphere introduced through the atmosphere inlet space, together with the fluid.

The atmosphere in the containment 352 may be circulated more actively by the circulation enhancement facility 359. This means that a small amount of the remaining radioactive material and the steam released to the inside of the containment 352 may be guided to the heat exchanger 356b. Accordingly, the steam may be condensed, and the soluble radioactive material may be dissolved in the condensed water and recollected to the cooling water storage unit 3510.

Further, the circulation enhancement facility 359 mitigates a decrease in the efficiency of the heat exchanger 356b that occurs due to accumulation of a noncondensable gas (air) around the heat exchanger 356b. The performance of the heat exchanger 356b may be enhanced through forced circulation by the circulation enhancement facility 359. Further, the circulation enhancement facility 359 may increase the speed of flow at the periphery of the heat exchanger 356b to assist in enhancing the heat transfer coefficient.

Figure 25B:
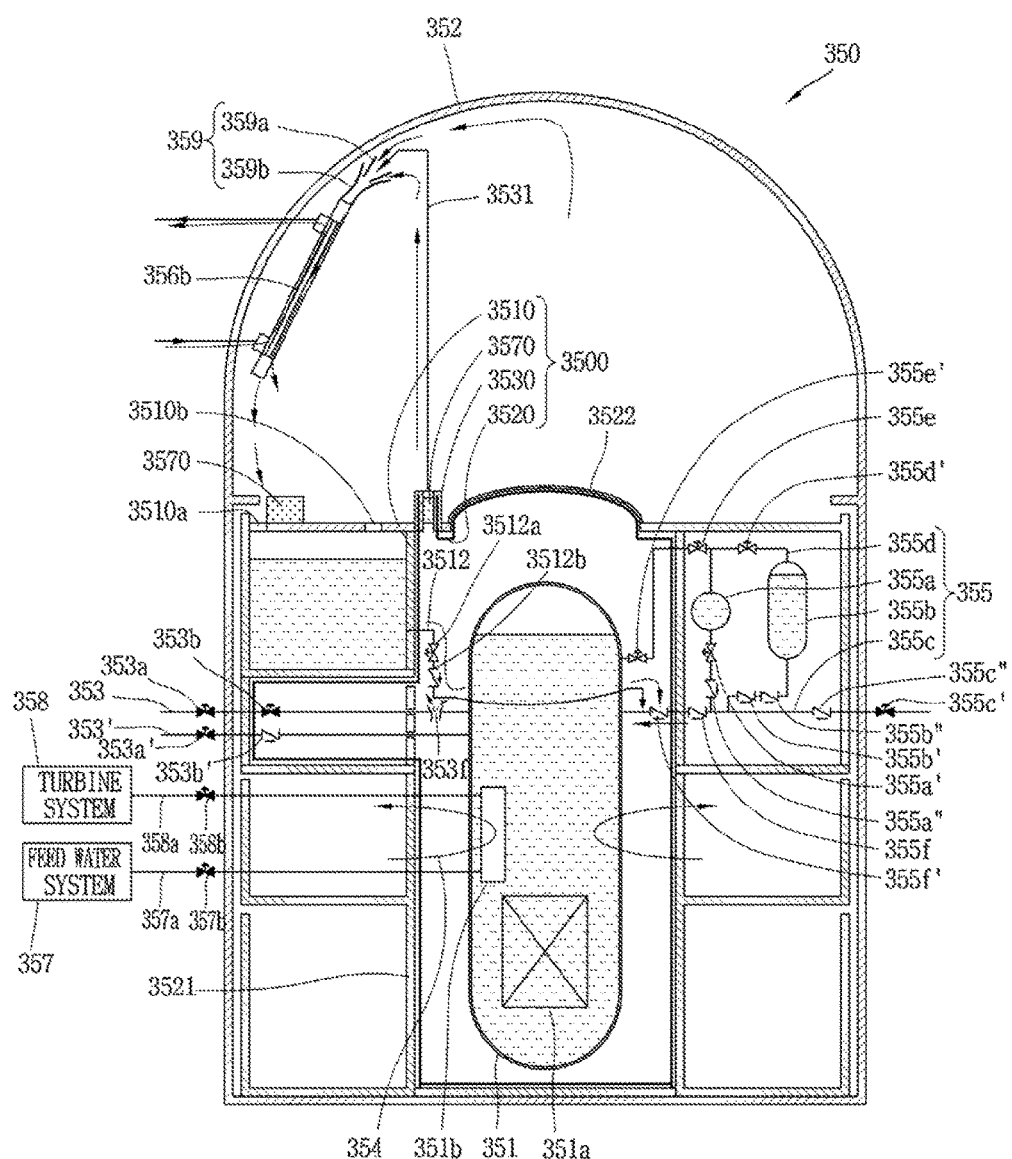
FIG. 25B is a concept view illustrating an example in which an accident occurs in a facility for reducing radioactive material and a nuclear power plant having the same according to yet still another embodiment of the present invention.

FIG. 25B is a concept view illustrating an example in which an accident occurs in a facility 3500 for reducing radioactive material and a nuclear power plant 350 having the same according to yet still another embodiment of the present invention.

When an accident occurs in the nuclear power plant 350, the nuclear power plant 350 may stay in safe shutdown condition by the operation of various safety systems. The passive residual heat removing system removes sensible heat in the reactor coolant system 351 and residual heat in the core 351a. The passive containment cooling system 355 maintains the water level of the reactor coolant system 351.

The facility 3500 for reducing radioactive material captures radioactive material in the boundary unit 3520.

The fluid inside the boundary unit 3520 flows along the extended path 3531 connected with the discharging unit 3530 and is injected to the heat exchanger 356*b* through the zet nozzle unit 359*a*. If the fluid is injected with a high speed, a pressure drop phenomenon locally occurs. Accordingly, the atmosphere inside the containment 352 is introduced to the atmosphere entrainment unit through the atmosphere inlet space, and the atmosphere entrainment unit 359*b* injects the introduced atmosphere, together with the fluid, to the heat exchanger 356*b*.

The atmosphere and fluid are cooled and condensed in the heat exchanger 356*b*. The air is discharged, and the condensed water created by the operation of the heat exchanger is recollected to the cooling water storage unit 3510 through the cooling water recollecting portion 3510*a*. Since the additive injection unit 3580 injects an additive to the condensed water during the process of recollecting the condensed water, the condensed water may be prevented from re-volatilization.

The description of the others is replaced with what has been described above.

Figure 26A:
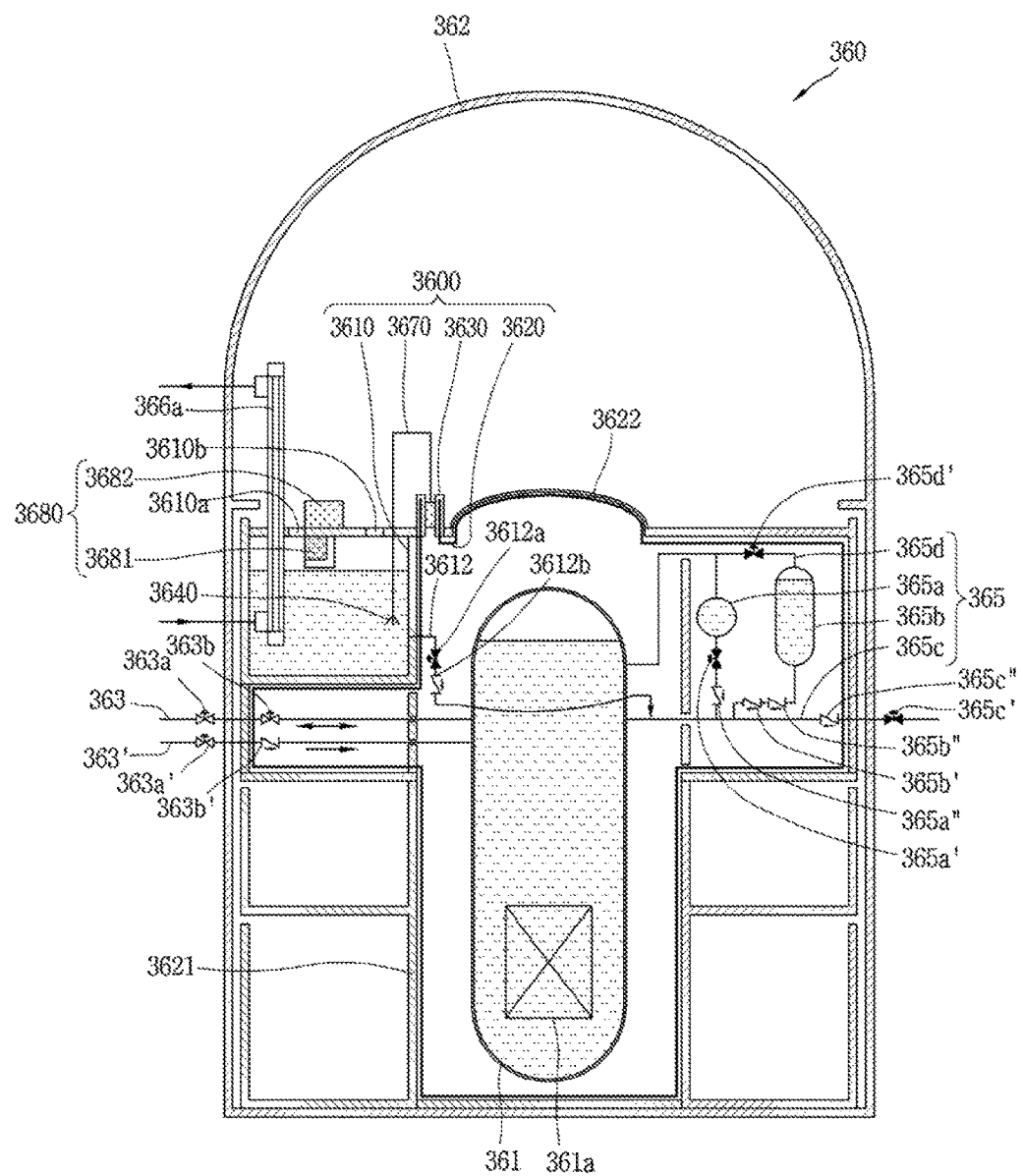
FIG. 26A is a concept view illustrating the normal operation of a facility for reducing radioactive material and a nuclear power plant having the same according to yet still another embodiment of the present invention.

FIG. 26A is a concept view illustrating the normal operation of a facility 3600 for reducing radioactive material and a nuclear power plant 360 having the same according to yet still another embodiment of the present invention.

The discharging unit 3630 is extended from the boundary unit 3620 up to the inside of the cooling water storage unit 3610 to discharge the atmosphere inside the boundary unit 3620 to the cooling water storage unit 3610. The outlet of the discharging unit 3630 is submerged in the cooling water of the cooling water storage unit 3610. Accordingly, the fluid in the boundary unit 3620 is not directly discharged to the containment 362 and is discharged to the cooling water in the cooling water storage unit 3610.

The facility 3600 for reducing radioactive material further includes a sparging unit 3640. The sparging unit 3640 is installed at an end of the discharging unit 3630 to be submerged in the cooling water of the cooling water storage unit 3610. The sparging unit 3640 sparges the fluid that has passed through the discharging unit 3630. The fluid contains steam and air, and the sparging unit 3640 is configured to sparge the air while condensing the steam. In case the facility 3600 for reducing radioactive material includes the sparging unit 3640, the design pressure for the boundary of radioactive material formed by the boundary unit 3620 is designed considering water head. The sparging unit 3640 may have a flow resistance in its inner fluid path to induce an even distribution of the fluid to the plurality of fine fluid paths. The fluid may be relatively evenly distributed to each fine fluid path by the flow resistance. As the steam is condensed, the pressure inside the containment 362 may be suppressed from increasing.

Since the non-condensed air inside the boundary unit 3620 is discharged to the inside of the containment 362, the pressure inside the containment 362 may increase. However, since the volume of the inside of the boundary unit 3620 is relatively smaller than the volume of the inside of the containment 362, the pressure inside the containment 362 is not greatly increased.

The containment 362 and the boundary unit 3620 may be connected with each other via a pressure balance line (not shown). The pressure balance line may have a check valve (not shown), and the sparging unit 3640, unlike shown, may be installed on the pressure balance line. In case as long-term cooling or a loss-of-coolant accident occurs outside the boundary unit 3620, the pressure inside the containment 362 is higher than the pressure inside the boundary unit 3620, the check valve of the pressure balance line is opened, and the containment 362 and the boundary unit 3620 form a pressure balance. Since the atmosphere inside the containment 362 is introduced to the inside of the boundary unit 3620 through the pressure balance line, the pressure balance line may prevent the cooling water in the cooling water storage unit 3610 from flowing back to the inside of the boundary unit 3620.

The additive injection unit 3680 may be installed in each of the cooling water storage unit 3610 and the cooling water recollecting portion 3610*a*. The first additive injection unit 3681 is installed in the cooling water storage unit 3610. The second additive injection unit 3682 is installed in the cooling water recollecting portion 3610*a*.

The first additive injection unit 3681 is installed at a predetermined height of the cooling water storage unit 3610 to be submerged in the cooling water by a rise in the water level of the cooling water storage unit 3610. As the first additive injection unit 3681 is submerged in the cooling water, the additive is dissolved in the cooling water, and thus, the first additive injection unit 3681 may prevent the radioactive material from volatilizing.

The second additive injection unit 3682 injects an additive to the condensed water recollected through the cooling water recollecting portion 3610*a* to the cooling water storage unit 3610. The description of the functions of the second additive injection unit 3682 is replaced by what has been described above.

Figure 26B:
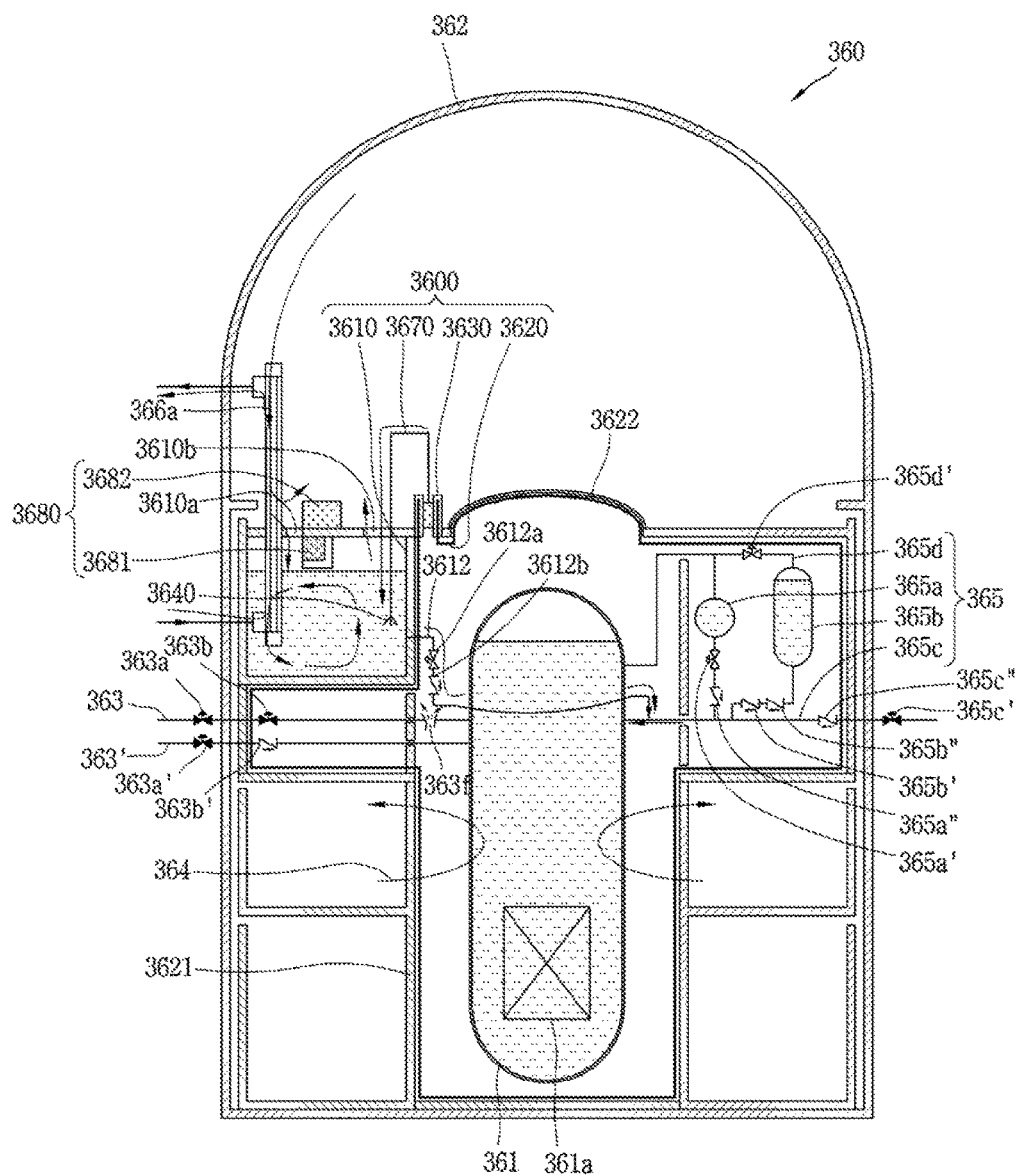
FIG. 26B is a concept view illustrating an example in which an accident occurs in a facility for reducing radioactive material and a nuclear power plant having the same according to yet still another embodiment of the present invention.

FIG. 26B is a concept view illustrating an example in which an accident occurs in a facility 3600 for reducing radioactive material and a nuclear power plant 360 having the same according to yet still another embodiment of the present invention.

When an accident occurs, the fluid inside the boundary unit 3620 is sparged through the fluid path of the discharging unit 3630 to the inside of the cooling water storage unit 3610. As the fluid is sparged from the sparging unit 3640, the steam is condensed and the air is cooled. The air may be discharged through the opening portion 3610*b* to the inner space of the containment 362. The atmosphere inside the containment 362 is introduced into the heat exchanger 366*a* by way of natural circulation.

The atmosphere in the containment 362 is cooled and condensed by the heat exchanger 366*a*. The air is discharged back to the inner space of the containment 362, and the condensed water is introduced through the cooling water recollecting portion 3610*a* to the cooling water storage unit 3610. While passing through the cooling water recollecting portion 3610*a*, an additive is supplied from the second additive injection unit 3682. As the water level of the cooling water storage unit 3610 gradually increases, the first additive injection unit 3681 is submerged in the cooling water, and the additive is dissolved in the cooling water. The condensed water and the cooling water may be prevented from re-volatilizing by the first additive injection unit 3681 and the second additive injection unit 3682.

The above-described facility for reducing radioactive material has been proposed to solve the problems with expanding exclusion area boundary (EAB) that may occur when a passive safety system is introduced. In case an accident occurs in the nuclear power plant (except some limited quantities of leakage), a majority of radioactive materials discharged from the reactor coolant system or pipe line connected with the reactor coolant system is configured to be sparged into a cooling water storage unit such as a large pool or tank through a sparging unit, thus significantly decreasing the concentration of the radioactive material in the containment. Further, release of the radioactive material to the external environment may be minimized.

Use of the facility for reducing radioactive material may resolve the issue of expanding EAB that may be caused by adopting the passive safety system in the nuclear power plant and allows for easy introduction of a passive safety system with excellent effects in enhancing safety. A reduction in the EAB may save economical expense, and the facility for reducing radioactive material may maintain the function of reducing radioactive material for a long time as long as the cooling water storage unit maintains a predetermined water level or more, thus contributing to enhanced safety of the nuclear power plant.

According to the present invention, when a loss-of-coolant accident occurs, a filter facility may be used to capture the radioactive material in the boundary unit and may suppress a rise in the concentration of the radioactive material in the containment.

Further, according to the present invention, the concentration of the radioactive material in the containment is suppressed from increasing to remarkably reduce the EAB, and release of radioactive material to the external environment may be minimized. Accordingly, the nuclear power plant may enjoy significantly enhanced safety, as well as savings in the economical expense. According to the present invention, further, the problem with expanding EAB may be resolved, and a passive safety system with excellent safety enhancing effects may be applied to the nuclear power plant.

Further, according to the present invention, the pH of the cooling water in the cooling water storage unit may be controlled by a passive manner to suppress re-volatilization of radioactive material while hardly increasing the number of isolation valves, and even when the radioactive material is re-volatilized, the radioactive material may be suppressed from being discharged to the inside of the containment.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A facility for reducing radioactive material, the facility comprising:
   a cooling water storage unit installed inside a containment building and formed to store cooling water, the cooling water storage unit formed by a structure distinguished from a structure forming the containment building;
   an opening portion formed at an upper wall of the cooling water storage unit to allow an evaporation of the cooling water therethrough;
   a boundary unit configured to surround a reactor coolant system installed inside the containment building to form a boundary of radioactive material, the boundary unit configured to suppress spreading of the radioactive material released from the reactor coolant system or a pipe connected with the reactor coolant system to an outside of the boundary;
   a connecting pipe connected with an inner space of the boundary unit and the cooling water storage unit to guide a flow of a fluid caused by a pressure difference between the boundary unit and the cooling water storage unit from the boundary unit to the cooling water storage unit;
   a sparging unit disposed to be submerged in the cooling water stored in the cooling water storage unit and connected with the connecting pipe to sparge the fluid that has passed through the connecting pipe and the radioactive material contained in the fluid to the cooling water storage unit;
   wherein an inside of the containment building comprises:
      a first area corresponding to the inside of the boundary unit; and
      a second area formed between (1) an inner wall of the containment building and (2) outer walls of the cooling water storage unit and the boundary unit for accommodating fluid that evaporates through the opening portion, and maintaining a pressure balance with the inside of the cooling water storage unit by the opening portion;
   a cooling water recollecting portion formed at the upper wall of the cooling water storage unit to recollect fluid condensed in the second area to the cooling water storage unit,
   wherein the first area is isolated from other spaces inside the containment building excluding an inlet of the connecting pipe,
   wherein the boundary unit, the connecting pipe and the sparging unit collect the radioactive material in the cooling water storage unit before the radioactive material contacts the inner wall of the containment building, and
   wherein at least a part of the second area is formed above a top of the first area and a top of the cooling water storage unit, the size of the at least a part of the second area is larger than that of the first area so that the flow of the fluid from the first area to the cooling water storage unit is continued by maintaining a pressure difference between the first area and the second area when a loss-of-coolant accident occurs.

2. The facility of claim 1, wherein the cooling water storage unit includes an inlet through which the connecting pipe passes, and wherein the highest part of the connecting pipe is formed at a predetermined height from a bottom of the cooling water storage unit to prevent the cooling water stored in the cooling water storage unit from flowing back to an inside of the boundary unit.

3. The facility of claim 1, further comprising a check valve formed to allow for a flow only in one direction and installed at the connecting pipe to prevent the cooling water in the cooling water storage unit from flowing back to the boundary unit through the connecting pipe.

4. The facility of claim 1, further comprising:
   a discharging unit installed at the boundary of the radioactive material to form a fluid path that runs from the boundary unit to the containment building and configured to guide a flow of a fluid caused by a pressure difference between the containment building and the boundary unit from the containment building to the boundary unit through the fluid path; and
   a filter facility installed in the fluid path of the discharging unit to capture the radioactive material contained in the fluid passing through the discharging unit in the boundary unit.

5. The facility of claim 1, wherein at least a portion of the boundary unit is expanded to a region adjacent to the containment building while surrounding a penetration pipe penetrating the containment building to prevent the loss-ofcoolant accident from occurring due to breakage of the penetration pipe in a region between the containment building and the boundary unit.

6. The facility of claim 1, wherein the boundary unit forms a sealing structure around the reactor coolant system to prevent release of the radioactive material.

7. The facility of claim 1, wherein at least a portion of the boundary unit is formed by a concrete structure inside the containment building or a coating member installed on the concrete structure.

8. The facility of claim 1, wherein the boundary unit comprises:
a barrier formed to surround the reactor coolant system; and
a cover formed to cover an upper part of the reactor coolant system and coupled with the barrier.

9. The facility of claim 4, wherein the filter facility comprises at least one of:
a filter configured to form iodic silver by reacting silver nitrate with iodine contained in the fluid and formed to remove the iodic silver from the fluid; and
an absorbent configured to remove the iodine contained in the fluid through chemisorption that is performed by charcoal.

10. The facility of claim 4, further comprising a cooling water storage unit installed inside the containment building, the cooling water storage unit formed to store cooling water for dissolving the radioactive material.

11. The facility of claim 10, wherein the discharging unit is extended from the boundary unit to an inside of the cooling water storage unit to discharge the fluid into the cooling water storage unit.

12. The facility of claim 1, wherein the cooling water storage unit is connected with a pipe forming a fluid path that runs to a safety injection line of a safety injection system to inject the cooling water stored in the cooling water storage unit to the inside of the reactor coolant system.

13. The facility of claim 1, further comprising an additive injection unit supplying an additive for maintaining a pH of cooling water to a predetermined value or more to prevent volatilization of the radioactive material dissolved in the cooling water storage unit.

14. The facility of claim 13, wherein the additive injection unit is installed at a predetermined height inside the cooling water storage unit to be submerged in the cooling water as a water level of the cooling water storage unit increases, and wherein as the additive injection unit is submerged in the cooling water, the additive is dissolved in the cooling water.

15. The facility of claim 13, wherein the additive injection unit is installed on a fluid path of the cooling water recollecting portion to dissolve the additive in the cooling water recollected to the cooling water recollecting portion.

16. The facility of claim 1, further comprising a sparging unit installed at an end of a discharging unit to be submerged in the cooling water of the cooling water storage unit and configured to sparge a fluid that has passed through the discharging unit, to condense steam and to dissolve soluble radioactive materials in the discharged air contained in the fluid.

17. The facility of claim 1, wherein the sparging unit comprises:
a plurality of sparging holes formed to sparge fluid that has passed through the connecting pipe and the radioactive material contained in the fluid; and
a plurality of sub fluid paths that run the plurality of sparging holes from the connecting pipe,
wherein the sparging unit has a flow resistance therein to induce an even distribution of the fluid into a plurality of sub fluid paths.

18. The facility of claim 1, further comprising a pressure balance line passing through at least a portion of the boundary unit and extended to an inside of the containment building to form a fluid path of atmosphere passing through the boundary of the radioactive material, wherein the pressure balance line, when a pressure inside the containment building is higher than a pressure inside the boundary unit, introduces atmosphere inside the containment building to the inside of the boundary unit to prevent the cooling water in the cooling water storage unit from flowing back to the inside of the boundary unit.

19. The facility of claim 18, further comprising a check valve formed to allow for a flow only in one direction and installed at the pressure balance line to prevent the atmosphere inside the boundary unit from being discharged to the inside of the containment building through the pressure balance line.

20. The facility of claim 1, wherein the cooling water storage unit is connected with a pipe forming a fluid path that runs to a safety injection line of a safety injection system to inject the cooling water stored in the cooling water storage unit to the inside of the reactor coolant system.

21. The facility of claim 4, wherein at least a portion of the boundary unit is expanded to a region adjacent to the containment building while surrounding a penetration pipe penetrating the containment building to prevent the loss-of-coolant accident from occurring due to breakage of the penetration pipe in a region between the containment building and the boundary unit.

22. The facility of claim 4, wherein the boundary unit forms a sealing structure around the reactor coolant system to prevent release of the radioactive material.

23. The facility of claim 4, wherein at least a portion of the boundary unit is formed by a concrete structure inside the containment building or a coating member installed on the concrete structure.

24. The facility of claim 4, wherein the boundary unit comprises:
a barrier formed to surround the reactor coolant system; and
a cover formed to cover an upper part of the reactor coolant system and coupled with the barrier.

25. The facility of claim 16, wherein the sparging unit has a flow resistance therein to induce an even distribution of the fluid into a plurality of sub fluid paths.

26. The facility of claim 10, further comprising a pressure balance line passing through at least a portion of the boundary unit and extended to an inside of the containment building to form a fluid path of atmosphere passing through the boundary of the radioactive material, wherein the pressure balance line, when a pressure inside the containment building is higher than a pressure inside the boundary unit, introduces atmosphere inside the containment building to the inside of the boundary unit to prevent the cooling water in the cooling water storage unit from flowing back to the inside of the boundary unit.

* * * * *